United States Patent [19]
Ainsworth et al.

[11] Patent Number: 5,410,684
[45] Date of Patent: Apr. 25, 1995

[54] LOG NAME EXCHANGE FOR RECOVERY OF PROTECTED RESOURCES

[75] Inventors: Michael K. Ainsworth, Endicott; Cherie C. Barnes, Barton; Robert B. Bennett, Endwell; Robert C. Will, Apalachin, all of N.Y.

[73] Assignee: International Business Machines Corporation, Armonk, N.Y.

[21] Appl. No.: 124,368

[22] Filed: Sep. 20, 1993

Related U.S. Application Data

[63] Continuation of Ser. No. 525,430, May 16, 1990, abandoned.

[51] Int. Cl.⁶ ............... G06F 11/28; G06F 11/34; G06F 15/16
[52] U.S. Cl. ............... 395/575; 364/DIG. 1; 364/284.4; 364/285.2; 395/200
[58] Field of Search ............... 395/200, 575; 364/DIG. 1; 371/12

[56] References Cited

U.S. PATENT DOCUMENTS

| | | | |
|---|---|---|---|
| 4,205,374 | 5/1980 | Bardsley, III et al. | 364/200 |
| 4,224,664 | 9/1980 | Trinchieri | 364/200 |
| 4,399,504 | 8/1983 | Obermarck et al. | 364/200 |
| 4,412,285 | 10/1983 | Neches et al. | 364/200 |

(List continued on next page.)

FOREIGN PATENT DOCUMENTS 0250847 5/1987 European Pat. Off. .

OTHER PUBLICATIONS

Daniels, D. et al., "Distributed Logging for Transaction Processing", *SIGMOD Record*, vol. 16, No. 3, Dec. 1987, pp. 82–95.

Homan, P. et al., "Recovery Protocol Using a Common Log", *IBM Technical Disclosure Bulletin*, vol. 24, No. 11B, Apr. 1982, pp. 6211–6212.

Anonymous, "Coordinator Log Transaction Execution Protocol", *IBM Technical Disclosure Bulletin*, vol. 32, No. 10B, Mar. 1990, pp. 412–413.

Goodman, N. et al., "A Recovery Algorithm for a Distributed Database System", *Proc. 2nd SIGACT-SIGMOD Symp. on Principles of Database Systems*, pp. 8–15, 1983.

Lai, W., "The Integrity of Data Delivery in Computer Networks", *IEEE Transactions on Communications*, vol. COM-33, No. 11, Nov. 1985, pp. 1222–1224.

Svoboda, L., "File Servers for Network-Based Distributed Systems", *Computing Surveys*, vol. 16, No. 4, Dec. 1984, pp. 353–398.

Tanenbaum, A., *Computer Networks*, 2nd ed., copyright 1988 by Prentice–Hall, Inc., pp. 212–239, 271–280, 409"411, 446–447, 532–535.

IBM TDB, vol. 24, Apr. 1982, by P. Homan et al. "Recovery Protocol Using A Common Log" pp. 6211–6212.

IBM TDB, vol. 24, Jul. 1981, by J. Mehl "Two-Phase (List continued on next page.)

*Primary Examiner*—Stephen M. Baker
*Attorney, Agent, or Firm*—Arthur J. Samodovitz

[57] ABSTRACT

A computer network comprises first and second computers, each having a recovery facility for recovering a two-phase commit procedure and a recovery log. The log comprises a log name log which stores the names of other logs involved in a commit scope and a sync point log which stores sync point phase information. The log names are exchanged prior to a request for sync point. If a failure occurs during sync point, each recovery facility in the commit scope again exchanges log names to verify that there was not a log failure since the prior exchange. Absent a log failure, the logs are used to recover from the sync point failure. Communication facilities are interposed between the first and second computers and include log name exchange tables which record the previous exchanges of log names between the first and second computers. If a protected conversation is initialized from the first computer to the second computer and log names were not previously exchanged, then the communication facilities intercept the conversation and hold it until log names are exchanged.

29 Claims, 59 Drawing Sheets

U.S. PATENT DOCUMENTS

| | | | |
|---|---|---|---|
| 4,430,699 | 2/1984 | Segarra et al. | 364/200 |
| 4,445,176 | 4/1984 | Burk et al. | 364/200 |
| 4,466,063 | 8/1984 | Segarra et al. | 364/200 |
| 4,480,304 | 10/1984 | Carr et al. | 364/200 |
| 4,489,379 | 12/1984 | Lanier et al. | 364/200 |
| 4,498,145 | 2/1985 | Baker et al. | 364/900 |
| 4,500,960 | 2/1985 | Babecki et al. | 364/200 |
| 4,503,535 | 3/1985 | Budde et al. | 371/11 |
| 4,507,751 | 3/1985 | Gawlick et al. | 364/900 |
| 4,529,842 | 7/1985 | Levy et al. | 179/18 |
| 4,584,644 | 4/1986 | Larner | 364/200 |
| 4,614,841 | 9/1986 | Babecki et al. | 364/200 |
| 4,644,468 | 2/1987 | Doster et al. | 364/200 |
| 4,648,031 | 3/1987 | Jenner | 364/200 |
| 4,665,520 | 5/1987 | Strom et al. | 371/7 |
| 4,688,035 | 8/1987 | Gray et al. | 340/825.52 |
| 4,694,396 | 9/1987 | Weisshaar et al. | 364/300 |
| 4,697,266 | 9/1987 | Finley | 371/12 |
| 4,703,481 | 10/1987 | Fremont | 371/12 |
| 4,710,926 | 12/1987 | Brown et al. | 371/9 |
| 4,714,995 | 12/1987 | Materna et al. | 364/200 |
| 4,718,005 | 1/1988 | Feigenbaum et al. | 364/200 |
| 4,736,369 | 4/1988 | Barzilai et al. | 370/94 |
| 4,751,702 | 6/1988 | Beier et al. | 371/9 |
| 4,752,910 | 6/1988 | Yen et al. | 364/900 |
| 4,754,395 | 6/1988 | Weisshaar et al. | 364/200 |
| 4,768,150 | 8/1988 | Chang et al. | 364/300 |
| 4,780,821 | 10/1988 | Crossley | 364/200 |
| 4,816,990 | 3/1989 | Williams | 364/200 |
| 4,819,156 | 4/1989 | DeLorme et al. | 364/200 |
| 4,819,159 | 4/1989 | Shipley et al. | 364/200 |
| 5,027,269 | 6/1991 | Grant et al. | 395/650 |
| 5,109,483 | 4/1992 | Baratz et al. | 395/200 |

OTHER PUBLICATIONS

Commit Protocol For Distributed Communication Systems" pp. 1025–1026.

IBM TDB, vol. 24, Nov. 1981, by M. Z. Ghanem "Two–Phase Commit Method Among Asynchronous Nodes" pp. 2809–2810.

IBM TDB, vol. 26, Dec. 1983, by B. Lindsay et al. "Presumed Abort Protocols" pp. 3379–3381.

IBM TDB, vol. 26, Dec. 1983, by B. Lindsay et al. "Presumed Commit Protocols" pp. 3382–3383.

"Quicksilver Distributed File Services: An Architecture For Horizontal Growth" by L. F. Cabrera, CH 2441–Apr. 1988.

Abstract. "Recovery Management In A Transaction Oriented Distributed Operating System" by J. Kaiser et al.

IBM TDB, vol. 30, Nov. 1987, pp. 7–9 "Early Commit Scheme For Multi–System Data Sharing Using Write Completion Log".

IBM TDB, vol. 26, Jan. 1984, by S. Finkelstein et al. "Distributed Transaction Commit Protocols For Highly Available Systems" pp. 4250–4251.

"CARAT: A Testbed For The Performance Evaluation Of Distributed Database Systems" by W. Kohler et al. CH 2345–Jul. 1986.

IBM TDB, vol. 23, Apr. 1981, by B. G. Lindsay, pp. 5133–5134 "Distributed Commit Protocol".

IBM TDB, vol. 31, Sep. 1988, by C. Mohan et al, pp. 451–452 "Recovery Protocol For Nested Transactions Using Write-Ahead Logging".

"A Commit Protocol For Checkpointing Transactions" By P. Ng, CH 2612–0/88.

"A Queueing Network Model For A Distributed Database Testbed System" by B. Jeng et al. IEEE Trans on Software Engg., vol. SE–14, No. 7, 1988, pp. 908–920.

"Commitment And Recovery Under The Scot Cooperating Transactional System" by R. Balter et al., Technology & Science of Infomatics, vol. 3, No. 2, 1984, pp. 77–97.

"Implementing Distributed Read–Only Transactions" by A. Chan et al., IEEE Trans. on Software Engg. vol. SE–11, No. 2, 1985, pp. 205–212.

IBM TDB, vol. 24, Dec. 1981, by K. Eswaran et al. "Direct Commit Protocols For Distributed Transaction Processing" pp. 3183–3185.

"Recovery Management In Quicksilver" by R. Haskin et al., ACM Trans. on Computing Systems, vol. 6, No. 1, Feb. 1988, pp. 82–108.

"A Commit Protocol For Resilient Transaction" by P. Ng, Dept of Comp. Sci., Univ. of Illinois at Champaign–Urbana, Sep. 1987.

"Simplifying Distributed Database Systems Design By Using A Broadcast Network" by J. Chang, ACM 0–89791–128–Aug. 1984, pp. 223–233.

"Evaluation Of Error Recovery Blocks Used For Co-operating Processes" by K. Shin et al. IEEE Trans on Software Engg. Se–10, 6, Nov. 1984, pp. 692–700.

"Resilient Distributed Computing" by. L. Svobodova, IEEE Trans. of Software Engg., 10, 3, May 1984, pp. 257–268.

"Recovery Management In A Transaction Oriented Distributed Operating System" by J. Kaiser, pp. 125–140 publication unknown.

(List continued on next page.)

OTHER PUBLICATIONS

"Providing Recoverability In A Transaction Oriented Distributed Operating System" by E. Nett CH 2293–Sep. 1986, pp. 590–597.

Report "Notes On Data Base Operating Systems" by James N. Gray, Research Rept., IBM Research Labs., RJ2188 (30001), Feb. 23, 1978.

Report "The Recovery Manager Of A Data Management System" by James N. Gray RJ 2623(33801), Aug. 15, 1979.

IBM TDB, vol. 29, Jan. 1987, pp. 3688–3690 "Two–Phase Commit Resynchronization".

"Selection Of A Commitment And Recovery Mechanism For A Distributed Transactional System" by R. Balter, CH 1632–Sep. 1981, pp. 21–26.

"Transaction Management in the R* Distributed Database Management System" by C. Mohan et al., ACM Trans. Database Syst., vol. 11, No. 4, Dec. 1986, pp. 378–396.

"Efficient Commit Protocols For A Tree Of Processes Model Of Distributed Transactions" by C. Mohan et al. ACM 0–89791–110–May 1983, pp. 40–52.

"Method For Distributed Transaction Commit And Recovery Using Byzantine Agreement Within Clusters Of Processors" by C. Mohan, ACM 0–89791–110–May 1983, pp. 29–43.

SIGMOD Record, vol. 16, No. 3, Dec., 1987, "Distributed Logging For Transaction Processing" by D. S. Daniels et al.

IBM TDB vol. 32, No. 10B, Mar., 1990, "Coordinator Log Transaction Execution Protocol", published anonymously.

IBM TDB vol. 24, No. 11B, Apr., 1982, "Recovery Protocol Using A Common Log", by P. Homan et al.

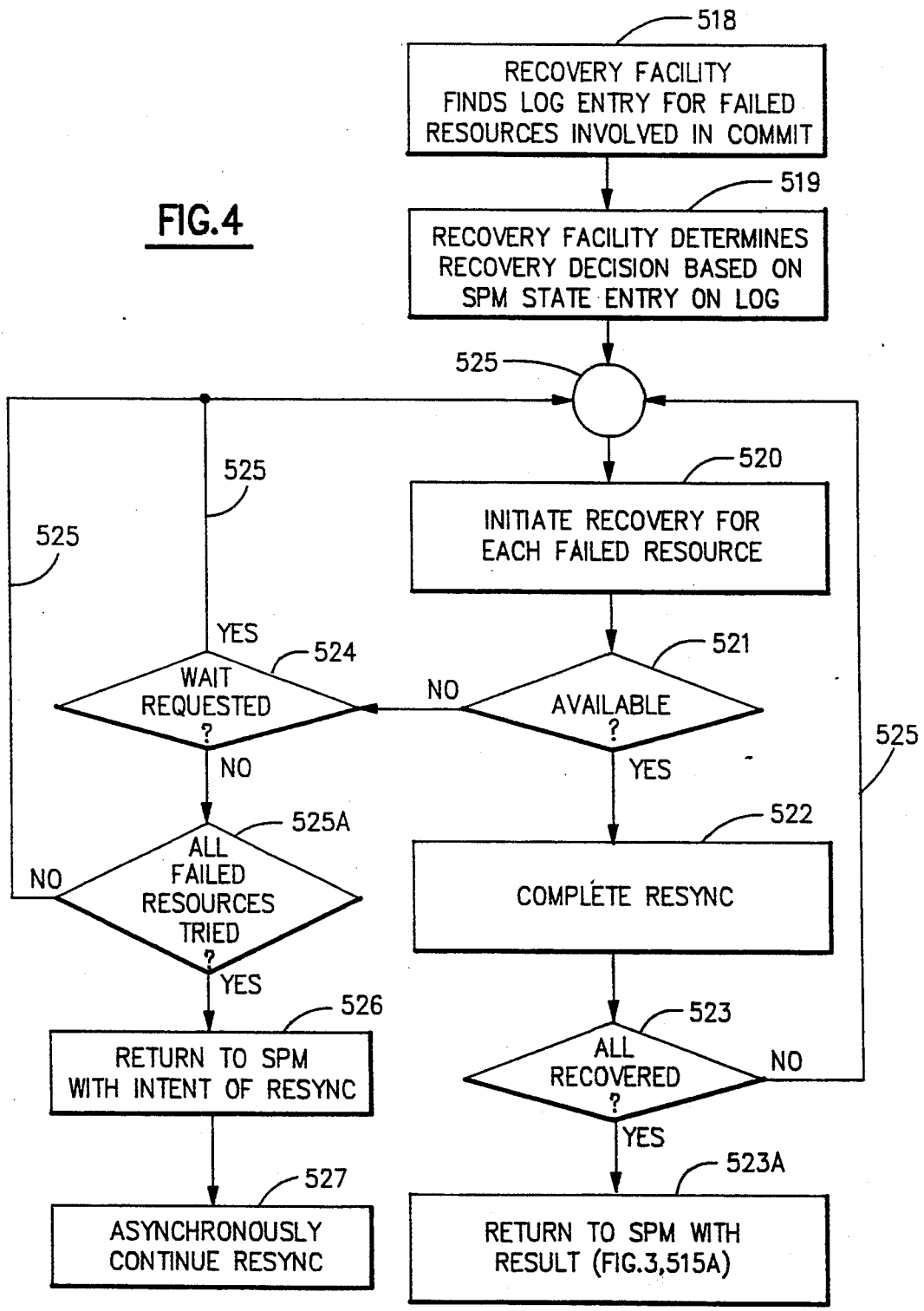

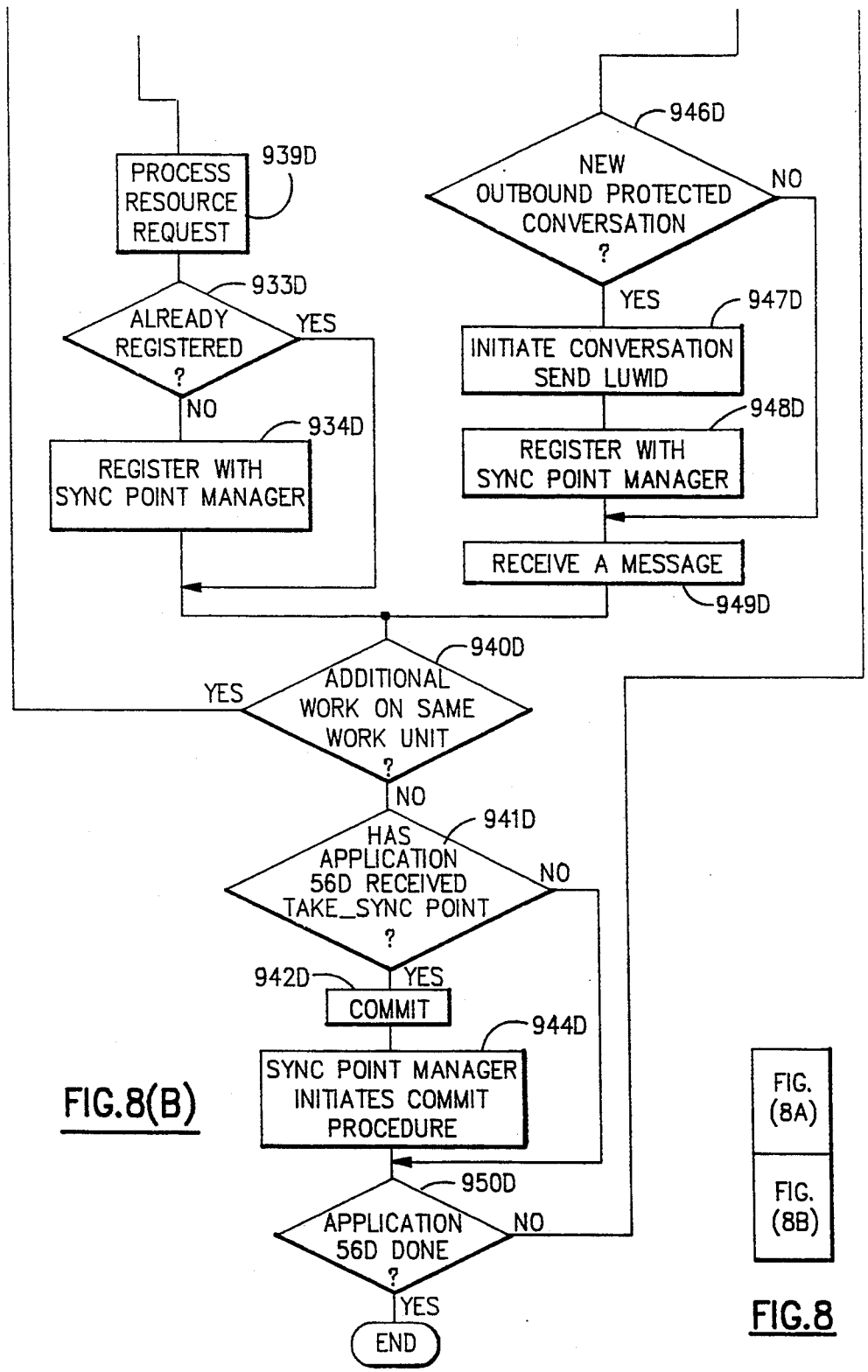

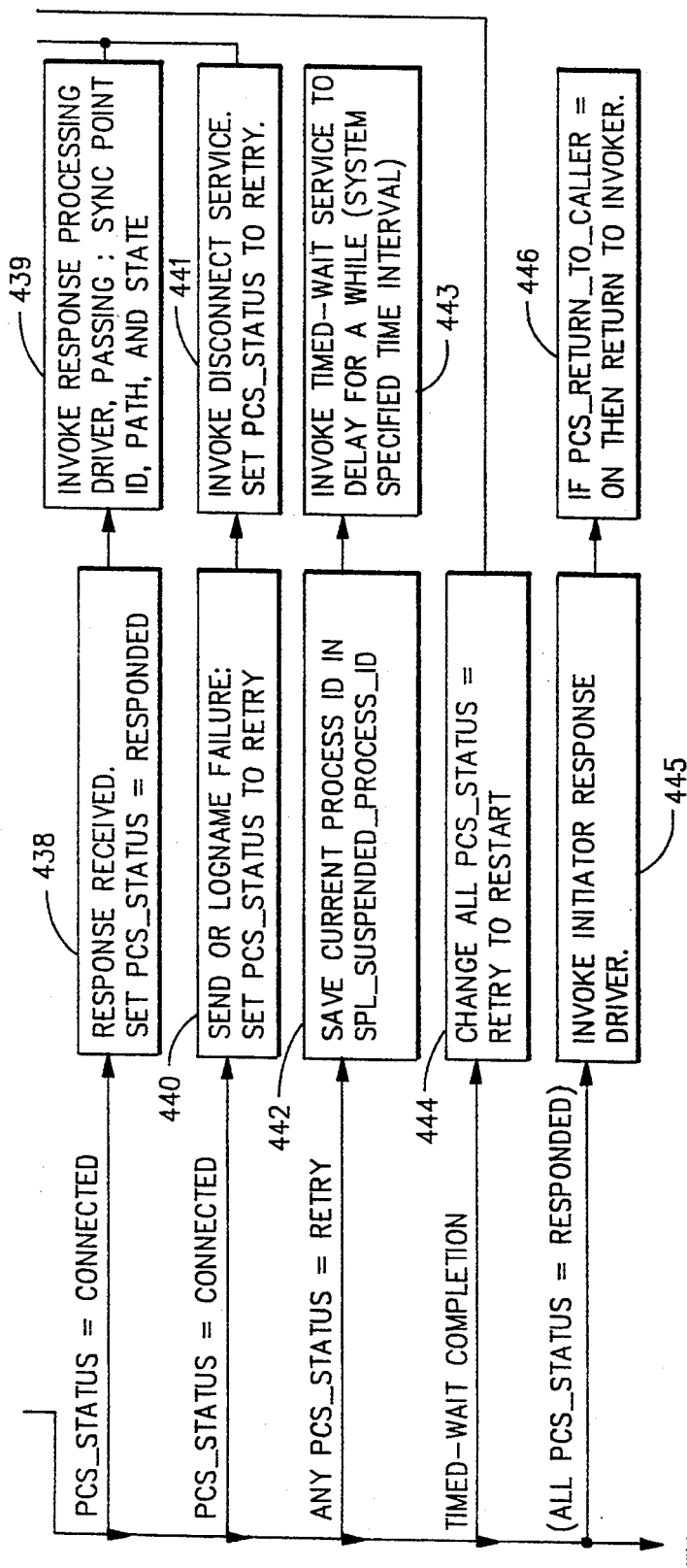
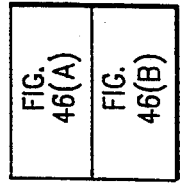
FIG.46(B)
FIG.46

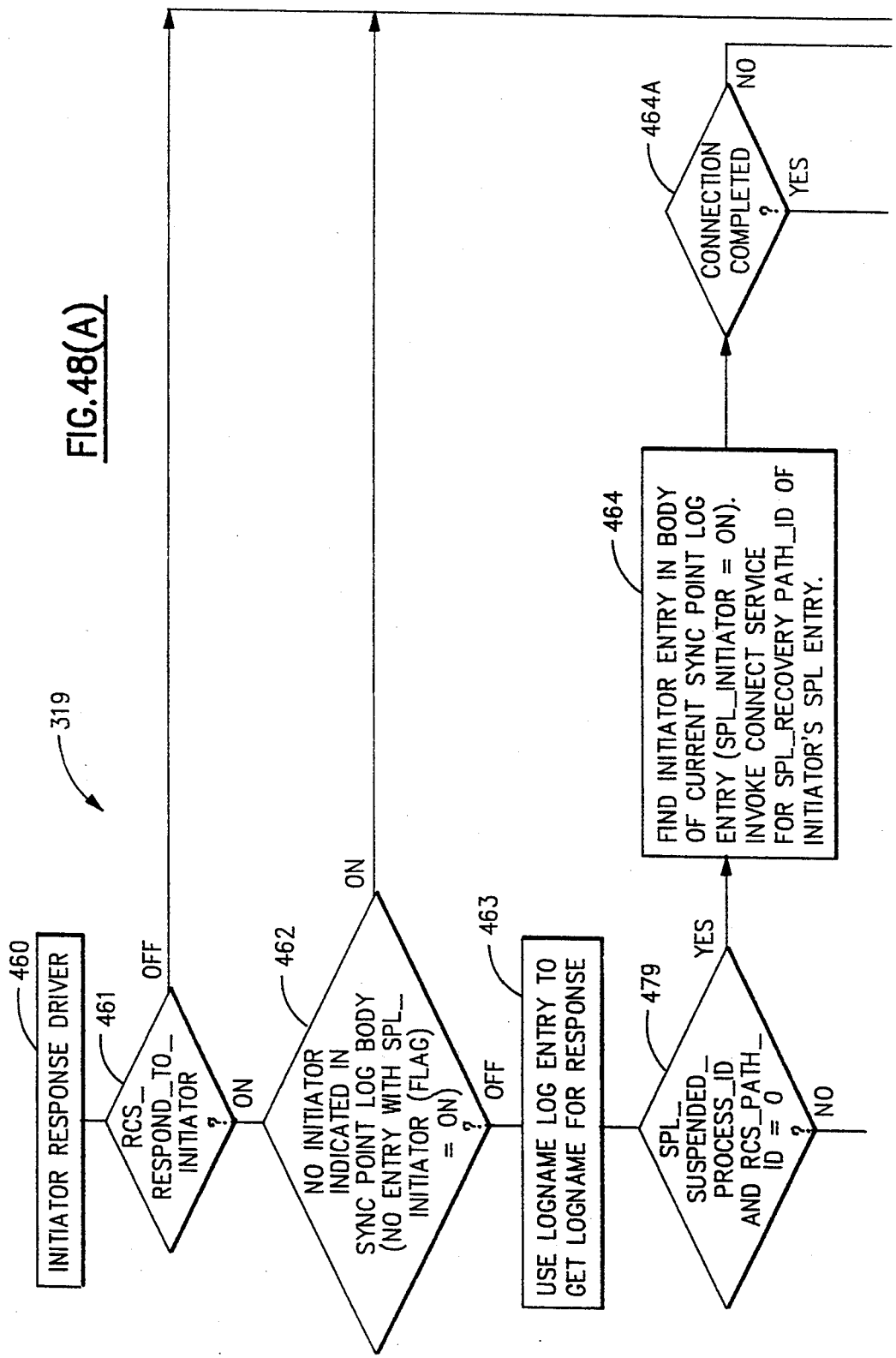

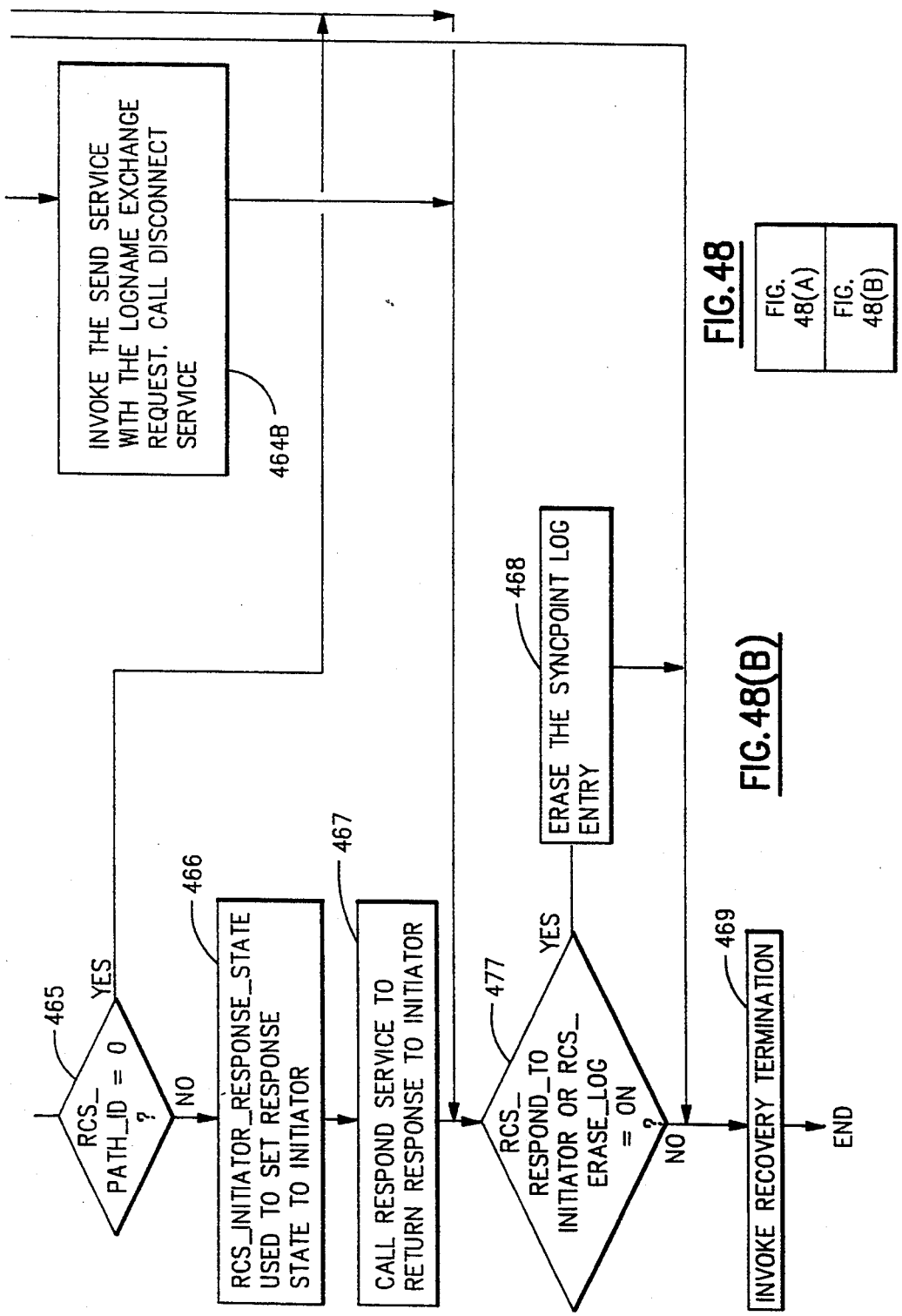

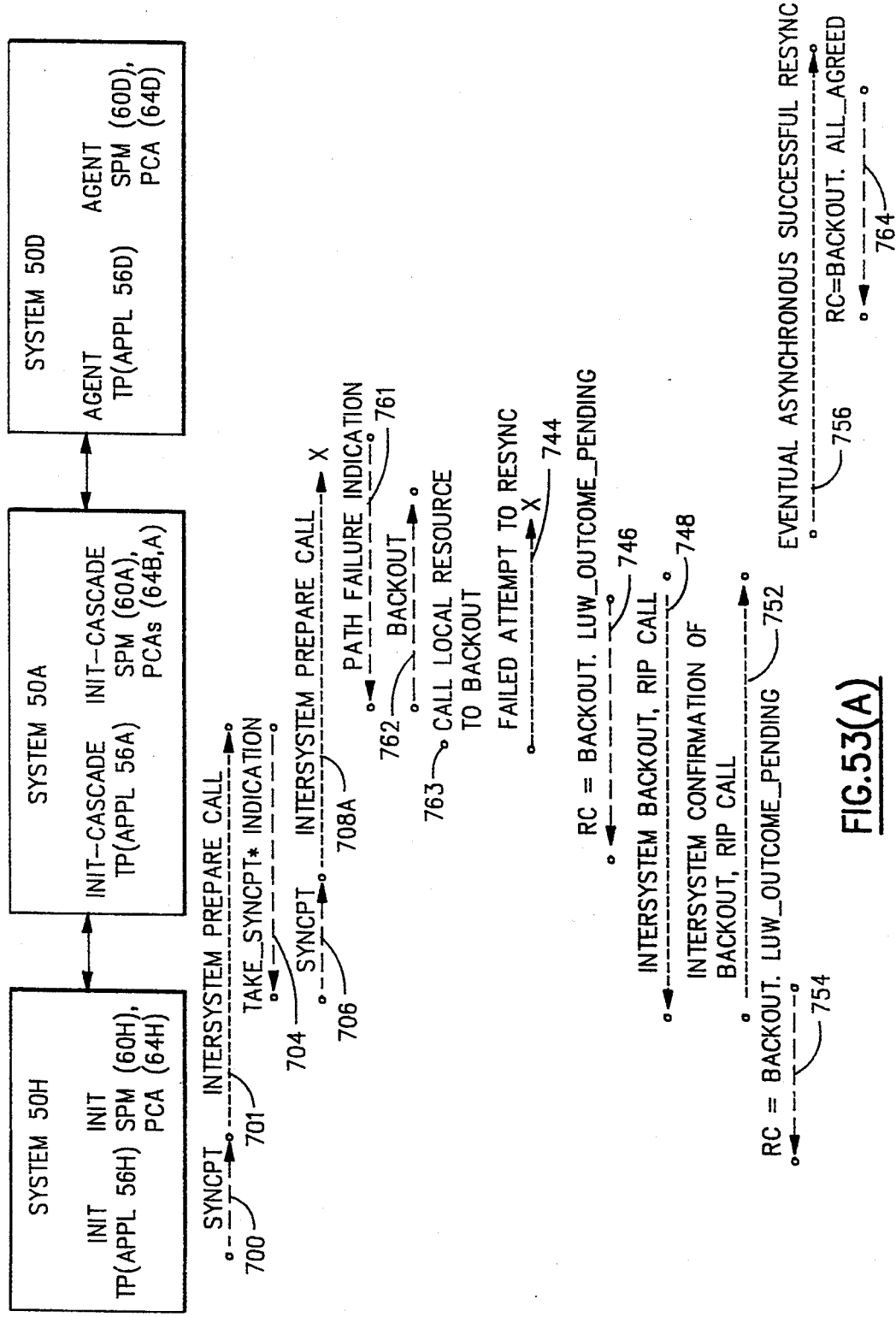

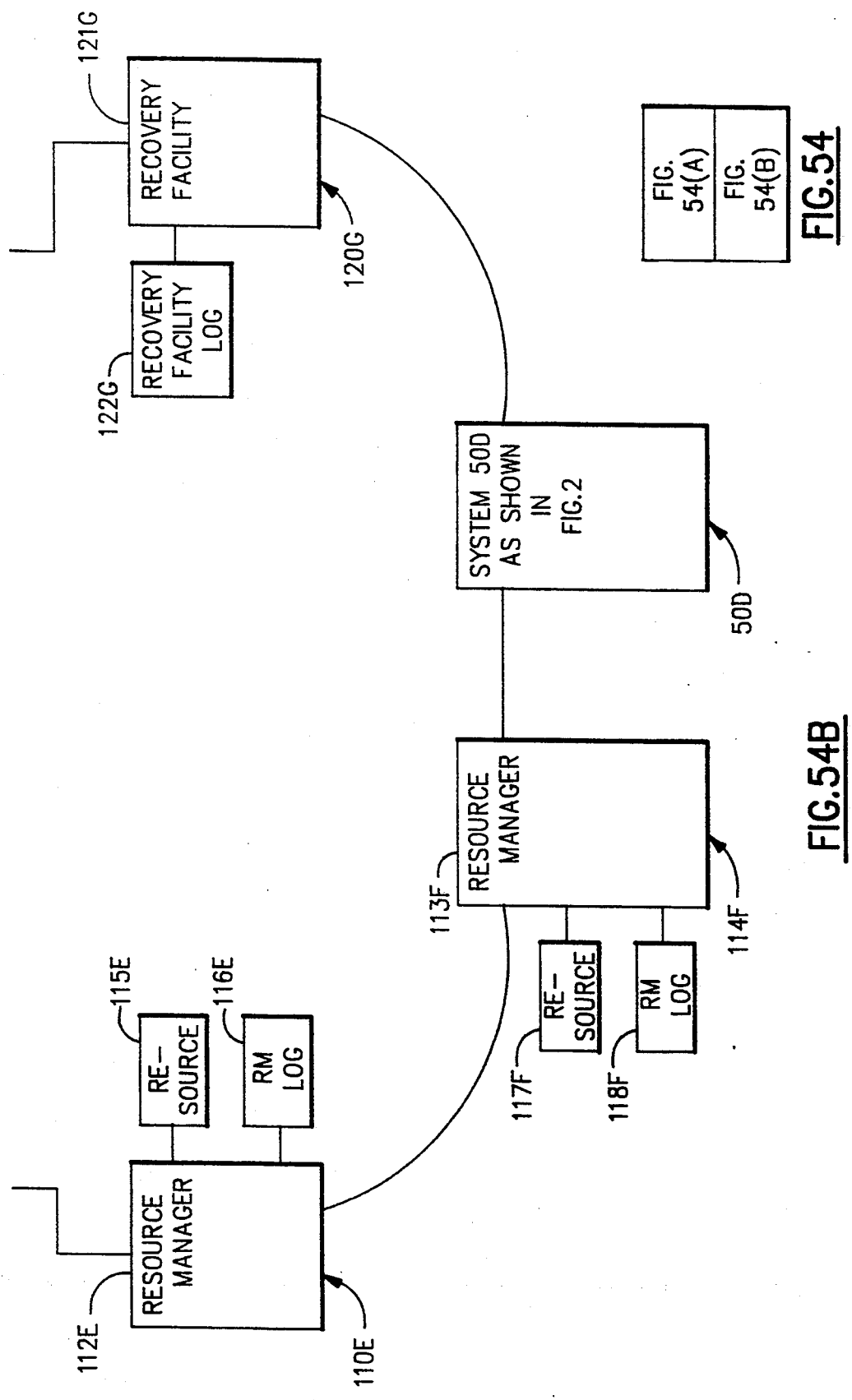

LOG NAME EXCHANGE FOR RECOVERY OF PROTECTED RESOURCES

This application is a continuation of application Ser. No. 07/525,430, filed May 16, 1990, now abandoned.

BACKGROUND OF THE INVENTION

The invention relates generally to computer operating systems, and deals more particularly with a distributed computer operating system to protect and recover distributed but functionally related resources including conversations.

This patent application is related to U.S. patent applications:

U.S. patent application Ser. No. 07/525,427, entitled "COORDINATED SYNC POINT MANAGEMENT OF PROTECTED RESOURCES" filed May 16, 1990 by M. K. Ainsworth et al., now U.S. Pat. No. 5,327,532;

U.S. patent application Ser. No. 07/526,471, entitled "OPTIMIZATION OF COMMIT PROCEDURES" filed May 16, 1990 by A. Coleman et al., now U.S. Pat. No. 5,261,089;

U.S. patent application Ser. No. 07/525,938, entitled "RECOVERY FACILITY FOR INCOMPLETE SYNC POINTS FOR DISTRIBUTED APPLICATION" filed May 16, 1990 by M. K. Ainsworth et al., now U.S. Pat. No. 5,319,774;

U.S. patent application Ser. No. 07/525,429, entitled "ASYNCHRONOUS RESYNCHRONIZATION OF A COMMIT PROCEDURE" filed May 16, 1990 by K. H. Britton et al., now U.S. Pat. No. 5,319,773;

U.S. patent application Ser. No. 07/525,939, entitled "REGISTRATION OF RESOURCES FOR COMMIT PROCEDURES" filed May 16, 1990 by A. Coleman, now U.S. Pat. No. 5,276,876; and U.S. patent application Ser. No. 07/526,472, entitled "COORDINATED HANDLING OF ERROR CODES AND INFORMATION DESCRIBING ERRORS IN A COMMIT PROCEDURE" filed May 16, 1990 by E. A. Pruul et al., now U.S. Pat. No. 5,165,031.

The operating system of the present invention can be used in a network of computer systems. Each such computer system can comprise a central, host computer and a multiplicity of virtual machines or other types of execution environments. The host computer for the virtual machines includes a system control program to schedule access by each virtual machine to a data processor of the host, and help to manage the resources of the host, including a large memory, such that each virtual machine appears to be a separate computer. Each virtual machine can also converse with the other virtual machines to send messages or files via the hosts. Each virtual machine has its own CMS portion of the system control program to interact with (i.e., receive instructions from and provide prompts for) the user of the virtual machine. There may be resources such as shared file system (SFS) and shared SQL relational databases which are accessible by any user virtual machine and the host.

Each such system is considered to be one real machine. It is common to interconnect two or more such real machines in a network, and transfer data via conversations between virtual machines of different real machines. Such a transfer is made via communication facilities such as AVS Gateway and VTAM facilities ("AVS Gateway" and "VTAM" are trademarks of IBM Corp. of Armonk, N.Y.).

An application can change a database or file resource by first making a work request defining the changes. In response, provisional changes according to the work request are made in shadow files while the original database or file is unchanged. At this time, the shadow files are not valid. Then, the application can request that the changes be committed to validate the shadow file changes, and thereby, substitute the shadow file changes for the original file. A one-phase commit procedure can be utilized. The one-phase commit procedure consists of a command to commit the change of the resource as contained in the shadow file. When resources such as SFS or SQL resources are changed, the commits to the resources can be completed in separate one-phase commit procedures. In the vast majority of cases, all resources will be committed in the separate procedures without error or interruption. However, if a problem arises during any one-phase commit procedure some of the separate commits may have completed while others have not, causing inconsistencies. The cost of rebuilding non-critical resources after the problem may be tolerable in view of the efficiency of the one-phase commit procedure.

However, a two-phase commit procedure is required to protect critical resources and critical conversations. For example, assume a first person's checking account is represented in a first database and a second person's savings account is represented in a second database. If the first person writes a check to the second person and the second person deposits the check in his/her savings account, the two-phase commit procedure ensures that if the first person's checking account is debited then the second person's savings account is credited or else neither account is changed. The checking and savings accounts are considered protected, critical resources because it is very important that data transfers involving the checking and savings accounts be handled reliably. An application program can initiate the two-phase commit procedure with a single command, which procedure consists of the following steps, or phases:

(1) During a prepare phase, each participant (debit and credit) resource is polled by the sync point manager to determine if the resource is ready to commit all changes. Each resource promises to complete the resource update if all resources successfully complete the prepare phase i.e. are ready to be updated.

(2) During a commit phase, the sync point manager directs all resources to finalize the updates or back them out if any resource could not complete the prepare phase successfully.

An IBM System Network Architecture SNA LU6.2 architecture reference SC31-6808 chapter 5.3 "Presentation Services—Sync Point Verbs", published by IBM Corp. was previously known to coordinate commits between two or more protected resources. This architecture previously addressed sync point facilities consisting of a sync point manager which performed both sync point and associated recovery processing running in a single application environment. Several applications could run simultaneously in this environment. The LU6.2 architecture supports a sync point manager (SPM) which is responsible for resource coordination, sync point logging and recovery. The prior art CICS/VS (trademark of IBM Corp. of Armonk, N.Y.) environment supports such an architecture. According to the SNA LU6.2 architecture prior art, in phase one and phase two, commit procedures are executed and the sync point manager logs the phase in the sync point log. Also, the sync point manager logs an identification number of a logical unit of work which is currently being processed. Such logging assists the sync point manager in resource recovery or resynchronization in the event that a problem arises during the two-phase commit procedure. If such a problem arises subsequent to entering the two-phase commit procedure, the log is read and resource recovery processing takes place to bring the resources involved in the commit procedure to a consistent state. The problems include failure of a communication path or failure in a resource manager.

The aforesaid LU6.2 sync point architecture is defined as one application execution environment. Every LU6.2 sync point environment runs applications for that environment. Data is typically owned by that environment and not shared outside of the environment, unless it is specifically extracted from the environment. The LU6.2 sync point architecture defines a sync point manager (SPM) model for resource coordination, recovery and sync point manager logging in a single environment. Similarly, in another prior art system control program, CICS/VS systems, sold by IBM Corp., all processes and most resources are owned by the execution environment rather than by the system.

In another prior art system control program, VM/SP Release 5 program, sold by IBM Corp. for supporting multiple (virtual machine) execution environments, two application programs could run in the same (virtual machine) execution environment. However, if the called application program committed file updates, this would cause the calling application program's file updates to be committed even if the files of the calling application program were not yet in a consistent state. There was no feature in this prior art system control program to separate the work of the calling application program from the work of the called application program. In addition, commits were limited to files and, through separate procedures, databases.

In a subsequent prior art system control program, VM/SP Release 6 program, also sold by the IBM Corp. for a virtual machine environment, two application programs running on the same virtual machine (execution environment) could define different work units for their files. As a result, the files accessed by one application could be committed independently of the files accessed by the other application, and the work of one application could be done independently of the work of the other application. Also, in this subsequent prior art system control program, one application (for example, a server) could have multiple work units concurrently. Nevertheless, the subsequent prior art system control program was limited in that although multiple resources could have the same work unit, the resource updates had to be committed independently. Furthermore, each work unit was confined to an execution environment (virtual machine).

In the CICS/VS prior art referenced above, a failure of an application or its partner or the connecting conversation and communications facilities, requires a predefined, unilateral decision for resolving sync points that are in the second stage of the two-phase commit, i.e. where a commit decision had been given to the sync point participants, but confirmation of the commit had not been received from all participants. Such a state is referred to as an in-doubt sync point state. In such cases, a unilateral recovery decision could result in damage to participating resources where the resources were changed inconsistently(one participating resource committed while another was backed out). For example, assume a sync point were in an in-doubt state when a failure occurred, such that a first participating resource manager had received the commit request from the sync point manager and processed the commit of its resource, and a second resource manager, participating in the same sync point, had not processed the commit. Assume also that the second resource manager, in the interest of clearing the in-doubt state so that normal resource processing could continue, decided to unilaterally back out the prepared sync point, thereby undoing any changes to the second resource. There results an inconsistency between the first and second resource relative to the intent of the using application(s). Such actions on the part of the second resource manager are not uncommon because resources are frequently locked during the sync point to prevent other users of the resource from accessing the resource until it is consistently changed and committed or backed out.

According to the CICS/VS prior art, there is one recovery facility associated with each sync point manager and it resides in the same execution environment as the sync point manager and the protected application; thus potentially there are multiple recovery facilities for a system that supports multiple execution environments. Likewise, each sync point manager requires a separate sync point log for supporting recovery from sync point failures. Thus for each execution environment in systems that support applications participating in coordinated recovery (sync point), there is a sync point manager that includes a recovery facility and a sync point recovery log.

Also, according to the CICS/VS prior art, log names are exchanged twice between sync point managers in separate execution environments that participate in a sync point procedure and communicate via conversations. The first exchange establishes a base for synchronizing the logs of participating sync point managers prior to beginning a sync point. The second exchange permits the recovery facility to verify, prior to beginning recovery from failed sync points, that the participating sync point managers have the same synchronized logs, insuring against a participant having had a log failure since first or initial log name exchange. There are separate logs for each execution environment, and log names are exchanged for every protected conversation, even conversations within one real machine.

Accordingly, a general object of the current invention is to provide an efficient system and process for exchanging log names for protected conversations and other resources i.e. to minimize the number of log name exchanges while insuring that all log failures are identified prior to beginning a recovery from a failed sync point procedure.

A more specific object of the present invention is to provide a system and process of the foregoing type which avoids log name exchanges for intrasystem conversations.

Another general object of the current invention is to provide a log name exchange system and process for resource managers that participate in sync point. This system and process should minimize the number of log name exchanges while insuring that all log failures are identified prior to beginning a recovery from a. failed sync point procedure.

SUMMARY OF THE INVENTION

The invention resides in a computer network comprising a first computer, a first recovery facility which serves the first computer and a first recovery log which supports the first recovery facility. The first log has two components, a log name log which stores the name or names of other logs involved in a commit scope and a sync point log which stores sync point state information which indicates the degree to which a two-phase commit procedure has progressed in the first computer. The network also includes a second computer, a second recovery facility which serves the second computer and a second recovery log which supports the second recovery facility. The second resource recovery log also includes a log name log and a sync point log. To support resource recovery, the names of the logs are exchanged prior to a request for sync point so that if a failure occurs during sync point, each recovery facility in the commit scope can verify that logs have not also failed before using the logs to recover the sync point failure. One or more communication facilities are interposed between the first and second computers and include a log name exchange table which records the previous exchanges of log names between the first and second computers. If a protected conversation is sent from the first computer to the second computer and log names were not previously exchanged, then one or more of the communication facilities intercepts the conversation and holds it until log names are exchanged. However, if log names were previously exchanged, then the conversation is not intercepted and log names are not again exchanged. The log name exchange is optimized to avoid unnecessary exchanges.

The invention also resides in resource recovery between a computer and a resource manager located in the same or different system. There is a recovery facility which serves the first computer and a first resource log which supports the first recovery facility. A second recovery log supports the resource manager. Log names are exchanged between the computer and resource manager so that if a failure occurs during a sync point request, the computer and the resource manager can identify each others log before using them to recover from the sync point failure. The log name exchange is optimized to avoid unnecessary exchanges.

BRIEF DESCRIPTION OF THE FIGURES

FIG. 4 is a flowchart of recovery processing that is implemented when an interruption occurs during the two-phase commit procedure described in FIG. 3.

FIGS. 8, 8(A) and 8(B) are a flowchart illustrating the use of local work units and the global logical unit of work of FIG. 7 by another related application environment of FIG. 2 to define the scope of and facilitate commit processing.

FIG. 19 is a block diagram illustrating the components and procedure for exchanging log names to support recovery of a failed commit procedure when a protected conversation is made between an application in one system and a partner application in another system of FIG. 2.

FIGS. 46, 46(A) and 46(B) are a flowchart providing detail for FIG. 36, step 317.

FIGS. 48, 48(A) and 48(B) are a flowchart providing detail for FIG. 36, step 319.

FIG. 53A is a flow graph illustrating the steps of asynchronous, resynchronization-in-progress process involving a failed prepare call originating from system 50A.

FIGS. 54, 54(A) and 54(B) are a block diagram of another embodiment of the invention as an alternate to FIG. 2.

DETAILED DESCRIPTION OF THE PREFERRED EMBODIMENTS

Figure 1:
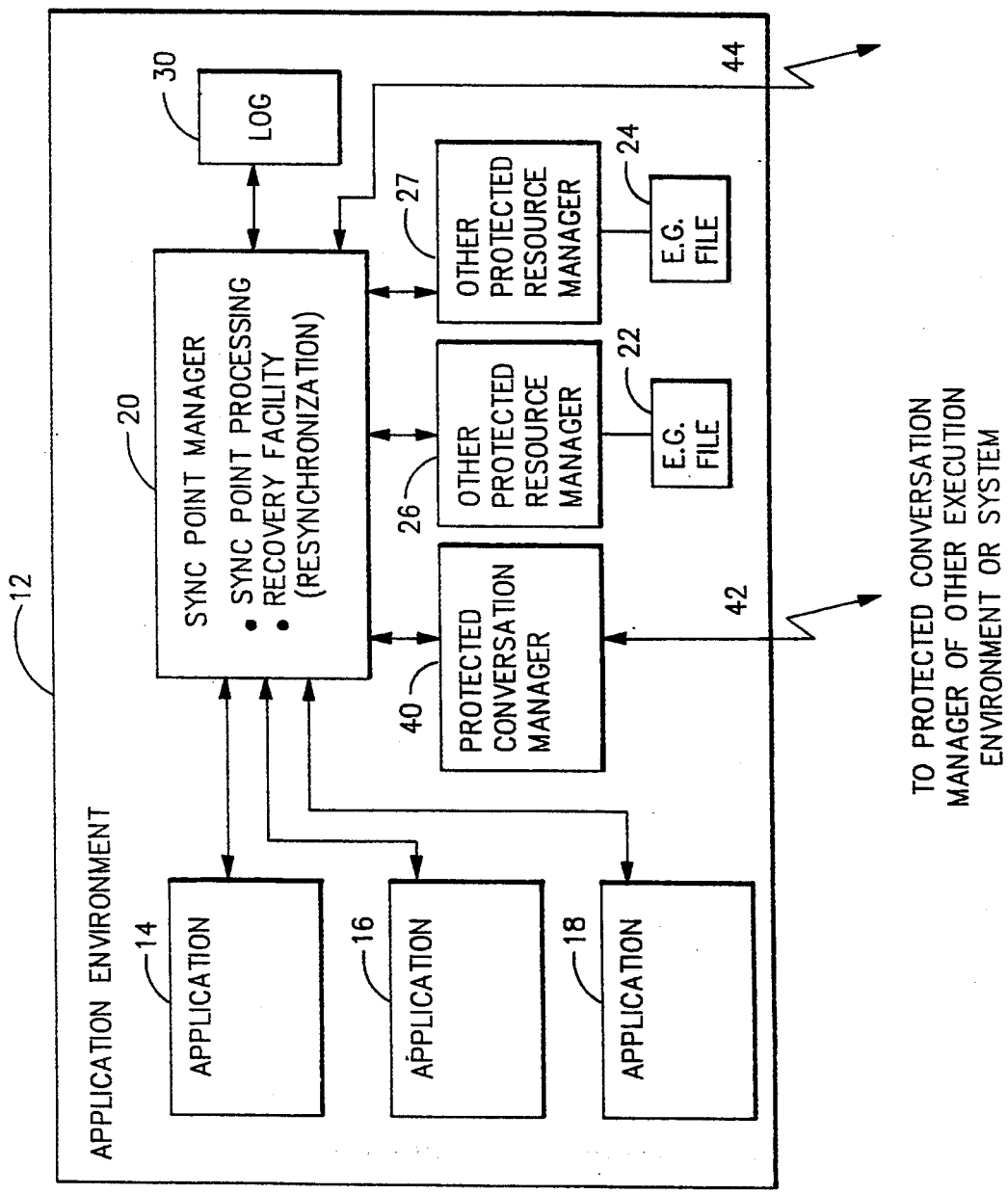
FIG. 1 is a block diagram of a computer system which incorporates all commit and recovery functions in each execution environment, according to the prior art.

Referring to the drawings in detail wherein like reference numerals indicate like elements throughout the several views, FIG. 1 illustrates an LU 6.2 syncpoint tower model or architecture according to the Prior Art. This architecture is defined as one execution environment. In the illustrated example, three application programs 14, 16, and 18 are run in execution environment 12 in a time-shared manner. Resource Managers 26 and 27, DB/2 or CICS File Control (DB/2 and CICS are trademarks of IBM Corp.), control access to resources 22 and 24, respectively. It should be noted that if a DB/2 (CICS/MVS operating system) or a SQL/DS (CICS/VSE operating system) resource manager were located outside of environment 12, then environment 12 would include a resource adapter to interface to the resource manager according to the prior art. In this prior art architecture, application program 14 makes a work request invoking resources 22 and 24 to syncpoint manager 20 before requesting committal of resources involved in the work request.

Next, application program 14 requests a commit from syncpoint manager 20 to commit the data updates of the previous work request. In response, syncpoint manager 20 implements a two-phase commit procedure by polling resource managers 26 and 27 to determine if they are ready to commit the resources and if so, to subsequently order the commit. At each phase (and each step of each phase) of the two-phase commit procedure, the syncpoint manager transfers syncpoint information to log 30 indicating the state of the two-phase commit procedure. If a failure occurs during the two-phase commit procedure, the syncpoint manager will implement a synchronization point recovery procedure to bring the resources to a consistent state. The syncpoint manager relies on the synchronization point information in log 30 to determine how far the two-phase commit procedure had progressed before interruption.

Syncpoint manager 20 and the two-phase commit procedure are also used when any one of the applications 14, 16 or 18 attempts to communicate via protected conversation manager 40 using a protected conversation to an application partner in a separate environment in the same system (not shown) or to an application partner within another system (not shown) which is interconnected via a communication facility.

According to the prior art synchronization point architecture, this other system/other environment is functionally identical to the execution environment 12 and includes another syncpoint manager functionally identical to 20, another synchronization point log functionally identical to 30, another protected conversation manager functionally identical to 40 and other resource managers functionally identical to 26 and 27. This other environment provides coordination and recovery functions which are separate from those of execution environment 12.

COORDINATED SYNC POINT MANAGEMENT OF PROTECTED RESOURCES

Figure 2:
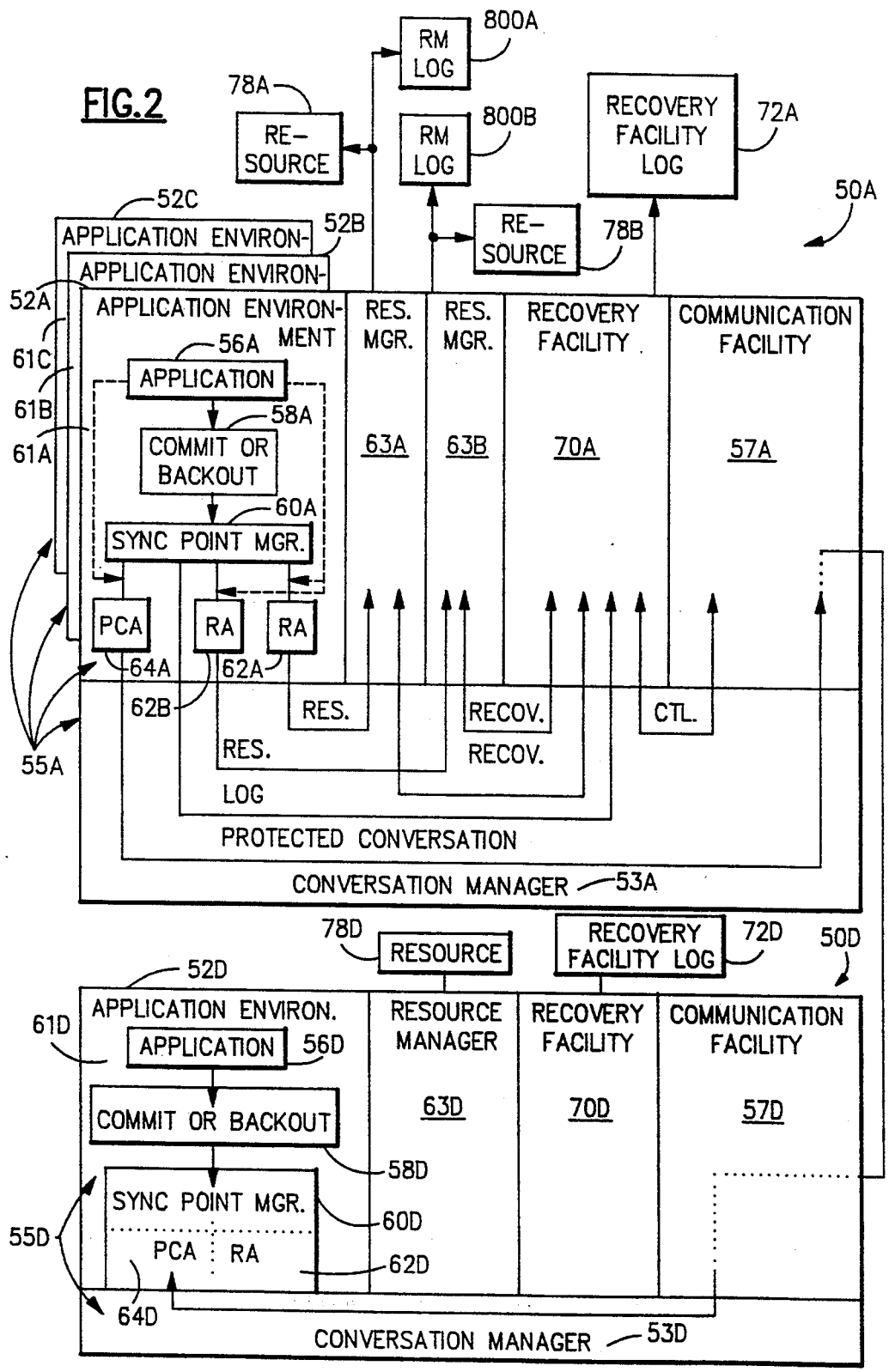
FIG. 2 is a block diagram of a computer network including two interconnected computer systems according to the present invention. Each of the systems supports multiple execution environments with a common recovery facility and log.

FIG. 2. illustrates a syncpoint architecture according to the Present Invention. The invention includes a distributed computer operating system which supports distributed and non-distributed applications executing within their own execution environment such as a UNIX environment, OS/2 environment, DOS environment in OS/2 operating system, CMS environment in VM operating system, AIX environment in VM operating system, CICS in VM operating system, and MUSIC environment in VM operating system. A distributed application is distinguished by using a resource in another execution environment or having a communications conversation - a special type of resource - with an application partner in another execution environment. The execution environment for the resource manager or application partner may be in the same system or a different one; it can be in the same type environment or a foreign environment. A distributed application execution environment comprises one or more systems supporting applications in their own environments that might not have all the resources required; those resources are distributed elsewhere and are acquired with the aid of a communication facility. The complete environment of a distributed application appears to be full function because the distributed application involves resources that are in other environments-especially the recovery facility and communication facility.

The present invention comprises one or more systems (real machines or central electronic complexes (CECs)) 50 A, D. In the illustrated embodiment, system 50A comprises a plurality of identical, distributed application environments 52A, B, and C, a conversation manager 53A and execution environment control programs 61A,B, and C which are part of a system control program 55A, and a recovery facility 70A. By way of example and not limitation, each of the environments 52A, B, and C can be an enhanced version of a VM virtual machine, recovery facility 70A can reside in another enhanced version of a VM virtual machine and system control program 55A can be an enhanced version of a VM operating system for virtual machines 52A, B, and C. Applications running in distributed application environments 52 A-C in real machine 50A can communicate with application partners running in similar distributed application environments running in real machine 50D or other systems (not shown) via communication facilities 57A and D. By way of example, communication facility 57A comprises Virtual Telecommunications Access Method ("VTAM") facility and APPC/VM VTAM Support (AVS) gateway facility. Each distributed application environment 52 comprises a single syncpoint manager (SPM) 60A and a plurality of protected resource adapters 62A-B and 64A. A syncpoint manager allows a group of related updates to be committed or backed out in such a way that the changes appear to be atomic. The updates performed between syncpoints (i.e.commit/backout) are called a logical unit of work and the related updates are identified through a unique name assigned by the syncpoint manager via the recovery facility called a logical unit of work identifier. The logical unit of work can involve multiple protected resources accessed by an application in the same distributed application environment and can also involve protected resources accessed by a partner application in other application environments via a conversation which is one type of protected resource.

A conversation is a path established in an architected manner between two partner applications. The use of the conversation by each application is determined by the applications' design and the conversation paradigm used. When a conversation is to be included in the syncpoint process, it is called a protected conversation. Protected resources become part of the logical unit of work by contacting the syncpoint manager through a process called registration as described below in *Registration of Resources for Commit Procedure*. Each protected resource adapter provides an interface to a resource manager both for an application and for the syncpoint manager. (Alternatively, the protected resource adapter can be merged with the resource manager if the resource manager resides in the same execution environment as the application.)

In the illustrated embodiment, protected resources are fries and conversations. In other embodiments of the present invention, protected resources could be database tables, queues, remote procedure calls, and others. Protected resource adapters 62A and B handle interfaces on behalf of application 56A for resource managers 63A and B, respectively, which manage files 78A and B. Resource managers 63A and B are located in the same system. Alternatively, they could reside in a different system in a communication network. In the illustrated embodiment, conversations are managed by a conversation manager which manages the conversations or paths from an application to other partner applications running in different distributed application environments in the same system, or different distributed application environments in different systems in a communication network. If the protected conversation is between two application partners running in different application environments in the same system, e.g. between application partners running in 52A and 52B, then the conversation manager is totally contained in the system control program 55A of system 50A, and communication is made between the application partners via each protected conversation adapter 64A and 64B (not shown). If the protected conversation is between different application environments in different systems, e.g. between application partners running in 52A and 52D; then communication is made between the conversation managers 53A and 53D in systems 50A and 50I) via communication facilities 57A and 57D. In this embodiment, such communications utilize a peer to peer communication format. Conversation managers 53A, D use an intra-environment format to communicate with communication facilities 57A, D. Communication facilities 57A, D translate the intra-environment format to an architected intersystem communication standard format and vice versa. By way of example this architected intersystem communication standard format can be of a type defined by IBM's System Network Architecture, LU 6.2 protocol.

Recovery facility 70A serves all distributed application environments 52A,B, and C within real machine 50A. It contains log 72A, its processes handle logging for the syncpoint managers 60A, B, and C and it provides recovery for failing syncpoints for all distributed application environments 52A, B, and C. The same is true for recovery facility 70D and its log 72D, and syncpoint manager 60D on system 50D.

When application 56A within distributed application environment 52A desires to update fries 78A and 78B, application 56A makes two separate update requests via a file application program interface within application 56A. The requests invoke protected file resource adapters (henceforth called protected file adapter for this type of resource) 62A and 62B respectively for files 78A and 78B (step 500 of FIG. 3). Based on resource manager specific implementation, the protected file adapter knows the file is protected. If not already registered with the syncpoint manager for the work unit, protected file adapters 62A and 62B register with syncpoint manager 60A the fact that they want to be involved in all Commit/Backout requests for this work unit (step 502). A "work unit" is a grouping of all resources, directly accessible and visible by the application, that participate in a sync point. It is generally associated with a logical unit of work identifier. For a further explanation of work units, see *Local and Global Commit Scopes Tailored to Work Units* below. Then protected file adapters 62A and 62B contact their respective resource managers 63A and 63B to update files 78A and 78B (Step 504). Return is made to application 56A. Next application 56A requests a syncpoint 58A, i.e. a commit in this case, to syncpoint manager 60A (Step 506). In response, syncpoint manager 60A initiates a two-phase commit procedure (step 508) to be carried out for both of its registered resources, fries 78A and 78B, represented by protected file adapters 62A and 62B and their respective resource managers 63A and 63B. In step 508, syncpoint manager 60A calls each of its registered resources at the adapter exit syncpoint exit entry point, given to the syncpoint manager by each resource adapter during registration, with a phase one "prepare" call.

During the course of executing its two-phase commit procedures, syncpoint manager 60A issues a request to recovery facility 70A to force log ("force log" means to make sure the information was written to the actual physical device before returning to syncpoint manager 60A) on log 72A phase one syncpoint manager information (Step 508). This information includes the logical unit of work identifier, the syncpoint manager state and the names and other pertinent information about each registered protected resource adapter participating in the commit request. This information was given to syncpoint manager 60A when file adapters 62A and 62B registered. Syncpoint manager 60A's state is determined by the rules of the two-phase commit paradigm being followed. For example, the two-phase commit paradigm is of a type described by *System Network Architecture LU 6.2 Reference: Peer Protocols*, SC31-6808, Chapter 5.3 *Presentation Services—Sync Point verbs* published by the IBM Corporation. If a failure occurs during the syncpoint processing, the syncpoint manager state is used to determine the outcome (Commit or Backout) of the logical unit of work. As per the rules of the two-phase commit paradigm used by this embodiment, the syncpoint manager phase one state is, Initiator, Syncpoint Manager Pending. If the first phase of the two-phase commit procedure is not interrupted and is completed (decision block 512), syncpoint manager 60A issues a second request to recovery facility 70A to force log 72A to its phase two state. Based on the replies from the protected file adapters and resource managers and the rules of the two-phase commit paradigm being used, syncpoint manager 60A knows its second phase decision. In this embodiment, the paradigm is as follows. If one or more protected resources adapters respond "backout" to the phase one request, the phase two decision is "backout"; if all respond "request commit", the decision is "commit". In the example illustrated in FIG. 3, protected file adapters 62A and 62B responded "request commit" (Step 510) and the phase two state is logged by syncpoint manager 60A as Initiator Committed. It should be noted that in this example, file managers 63A and 63B after replying "request commit" through their respective file adapters 62A and 62B to the phase one request are in a state of "indoubt", that is they can commit or backout the file updates based on the phase two decision from syncpoint manager 60A.

After logging, syncpoint manager 60A then issues the phase two call with the decision of commit to protected file adapters 62A and 62B (Step 513). When the file managers 63A and 63B receive the phase two commit decision, each proceeds to do whatever processing is necessary to commit the data, i.e. make the updates permanent (Step 516). When a successful reply is received from protected file adapters 62A and 62B on behalf of their respective resource managers and there is no interruption in syncpoint processing (decision block 514), syncpoint manager 60A calls recovery facility 70A to write to log 72A the state of "forget" for this logical unit of work (Step 515). This does not have to be a force log write which means the log record is written to a data buffer and return can be made to syncpoint manager 60A. The buffer can be written to the physical media at a later point in time. Based on the two phase commit paradigm used in this embodiment, syncpoint manager 60A updates the logical unit of work identifier (increments it by one) which guarantees uniqueness for the next logical unit of work done by application 56A. The syncpoint manager then returns to application 56 (Step 515A).

The two-phase commit paradigms have rules for recovery processing, such that recovery facility 70A knows how to complete an interrupted syncpoint (Step 517 and FIG. 4). If syncpoint manager 60A's process was interrupted, decision block 514 leads to step 517 in which syncpoint manager 60A contacts recovery facility 70A. In step 517 recovery facility 70A receives the logical unit of work identifier and information about the associated failed resource or resources from syncpoint manager 60A. Recovery facility 70A then finds the correct log entry (Step 518 of FIG. 4). The log information, in combination with the two phase commit paradigm being used, allows recovery facility 70A's procedures to complete the interrupted syncpoint processing (Step 519). Based on the two-phase commit paradigm being used in this illustrated example, if the syncpoint state entry for the logical unit of work identifier on log 72A is Initiator, Syncpoint Manager Pending, each failed resource manager 63A or 63B will be told to backout; otherwise, each will be told the syncpoint manager phase two state which is on the log, i.e. commit or backout (Step 520). Once the recovery state is determined, recovery facility 70A will start recovery processes with each failed protected resource manager as described below in *Log Name Exchange For Recovery of Protected Resources* and in *Recovery Facility For Incomplete Sync Points For Distributed Application*. This processing consists of exchanging log names and a comparison of states whereby the recovery process of recovery facility 70A tells the failed resource manager 63A or 63B what to do, i.e. commit or backout, and the resource manager 63A or 63B tells the recovery process what it did. The recovery process of recovery facility 70A knows how to contact the failed resource based on information written by syncpoint manager 60A during its phase one logging activity. If the failed resource manager can be contacted (decision block 521) recovery takes place immediately (Step 522). After recovery takes place with each failed resource (decision block 523) return can be made to syncpoint manager 60A (Step 523A). Syncpoint manager 60A will then return to the application 56A (Step 515A). If the failed resource manager could not be contacted, decision block 521 leads to decision block 524 in which recovery facility 70A checks to see if it must complete the recovery processing before returning to application 56A. This decision is based on information contained in the log record for the logical unit of work written by the syncpoint manager during phase one logging. If it must complete recovery, the recovery process keeps trying to contact the failed resource (Step 525); if it can complete the recovery at a later point in time, i.e. wait for recovery was previously selected, recovery facility 70A returns to syncpoint manager 60A with the intent of the recovery processing (i.e. commit or backout) and an indication that the recovery will be completed later (Step 526) as described below in *Asynchronous Resynchronization of a Commit Procedure*. When all resources are recovered (Step 525A), syncpoint manager 60A returns to application 56A (Step 515) with this information.

Figure 5A:
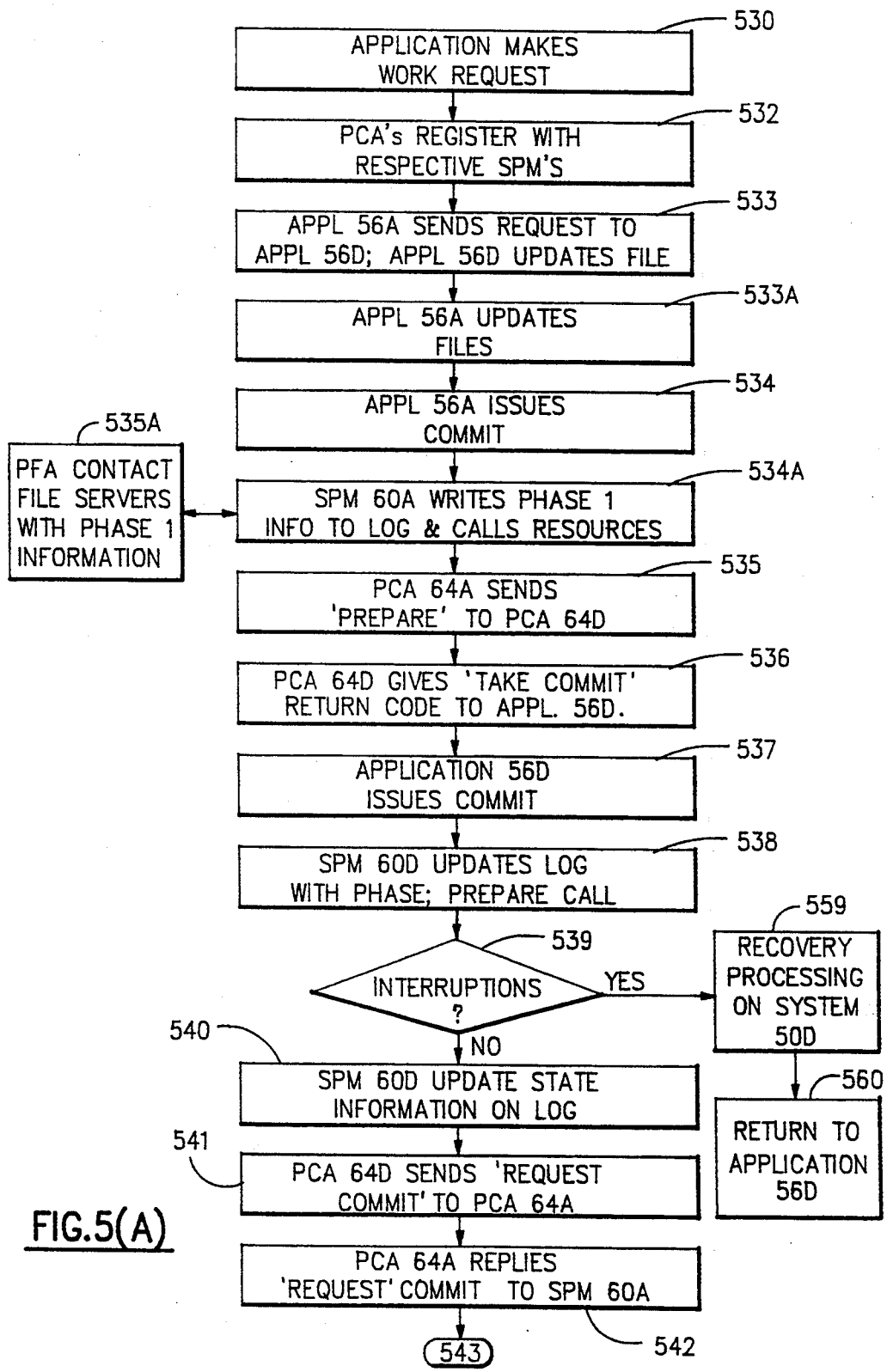
FIGS. 5 (A) and 5 (B) are a flowchart of a two-phase commit procedure for resources used by partner applications running in two distributed application environments connected by a protected conversation supporting sync point facilities of FIG. 2.

FIG. 2 also illustrates that application 56A can be part of a distributed application. This means there is at least one partner application that can work with application 56A to complete its processing. To establish a distributed application, application 56A initiates a protected conversation which starts partner application 56D in system 50D by invoking the application program conversation initiate interface and indicates the conversation is to be protected (FIG. 5a, Step 530). This request is handled by protected conversation adapter 64A. Protected conversation adapter 64A asks syncpoint manager 60A for the logical unit of work identifier and includes it along with a unique conversation identifier in the information sent to the remote system 50D. Protected conversation adapter 64A then sends the request to the conversation manager 53A which sends it to communications facility 57A. Protected conversation adapter 64A gets an indication that the conversation initiate request was (or will be ) sent from communications facility 57A to communications facility 57D. At this time protected conversation adapter 64A registers with syncpoint manager 60A (Step 532). Asynchronously to tiffs registration process, the conversation initiate request is transmitted to communication facility 57D, and then to conversation manager 53D, and then to protected conversation adapter 64D (Step 532 of FIG. 5A). Protected conversation adapter 64D retrieves the logical unit of work identifier and unique conversation identifier and registers with syncpoint manager 60D on behalf of the conversation manager (Step 532). Protected conversation adapter 64D at this time also gives syncpoint manager 60D the logical unit of work identifier it received on the conversation initiate request. Protected work done by application 56D will be associated with tiffs logical unit of work originally started by application 56A (Step 532). The logical unit of work identifier will also be assigned to a new work unit for application 56D and application 56D is started.

Thus, applications 56A and 56D are partner applications, and together they are called a distributed application. The protected conversation allows application 56A and 56D to send and receive data in a peer to peer manner. This means each side, application 56A or application 56D, can originate the send or receive which is determined by the application writer and the paradigm being used by the communication manager. As described above, a protected conversation is registered with both syncpoint managers by protected conversation adapters 64A and 64D, respectively. During syncpoint processing for the application that issued the first commit, a protected conversation adapter represents a resource to the syncpoint manager that must respond if it can commit (first phase) and whether or not it successfully performed the work requested (second phase). To the other protected conversation adapter receiving the first phase call from its partner protected conversation adapter, the protected conversation is a partner syncpoint manager over which it will receive phase one and phase two orders. Its local syncpoint manager acts like a resource manager, that is the protected conversation adapter will get the results of what the syncpoint manager's resources did (phase one and phase two). It should be noted that the syncpoint paradigm used provides rules for which application partner can issue the first commit. In tiffs example, any application partner can issue the commit first and this is determined by the distributed application design.

Application 56A gets control with the indication that the request to start was successfully sent by communication facility 57A. At this point application 56A is able to send requests to application 56D and application 56A sends a request to application 56D over the established conversation. In this illustrated example, this request eventually causes application 56D to invoke a file application program interface to update file 78D. As described above, the update request causes protected file adapter 62D to register with syncpoint manager 60D under the same work unit (previously assigned for application 56D (Step 532) when application 56D was started) (Step 533). Also in step 533, application 56D sends a reply to application 56A over the conversation indicating that it completed its work. Next, application 56A issues update requests for files 78A and 78B. As previously described, protected file adapters 62A and 62B had previously registered with syncpoint manager 60A and they each contact resource managers 63A and 63B to perform the updates(Steps 533 and 533A).

Application 56A now issues a commit 58A to syncpoint manager 60A (Step 534). As described above, syncpoint manager 60A contacts recovery facility 70A for its phase one logging and issues a phase one "prepare" call to each registered resource (Steps 534A and 535A). Protected file adapters 62A and 62B behave as described above. When protected conversation adapter 64A receives the phase one "prepare" call, it sends an intersystem architected "prepare" call over the protected conversation it represents, i.e. the one originally established by application 56A to application 56D (Step 535). Protected conversation adapter 64D recognizes this "prepare" call and gives application 56D, which had issued a conversation message receive call, a return code requesting it to issue a commit (Step 536). Application 56D then issues a commit 58D to syncpoint manager 60D (Step 537). As described above, syncpoint manager 60D contacts its recovery facility, in this case recovery facility 70D to force log 72D with phase one information (Step 538). Because application 56A issued the original commit request which caused application 56D to subsequently issue a commit, and based on the two-phase commit paradigm used in this embodiment, syncpoint manager 60D's phase one state is "Initiator Cascade, Syncpoint Manager Pending" (Step 538). Syncpoint manager 60D contacts protected file adapter 62D with a phase one "prepare" call (Step 538). Protected file adapter 62D and its associated resource manager 63D perform phase one processing as previously described and returns a reply of "request commit".

Figure 5B:
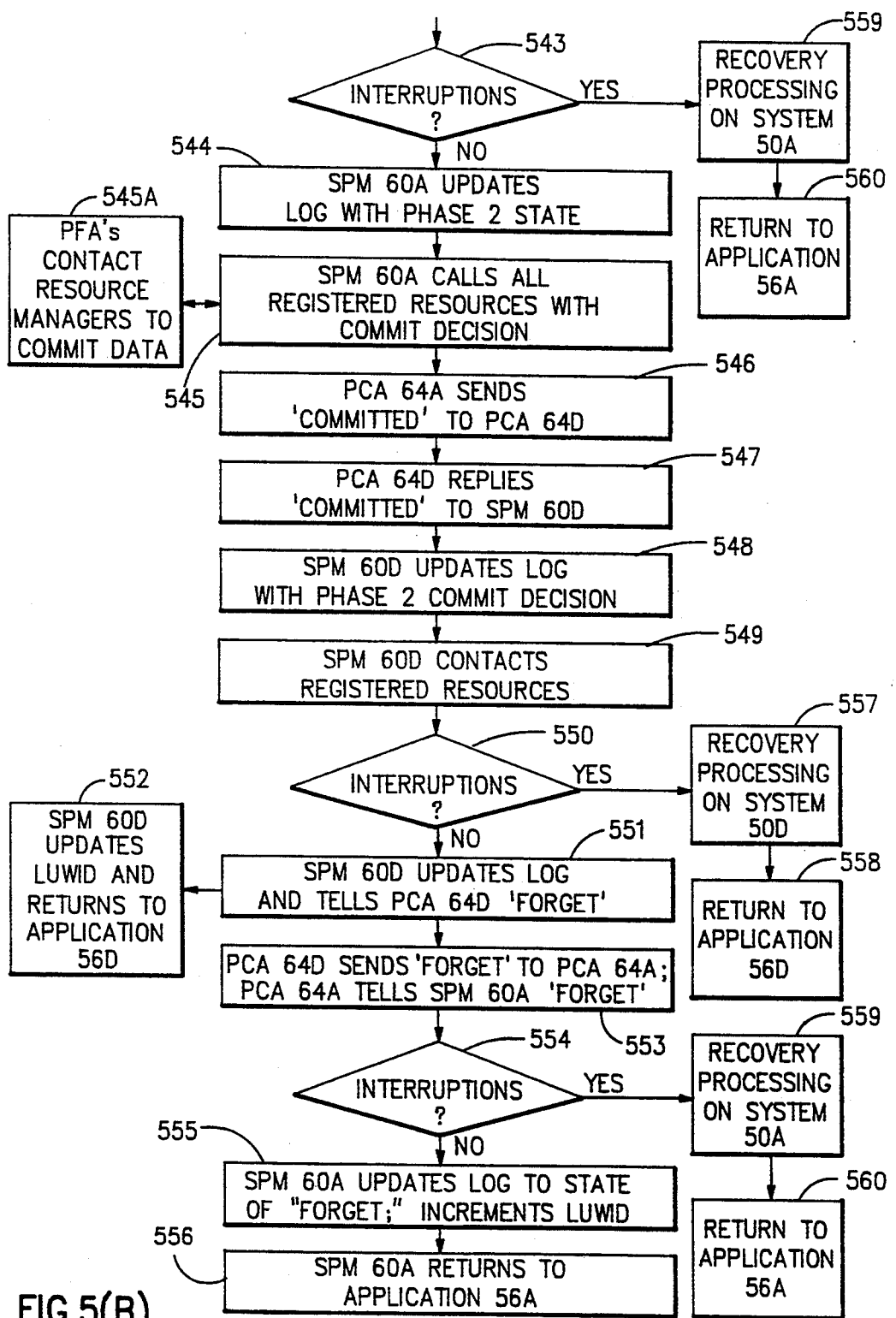

In this example, there were no interruptions and decision block 539 leads to step 540 in which syncpoint manager 60D contacts recovery facility 70D to force log 72D to a state of "Agent, Indoubt". This state means that if an interruption subsequently occurs such that syncpoint manager 60D does not receive the phase two decision from syncpoint manager 60A, it would have to wait for recovery processing from recovery facility 70A to complete its syncpoint processing. Syncpoint manager 60D then contacts protected conversation adapter 64D with a reply of "request commit". Protected conversation adapter 64D then sends an intersystem architected "request commit" reply to protected conversation adapter 64A (step 541) which in turn replies "request commit" to syncpoint manager 60A (Step 542). As described above, syncpoint manager 60A received "request commit" from protected file adapters 62A and 62B (Step 535A). Since there are no interruptions in the illustrated example, decision block 543 leads to step 544 in which syncpoint manager 60A contacts the recovery facility 70A to force log 72A to a phase two state of "Initiator, committed" (Step 544). Syncpoint manager 60A then calls each registered protected resource adapter with the phase two decision of "Committed" (FIG. 5b, Step 545). Protected file adapters 62A and 62B process the commit decision as described above (Step 545A). When protected conversation adapter 64A receives the commit decision, it sends an intersystem architected "committed" call over the protected conversation it represents, i.e. the one originally established by application 56A to application 56D (Step 546). Protected conversation adapter 64D receives the "commit" call and replies to syncpoint manager 60D the phase two decision of "commit" (Step 547).

As described above syncpoint manager 60D contacts recovery facility 70D to force log 72D to the phase two state. Because application 56A issued the original commit request which caused application 56D to subsequently issue a commit, and based on the two-phase commit paradigm used in this embodiment, syncpoint manager 60D's phase two state is "Initiator Cascade, Committed" (Step 548). Syncpoint manager 60D contacts protected file adapter 62D with the phase two commit decision. (Step 549). Protected file adapter 62D and its associated resource manager 63D perform commit processing as previously described and returns a reply of "forget". Since there were no interruptions (decision block 550), syncpoint manager 60D contacts resource facility 70D to log in log 72D a state of "Forget" for the syncpoint log record for this logical unit of work (Step 551). "Forget" means that syncpoint processing is complete and the log record can be erased. Syncpoint manager 60D then contacts protected conversation adapter 64D with a reply of "forget". Based on the two-phase commit paradigm used in this embodiment, syncpoint manager 60D increments the logical unit of work identifier by one and returns to application 56D with an indication that the commit completed successfully. (Step 552). Updating the logical unit of work identifier guarantees uniqueness for the next logical unit of work done by the distributed application.

Next, protected conversation adapter 64D sends an intersystem architected "forget" reply to protected conversation adapter 64A which in turn replies "forget" to syncpoint manager 60A (Step 553). As described above syncpoint manager 60A also receives "forget" replies from protected file adapters 62A and 62B (Step 545A). Assuming there are no interruptions, decision block 554 leads to step 555 in which syncpoint manager 60A contacts recovery facility 70A to log in log 72A a state of "forget" for this logical unit of work. Again based on the paradigm of the two-phase commit process being used, syncpoint manager 60A then increments the logical unit of work identifier by one (Step 556). This change guarantees a new unique logical unit of work identifier for the distributed application. Syncpoint manager 60A then notifies application 56A that the Commit request completed successfully. If during the two-phase commit procedure, the syncpoint processing was interrupted in either syncpoint manager 60A, syncpoint manager 60D or both, recovery facility 70A and recovery facility 70D would implement a recovery operation which is represented in the logical flow by steps 557, 558 and 559, 560 and is more fully described below in *Log Name Exchange For Recovery of Protected Resources, Recovery Facility For Incomplete Sync Points For Distributed Application, and Asynchronous Resynchronization of a Commit Procedure.*

Figure 54A:
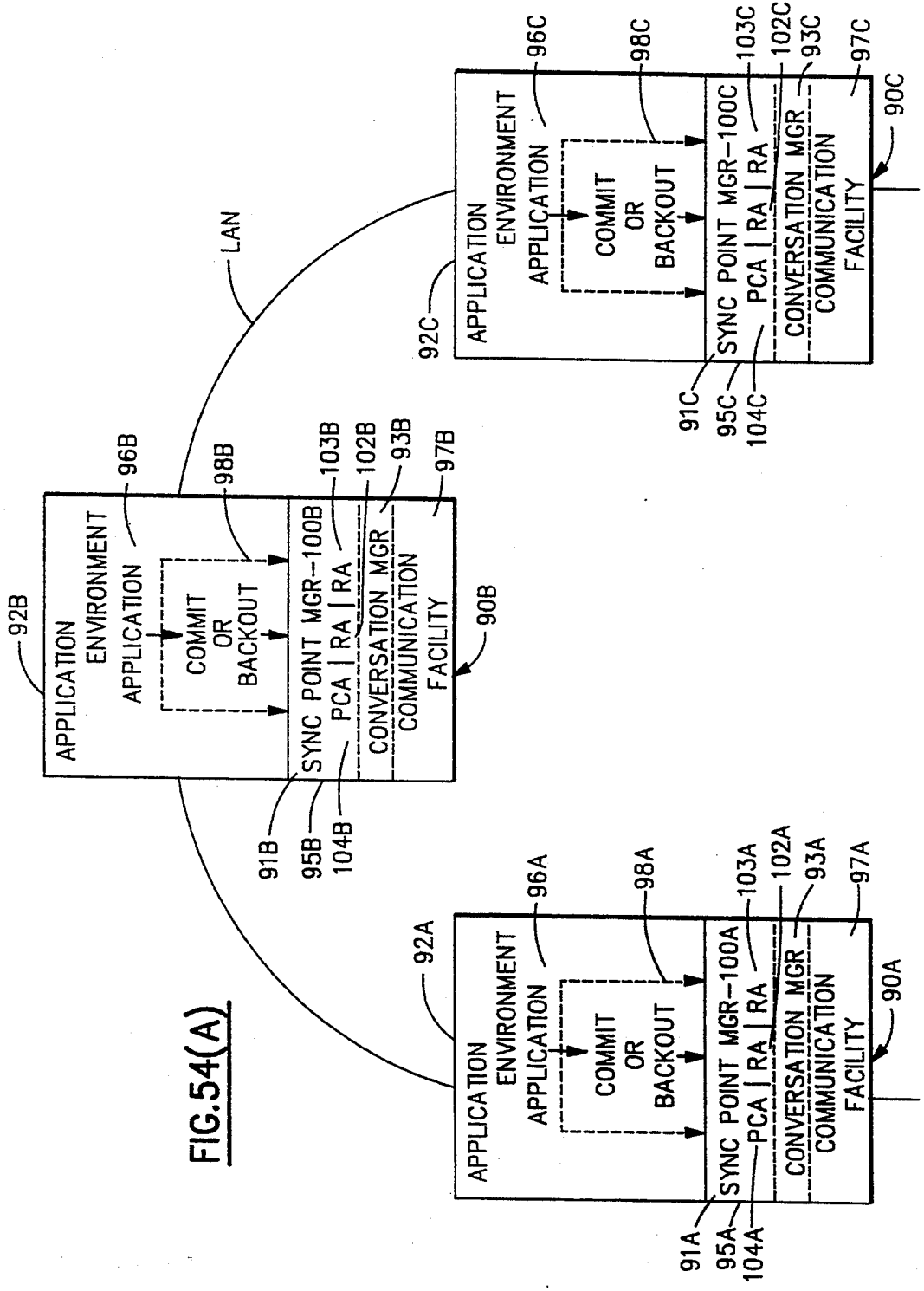

FIG. 54 is an alternate embodiment to that illustrated in FIG. 2 and can best be described by comparison to FIG. 2. In both FIG. 2 and FIG. 54, application environments, system facilities, and resource managers are distributed. However, in FIG. 2 one physical device, system 50A, contains multiple application environments, 52A, B, C, two resource managers 63A, B, recovery facility 70A and communication facility 57A. FIG. 2 shows that System Control Program 55A contains the conversation manager 53A and the Syncpoint Manager 60A, B, C. System 50A of FIG. 2 can be a mainframe computer and configurations of this type are often called centralized computing. Also, FIG. 2 shows application environments in system 50A connected to application environments in system 50D through a communication network. In contrast, FIG. 54 shows each application environment, system facility and resource manager in a separate physical machine. This configuration is called distributed computing. In this environment systems 90A, B, C, 110E, 114F, and 120G are programmable workstations similar in function but not necessarily similar in size and power to systems 50A, D of FIG. 2. The systems of FIG. 54 are connected by a communication network which, for example, is a local area network (LAN). Application environments 92A, B, and C of FIG. 54 are functionally equivalent to application environments 52A, B, and C of FIG. 2. However, each application environment 92A, B, and C is contained in a separate programmable workstation. Each system control program 95A, B, and C of FIG. 54 is functionally equivalent to system control program 55A of FIG. 2. Each system control program 95A, B, and C contains (a) a Syncpoint Manager 100A, B, or C which is functionally equivalent to Syncpoint Managers 60A,B, and C, (b) execution environment control programs 91A, B, and C which are functionally equivalent to execution environment control programs 61A, B, and C, (c) protected conversation adapters (PCA) 104A, B, and C which are functionally equivalent to PCA 64A, B, and C, (d) resource adapters (RA) 102A, B, C and 103 A, B, C which are functionally equivalent to resource adapters 62A, B, and (e) conversation managers 93A, B, C which are functionally equivalent to conversation managers 53A, B, C and communication facilities 97A, B, C each of which is functionally equivalent to communication facility 57A. However, in the example of FIG. 54, the communication facility is part of each system control program 95A, B, and C and not in its own execution environment. Also in FIG. 54, resource managers 112E and 113F and their respective files/logs 115E, 116E and 117F, 118F are functionally equivalent to resource managers 63A and 63B and their respective files/logs 78A, 800A and 78B, 800B of FIG. 2. However, resource managers 112E and 113F are each on separate programmable workstations. Recovery facility 121 G and its log 122G in FIG. 54 are functionally equivalent to recovery facility 70A and its log 72A in FIG. 2. However,recovery-facility 121G is in a programmable workstation. System 50D of FIG. 54 is the same as system 50D of FIG. 2 and is included to show the versatility of the network. A description of syncpoint processing in this environment can be obtained by substituting the correct numbers from FIG. 54 for the corresponding numbers from FIG. 2 as just described into the syncpoint processing description above. Thus, there are a wide range of computer systems and networks in which the present invention can reside.

It is possible in system 50A, FIG. 2, for recovery facility 70A to become unavailable for a variety of reasons. Accordingly, system 50A provides back-ups. For example, if recovery facility 70A is part of an execution environment which also controls a resource manager and the resource manager encounters a disabling failure, then recovery facility 70A will also become inoperational. In the example illustrated in FIG. 28, system 50A includes more than one execution environment dedicated to a resource manager, and each execution environment containing the resource manager also contains a recovery facility program, although only one recovery facility in a system may be active at one time.

Figure 28:
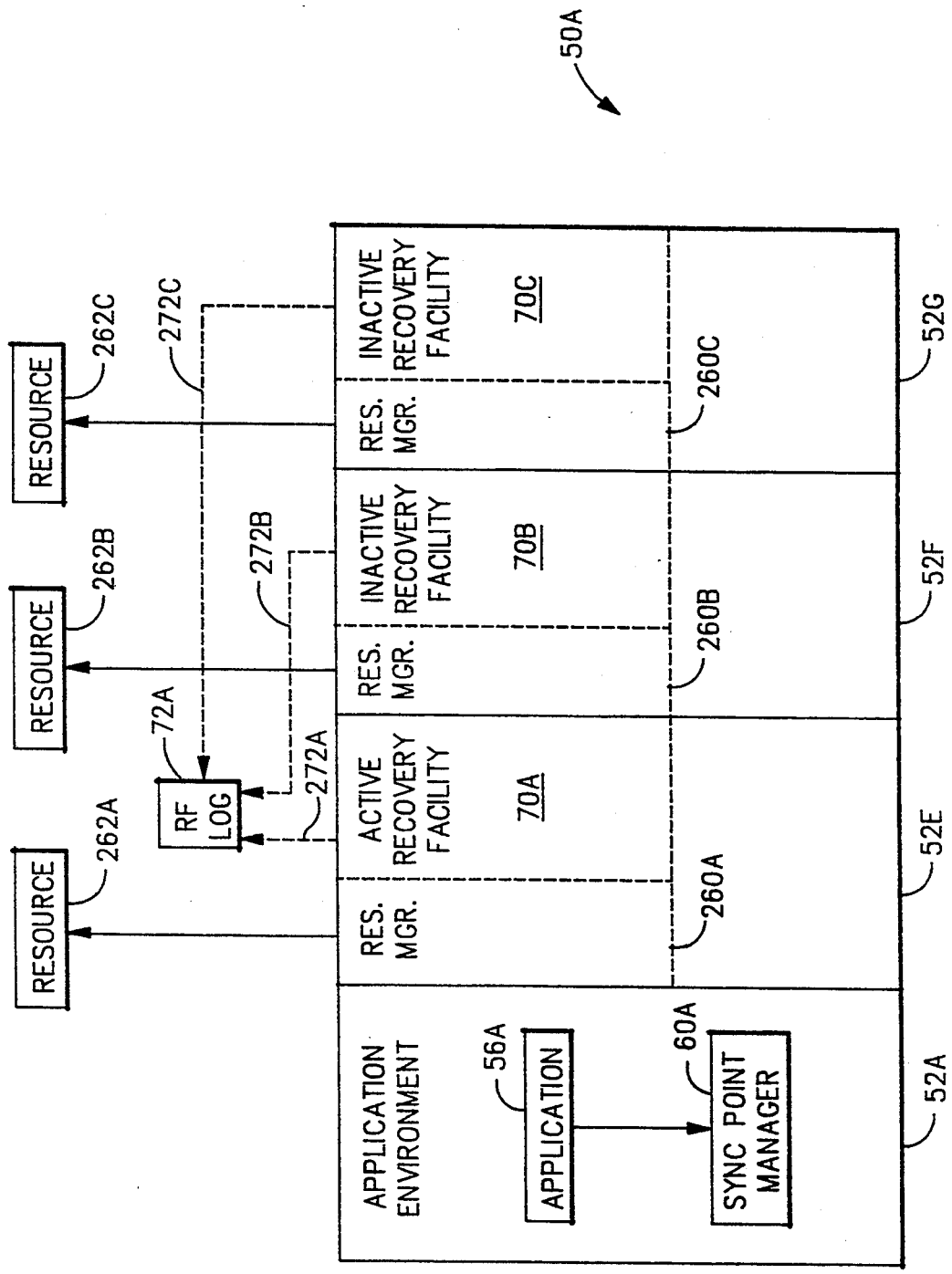
FIG. 28 is a block diagram illustrating portability of the sync point log and capability for activating back up recovery facilities.

Specifically, FIG. 28 illustrates that in system 50A there are three identical execution environments 52E, 52F and 52G each containing a resource manager (program) 260A, 260B and 260C, respectively. Preferably, each resource manager 260A, 260B and 260C is an enhanced version of the *Shared File System (SFS) resource manager of the VM/SP Release 6 operating system* ("*VM*"is a trademark of the IBM Corp. of Armonk, N.Y.) and associated resources 262A, 262B and 262C, respectively. In addition, each execution environment 52E, 52F and 52G also contains a program 70A, B and C to provide the function of recovery facility 70A illustrated in FIG. 23. An advantage of locating each recovery facility in an execution environment which includes the shared file system is that the shared file system includes services, i.e. communication and tasking services, that the recovery facility can use. The communication services handle communication protocols, interrupt processing, and message management. In system 50A FIG. 28, recovery facility 70A is initially identified to the system control program as the recovery facility associated with recovery facility log 72A when the execution environment 52E is initialized. This is accomplished by specification of a parameter as input to the execution environment 52E's initialization process. Execution environment 52E identifies itself to the system control program as the recovery facility and as the target of all communication in system 50A for the sync_point_log resource identifier. (Refer to section 'Log Name Exchange for Recovery of Protected Resources' for description of term sync_point_log resource identifier.) This sync_point_log resource identifier must be unique in system 50A and can be associated with only one execution environment at any time. In the illustrated embodiment, execution environment 52E defines a nonvolatile storage area which contains recovery facility log 72A so that specification of execution environment 52E automatically implies log 72A as the resource recovery log, absent an overruling specification of another storage area.

However, if execution environment 52E is not available, the user can activate recovery facility 70B or 70C as a backup and move log 72A to execution environment 52F or 52G by specifying the aforesaid parameter at initialization of execution environment 52F or 52G and specifying to the execution environment the location of recovery facility log 72A. The user specifies the location of log 72A by giving the system control program the necessary commands from the chosen execution environment 52F or 52G to identify the location of the non-volatile storage area that contains recovery facility log 72A.

All the information that is needed by the recovery facility to complete resynchronization after a syncpoint failure is contained in recovery facility log 72A, and no information required for the syncpoint recovery is contained in the execution environment, resource manager, or associated non-volatile storage. Therefore, any execution environment with the resource manager that contains the recovery facility program can act as the recovery facility 70A as long as the active recovery facility has access to log 72A. The back-up transfer of the recovery facility function to execution environment 52F is indicated by communication path 272B, and the back-up transfer of the recovery facility function to execution environment 52G is indicated by communication path 272C.

Communication between any of the syncpoint managers 60A, 60B, or 60C in any application environment with the recovery facility 70 is accomplished by using the sync_point_log resource identifier when initiating a conversation through the system control program to the recovery facility.

LOCAL AND GLOBAL COMMIT SCOPES TAILORED TO WORK UNITS

The foregoing flowcharts of FIGS. 5 A, B illustrate an example where a single logical unit of work or commit scope extends to two application partners in different systems, for example, to resources and applications in more than one execution environment in different systems, and the commit procedure is coordinated between the two application partners. The following describes in detail this process as well as the ability of System 50A to provide separate work units or commit scopes for the same application in the same execution environment. Thus, all systems 50 can tailor commit scopes to the precise resources which are involved in one or more related work units.

As noted above, a "work unit" is the scope of resources that are directly accessible by one application and participate in a common syncpoint. For example (in FIG. 2), the resources coupled to resource adapters 62A and 62B and protected conversation adapter 64A are all directly accessible by application 56A and therefore, could all have the same work unit. They would all have the same work unit if they all were involved in related work requests made by application 56A. The work unit identifiers are selected by the system control program 55 and are unique within each execution environment. In the illustrated embodiment, the system control program 55A comprises a conversation manager 53A, and an execution environment control program 61 for each execution environment 52. By way of example and not limitation, execution environment control program 61A can be an enhanced CMS component of the VM/SP Release 6 operating system ("VM" is a trademark of IBM Corp. of Armonk, N.Y.). This execution environment control program controls the execution of application 56A and, as noted above, assigns the work unit identifications. Thus, the work unit identifications are unique within each execution environment. The application uses the same work unit for multiple, related work requests and different work units for unrelated work requests. A "logical unit of work" identifier is a globally unique (network wide) identifier for all resources that are involved in related work requests and encompasses all the related work requests. The logical unit of work identifiers are assigned by the recovery facility 70 of the system in which the work request originated and in this embodiment comprises:

(1) A network identifier which identifies a group of interconnected systems;
(2) A system identifier which identifies one communication facility within the network;
(3) An instance number that provides a locally unique element to the LUWID (for example, a timestamp may be used); and
(4) A sequence number which identifies a particular syncpoint instance.

By way of example, this is of the type defined by *System Network Architecture LU 6.2 Reference: Peer Protocols, SC31-6808 Chapter 5.3 Presentation Services—Sync Point verbs*. The syncpoint manager 60 requests the logical unit of work identifier (LUWID) from the recovery facility when a protected conversation is involved in the work unit or when a two-phase commit procedure will be required, even if the work request does not require a protected conversation. The LUWID may be requested by the resource adapter by calling the syncpoint manager, or by the syncpoint manager by requesting an LUWID at the beginning of commit processing if one has not been acquired yet and it is needed for the commit. As described in more detail below, a work unit is associated with a LUWID when protected resources such as a protected conversation or multiple protected resources are involved in the work unit. A work unit can include a mixture of multiple files and multiple file repositories, other protected resources and other participating resource managers, and protected conversations between different parts of a distributed application. In the case of a protected conversation, a single logical unit of work extends between two or more application partners, even though each application partner assigns a different work unit (within each execution environment) to the same protected conversation and to other resources directly accessed by this application. Thus, each application partner associated with a protected conversation assigns and uses its own work unit locally, but the work units of the two or more application partners refer to the same distributed logical unit of work. It should be noted that each execution environment is ignorant of the work unit identifications assigned by the other execution environment, and it is possible by coincidence only that work units in different execution environments have the same identifier. Work units with the extended scope described above, rather than LUWIDs, are used to define local commit scopes because existing applications can benefit from the extended function with a minimum of change. Changing from work units to LUWIDs would be cumbersome and would require existing applications to change.

FIGS. 6-9 illustrate, by example, a process for establishing different work units and logical units of work for the same application 56A, and another logical unit of work which extends to multiple resources associated with a plurality of application partners 56A and 56D, running in different systems 50A and 50D, respectively. In the illustrated example in FIG. 7, application 56A is initiated and obtains a work unit identifier X from execution environment control program 61A (Step 928). The execution environment control program is responsible for selecting a unique work unit identifier within each execution environment. Then, application 56A makes a work request to resource adapter 62A within execution environment 52A to update a file located in resource 78A specifying that the work request is to be made under work unit X, or by default, the work request is assigned to be under a "current work unit designated by application 56A (Step 930). If the resource adapter requests the LUWID for work unit X (Decision Block 935), then syncpoint manager 60A requests a LUWID from recovery facility 70A to encompass work unit X if one is not already assigned and associates it with work unit X. Then the syncpoint manager returns the LUWID to the resource adapter (Step 936). In the illustrated example in FIG. 6, resource 78A (accessed via resource adapter 62A) is not a protected conversation so Decision Block 937 (FIG. 7) leads to Step 939 in which the resources are updated. If resource adapter 62A was not previously registered for work unit X (Decision Block 933), then resource adapter 62A registers with syncpoint manager 60A (Step 934). In the foregoing example, application 56A does not desire to perform additional work under the same work unit (Decision Block 940), and does not desire to do new unrelated work (Decision Block 941), so the next step is for application 56A to issue a commit (Step 942). In response, syncpoint manager 60A initiates the one-phase commit procedure (Step 944). However, it should be noted that application 56A is not required to issue the commit for work unit X before beginning some other unrelated work request (Decision Block 941). In this particular case, the syncpoint manager is performing a one-phase commit procedure and so, does not need a LUWID.

In the illustrated example, application 56A next begins the following process to do work independently of work unit X. Application 56A requests a new work unit from execution environment control program 61A, and execution environment control program 61A returns work unit Y (Step 928). Next, application 56A makes a request to update resource 78B via resource adapter 62B under work unit Y (Step 930). If the resource adapter requests the LUWID for work unit Y (Decision Block 935), syncpoint manager 60A obtains from recovery facility 70A a LUWID and associates it with work unit Y (Step 936). At this time, the logical unit of work for work unit Y extends only to resource manager 63B. Next, an update to resource 78B is implemented (Step 939). Since resource adapter 62B has not yet registered for work unit Y, it registers with syncpoint manager 60A (Step 934).

Next, application 56A desires to do additional work under the same work unit Y (Decision Block 940) e.g. to make changes to data in other resources. In the example illustrated in FIG. 6, the other resource is a protected conversation, and the protected conversation is used to access resources in system 50D via distributed application partner 56D. In the illustrated example, this is the beginning of a new protected conversation. Thus, application 56A initiates a new protected conversation with application 56D under work unit Y (Step 930). Because protected conversation adapter 64A requests the LUWID for work unit Y, the syncpoint manager invokes the recovery facility if a LUWID has not yet been assigned and associated with the work unit, and returns the LUWID to the protected conversation adapter (Step 936). (The protected conversation adapter will need the LUWID when the conversation is initiated (Step 947).) Decision Block 937 leads to Decision Block 946. Because this is a new protected conversation, conversation manager 53A initiates a protected conversation and sends the LUWID associated with work unit Y to a communication facility (Step 947). In the illustrated example, where application partner 56D resides in a different system, communication facility 57A is utilized. However, it should be noted that if the application partner resided in another execution environment, for example 52B, within the same system 50A, then the communication function is provided by conversation manager 53A of system control program 55A, without involvement of communication facility 57A. When protected conversation adapter 64A receives control back from conversation manager 53A and the protected conversation initiation request was indicated as successful, protected conversation adapter 64A registers with syncpoint manager 60A (Step 948) and gives control back to application 56A. At this time application 56A sends a message to application 56D requesting the update of resource 78D (Step 949). However, the message is buffered in system 50D until application 56D is initiated. After the message is sent, application 56A has no more work to do (Decision Blocks 940 and 941) and issues a commit on work unit Y (Step 942). Syncpoint manager 60A initiates a two-phase commit procedure (Step 944).

When system control program 55D receives the conversation initiation request from communication facility 57A via communication facility 57D (Step 960 in FIG. 8), system control program 55D initiates execution environment 52D (Step 962). Protected conversation adapter 64D obtains new work unit Z for execution environment 52D in which application 56D will run from execution environment control program 61D. This work unit is unique within execution environment 52D. Also, protected conversation adapter 64D tells the syncpoint manager to associate the LUWID received with the initiated conversation to the new work unit, and then registers with syncpoint manager 60D under the new work unit (Step 966). (The flow of the conversation initiation request in Step 947 is from protected conversation adapter 64A to conversation manager 53A, to communication facility 57A, to communication facility 57D, to conversation manager 53D, and to protected conversation adapter 64D.) Application 56D is then started.

Next, application 56D makes a work request in Step 930D, and in the illustrated example, the first work request is to receive a message on the conversation. Because the protected conversation already has the LUWID, Decision Block 935D leads to Decision Block 937D. Because this is a protected conversation but not a new outbound protected conversation (i.e., not an initiation of a new protected conversation), Decision Blocks 937D and 946D lead to Step 949D in which the message is received by application 56D.

Figure 6:
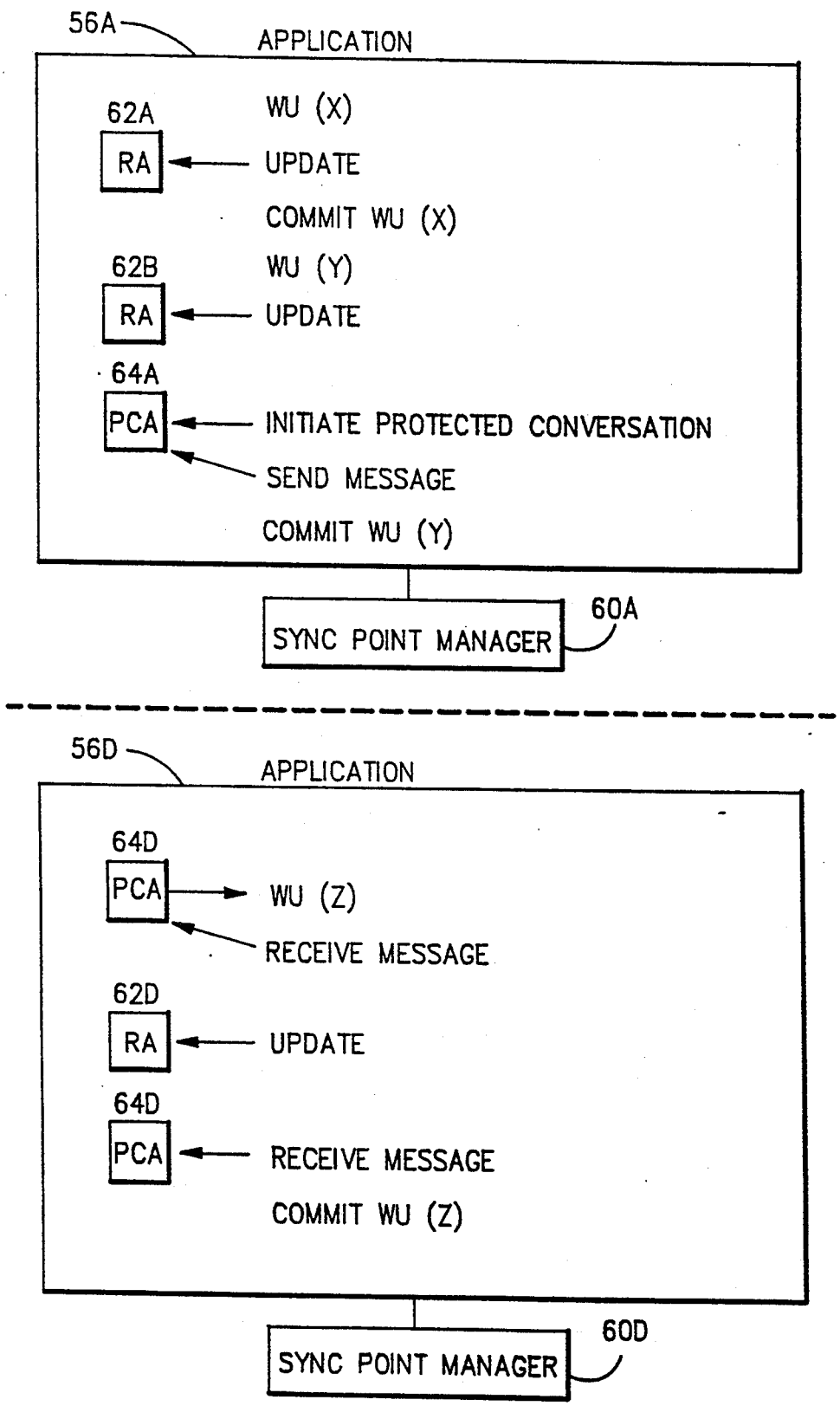
FIG. 6 is a block diagram illustrating plural work units defining different commit scopes within a single application environment of FIG. 2, and a commit scope transversing more than one system of FIG. 2.

In the illustrated example from FIG. 6, the protected conversation causes application 56D to perform additional work e.g. update a file within resource 78D (via resource adapter 62D) and therefore Decision Block 940D leads to Step 930D in which application 56D makes a work request to update resource 78D using work unit Z. If the resource adapter requests the LUWID (Decision Block 935D), the syncpoint manager returns the LUWID to the resource adapter (Step 936D). It was not necessary to invoke the recovery facility to assign the LUWID since it was already assigned and associated with the work unit in Step 966. Because this work request does not involve a protected conversation resource, Decision Block 937D leads to Step 939D in which resource 78D is updated according to the work request. Because resource adapter 62D was not previously registered, Decision Block 933D leads to step 934D in which resource adapter 62D is registered with syncpoint manager 60D. Application 56D now needs to determine when application 56A requests the commit of the work. This is accomplished by application 56D by doing a receive (work request) on the protected conversation. Application 56D will get a return code of Take_Syncpoint when application 56A has issued the commit. Therefore, Decision Block 940D leads to Step 930D in which application 56D issues a receive on the protected conversation under work unit Z. Since protected resource adapter 64D does not need the LUWID, (Decision Block 935D) and the work request involves a protected conversation (Decision Block. 937D) and the protected conversation is not a new outbound conversation (Decision Block 946D), the receive is done (Step 949D). Since application 56D has no additional work to do on work unit Z, Decision Block 940D will lead to Decision Block 941D. When application 56A has issued the commit (Decision Block 941D), application 56D will get a Take_Syncpoint return code on the receive, and issue a commit (Step 942D). Next, Syncpoint Manager 60D will initiate the commit procedure (Step 944D). In the illustrated example, this concludes the work request associated with work unit Z, and Decision Block 950D leads to the end of application 56D. At this time, application 56A receives control back from syncpoint manager 60A and ends.

Figure 7:
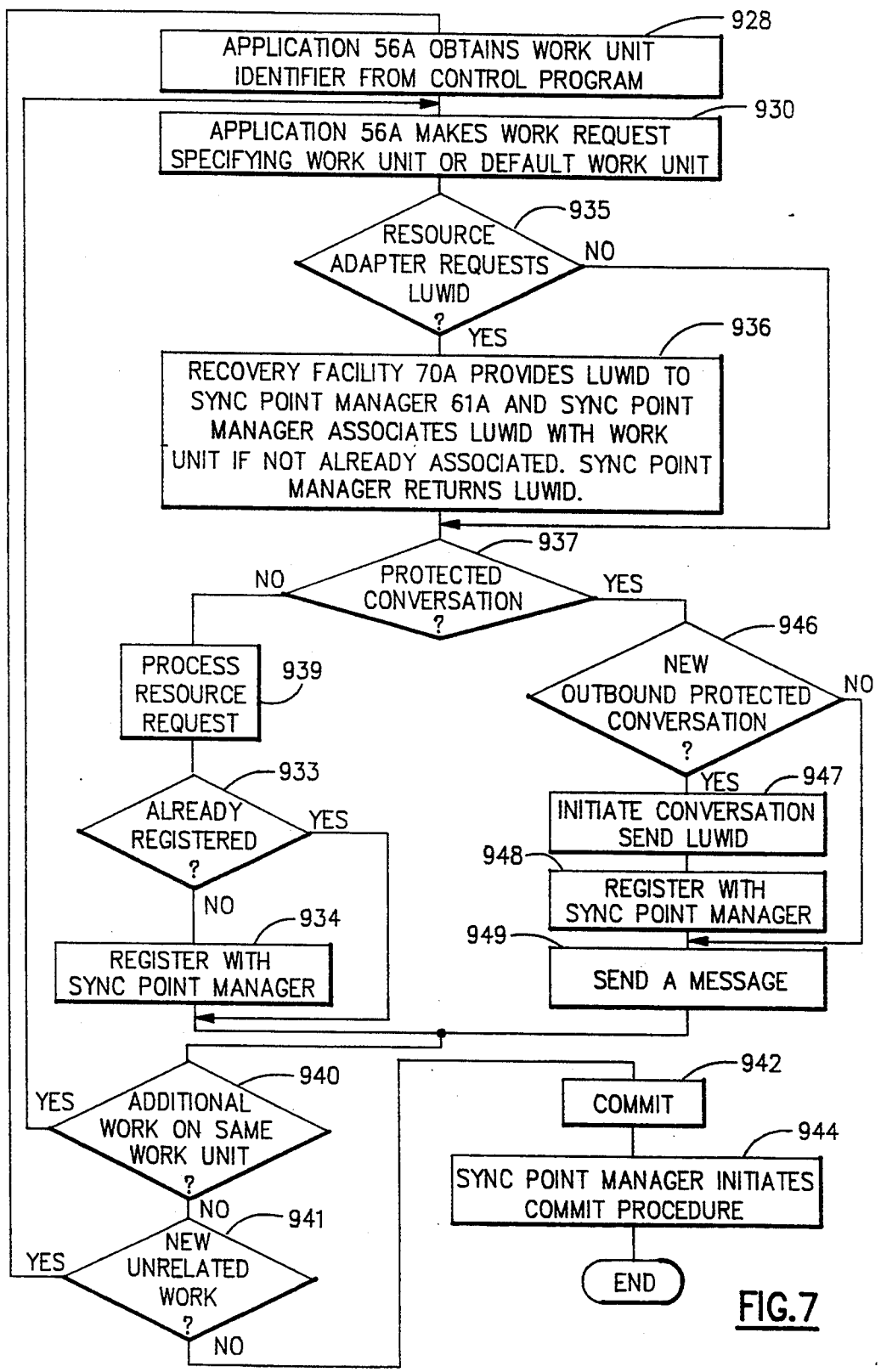
FIG. 7 is a flowchart illustrating the use of local work units and a global logical unit of work by one application environment of FIG. 2 to define the scope of and facilitate commit processing.
Figure 8A:
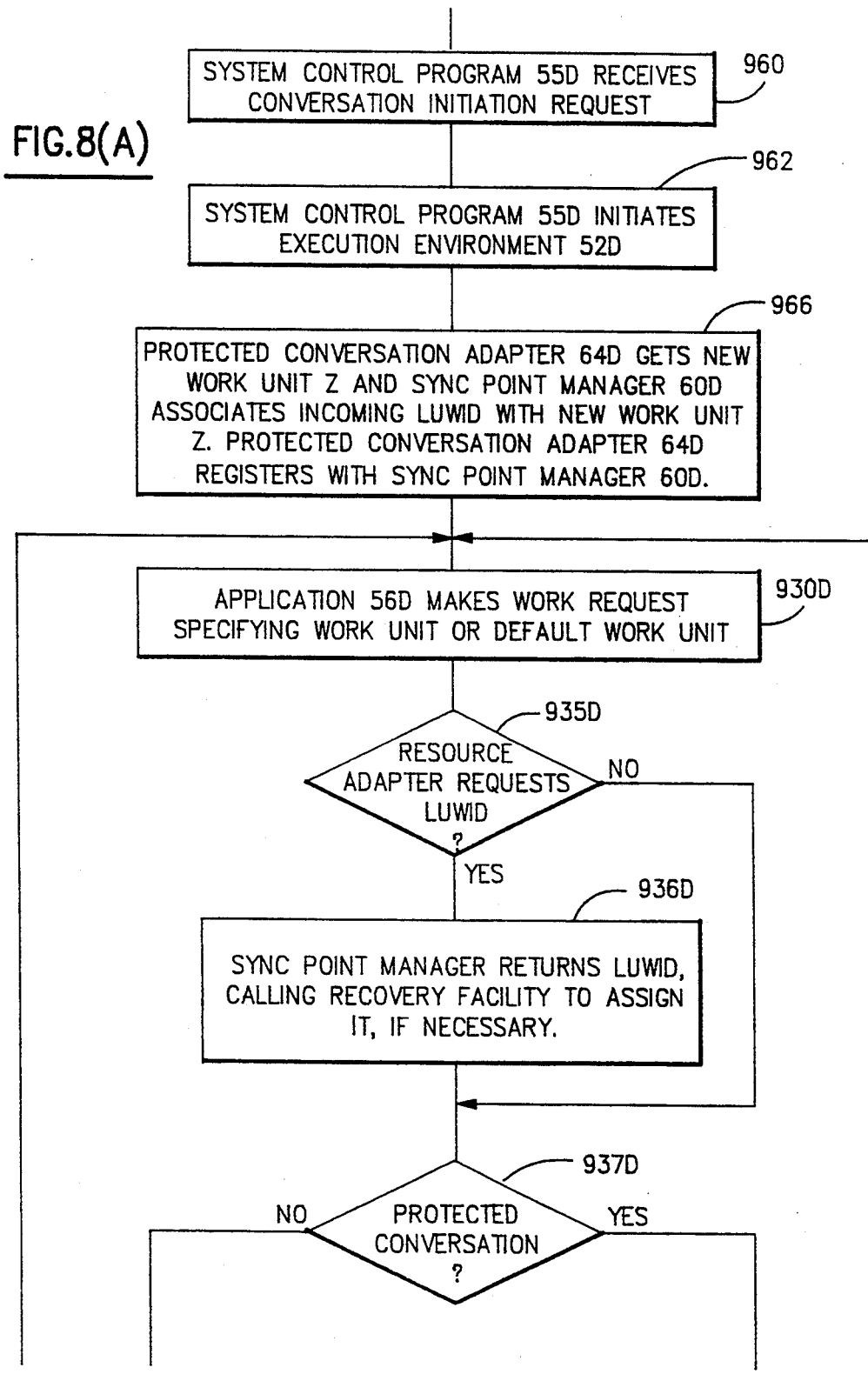
Figure 9:
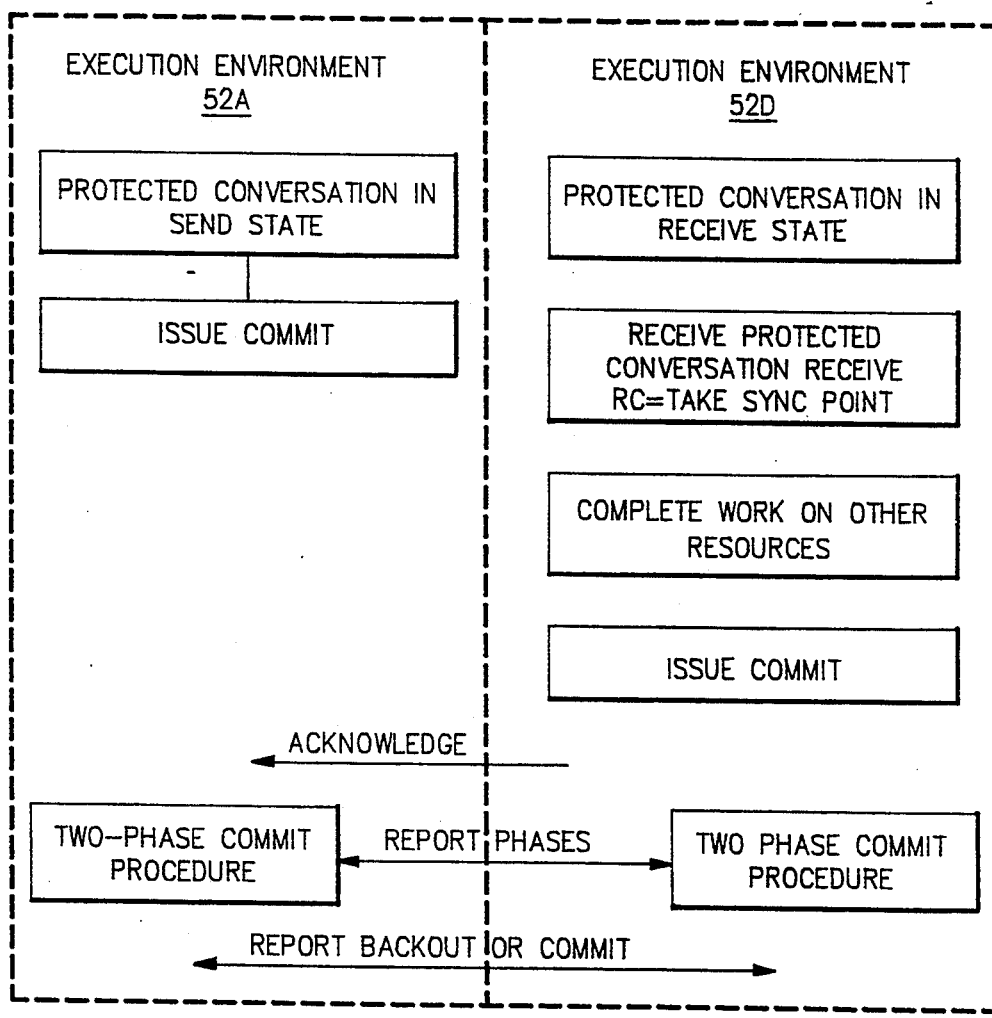

FIG. 9 (and FIGS. 3–5 above) illustrate the timing of the commits in execution environments 52A and 52D according to the example used in this invention. When the protected conversation is in a send state relative to execution environment 52A, application 56A issues a commit for work unit Y, as previously described in Step 942 (FIG. 7). When execution environment 52D is in receive state for the protected conversation, it receives a message along with a return code of Take_Syncpoint from execution environment 52A. It should be noted that after receipt of the Take_Syncpoint return code, application 56D should issue a commit as soon as possible because this return code indicates that application 56A has issued the commit and is waiting for execution environment 52D to issue the corresponding commit. Thus, after receipt of the message on the protected conversation and the return code, application 56D completes work on other protected resources associated with the work unit in System 50D to get those other resources into a consistent state. After this is done, such that all resources in System 50D associated with the work unit Z are consistent, application 56D issues the commit. Next, syncpoint manager 60A and 60D implement respective two-phase commit procedures for resources directly accessed by the respective applications 56A and 56D. Even though separate commits are invoked to commit those resources which are directly accessed by the respective applications, during the two-phase commit processing each syncpoint manager reports syncpoint status information to the other syncpoint manager. For a more detailed description of syncpoint processing, see *Coordinated Sync Point Management of Protected Resources*.

REGISTRATION OF RESOURCES FOR COMMIT PROCEDURE

Figure 10:
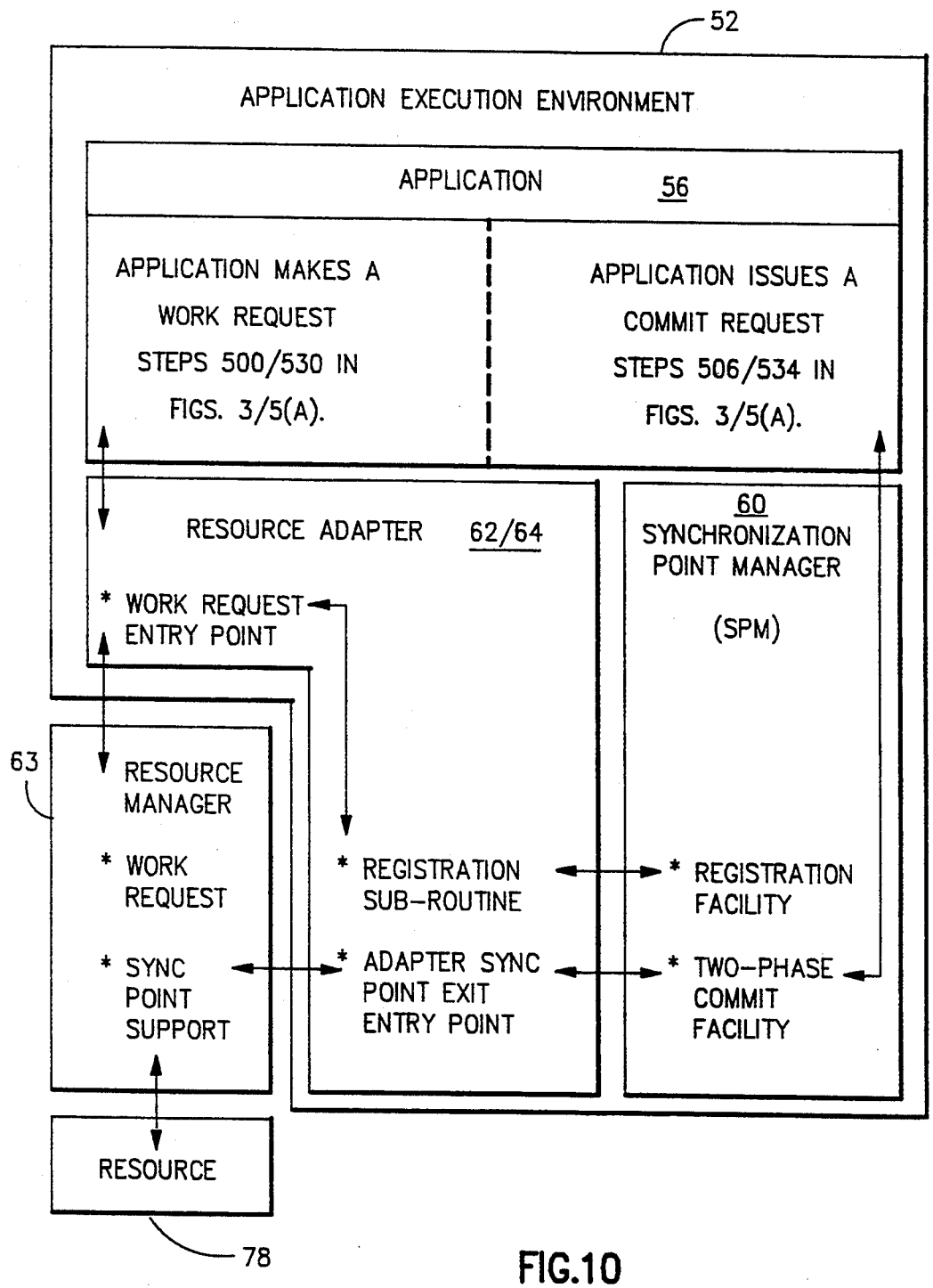
FIG. 10 is a block diagram that illustrates automatic and generic registration of resources within the systems of FIG. 2.

FIG. 10 schematically illustrates automatic and generic registration of resources, where registration is a facility that identifies protected resources to synchronization point manager (SPM) 60. In each application execution environment 52, the resource adapter 62/64 and the SPM 60 participate in registration on behalf of the application 56. In the illustrated embodiment, the resource manager 63 and the resource 78 are located outside of this environment.

In FIG. 10, the application 56 is shown as having two parts, a work request and a commit request. Both parts usually execute in the same application execution environment. However, a broken line between the two parts is shown in the figure to indicate that the application may be distributed and that the two request types may originate from different environments.

Assume that an end user starts application 56 by invoking the start facility of the system control program. The start facility builds the application execution environment 52, and loads and transfers control to the application 56. When the application 56 starts to execute, there are no resources 78 yet registered with SPM 60.

Figure 3:
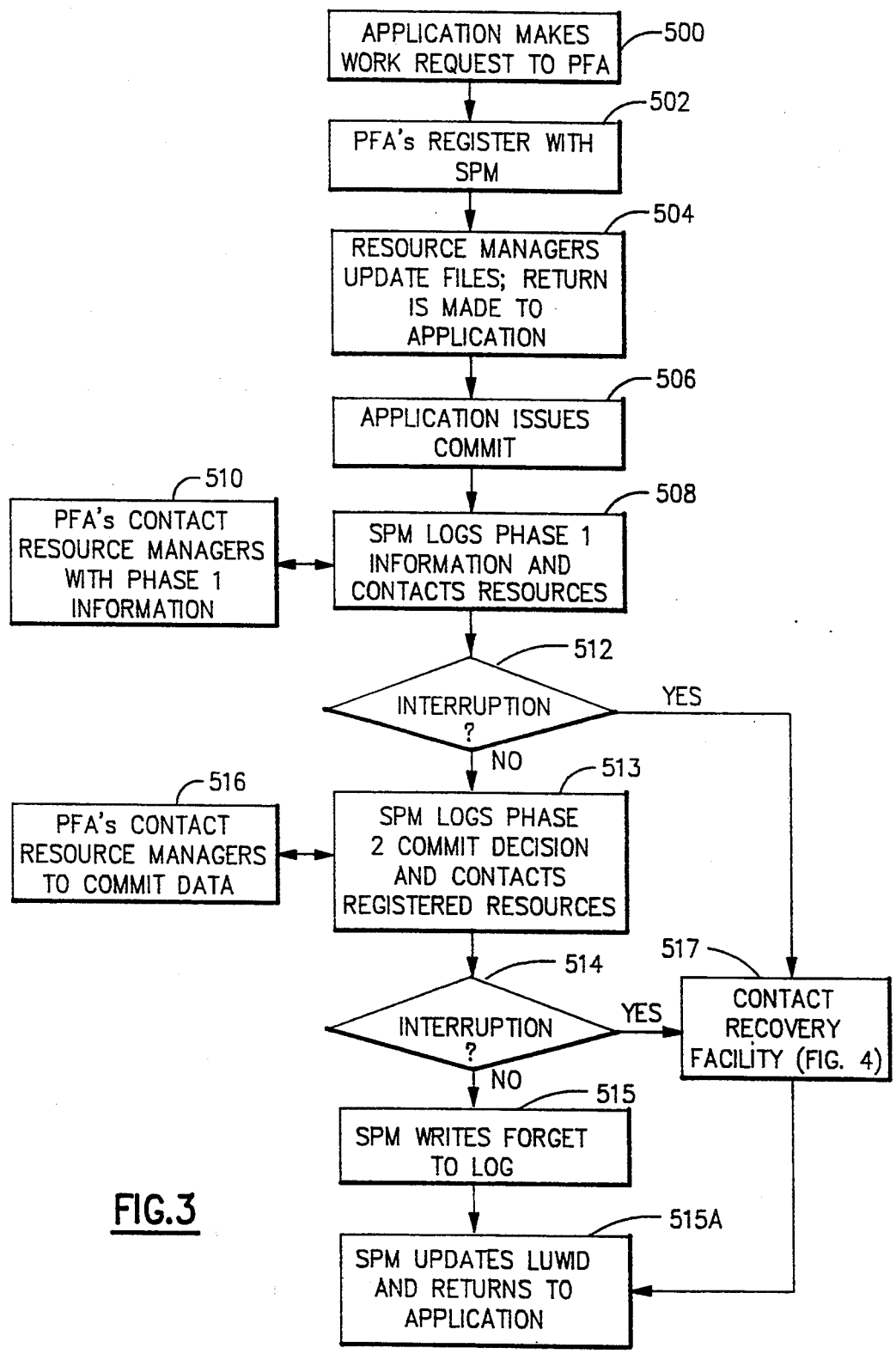
FIG. 3 is a flowchart of a two-phase commit procedure for resources used by an application running in an execution environment of FIG. 2.

When the application 56 in FIG. 2 makes a work request (steps 500/530 in FIGS. 3/5(A)) to use a resource 78, this request invokes a specific adapter 62/64 associated with the resource 78. The general function of the adapter 62/64 is to connect the application 56 to the resource manager 63. In system 50 the resource adapter 62/64 is extended to include a registration sub-routine that automatically registers in the sync point manger 60, and an adapter sync point exit entry point that supports the two-phase commit procedure.

The work request entry point indicates code lines in the adapter 62/64 that pass the work request (ex. to open a file, insert records into a data base, initiate a conversation, etc.) from the application 56 to the resource manager 63. These code lines also interact with the registration sub-routine in the adapter 62/64 to do automatic registration. Registration informs SPM 60 that the resource 78 is part of a work unit. Also, registration identifies the resource manager 63 to SPM 60. This consists specifically of telling SPM 60 the adapter sync point exit entry point, and the resource manager's object_recovery resource identifier.

The adapter sync point exit entry point indicates code lines within the resource adapter 62/64 to be used by the SPM 60's two-phase commit facility when a commit request is made (Steps 506/534 in FIGS. 3/5A). The object_recovery resource identifier is the identifier used by the recovery facility 70, described in the below section entitled "Log Name Exchange for Protected Resources" (Step 225 of FIG. 26), to initiate a conversation with the resource manager 63 in the event of a failure during the SPM 60 two-phase commit process.

The process initiated by a work request to any resource adapter 62/64 to handle automatic registration for the application 56 is resource dependent. The resource 78 to be used can be inherently protected regardless of the nature of the work request, and if it has not yet registered, the adapter 62/64 uses its registration sub-routine to automatically register the resource with SPM 60 for the application 56. Alternately the adapter 62/64 may not know if the resource 78 is protected. The resource manager 63 may have this knowledge. In this case, the adapter 62/64 may register and pass the work request to the resource manager 63. The resource manager 63 may do the work request and return to the adapter 62/64 with an indicator whether the resource 78 requires or does not require protection. If protection is not required, the adapter 62/64 may use its registration sub-routine to unregister with SPM 60. Or the adapter 62/64 may determine inherently from the work request or from the resource manager 63 that the resource will not be changed by the application 56; that is, the resource is used only for read. For this case, the adapter 62/64 may use the registration facility of SPM 60 to change the registration to read-only. Finally, the adapter 62/64 may determine that the resource 78 is a read-only resource or an unprotected resource that should be made available to other applications as soon as possible. In this case, the adapter may remain registered order to obtain the prepare order during a two-phase commit procedure. The resource adapter 62/64 can then use the order as a cue to unlock the resource 78. In this case the adapter 62/64 may respond "prepared" and "commit" to the orders from SPM 60.

By supporting unregistration and change of registration, as described in more detail be low, the adapter 62/64 can give information to SPM 60 that al lows for optimizing the two-phase commit procedure (also, as described below). When the application 56 issues a commit request, the SPM 60 may realize that only one resource is registered as having been changed (either no other resource is registered, or all other resources are registered as read-only). For this case the SPM 60 may use the more efficient one-phase commit process.

Now consider the foregoing general control flow as applied to a specific example where application 56A of FIG. 2 is executing and makes a work request for a protected conversation with a partner application 56D (Step 530 of FIG. 5A). The request is processed by protected conversation adapter 64A which is one type of resource adapter. This adapter uses its registration sub-routine to invoke the registration facility of SPM 60A (Step 532). Next the adapter 64A uses communication facility 57A, which acts as a resource manager, to initialize the partner application 56D. As illustrated in FIG. 2, the conversation manager 53A is capable of starting a partner application on the same system 50A, or of communicating with a counterpart communication facility 57D on another system 50D via communication facility 57A to start an application within system 50D. In the latter case, the partner application runs on system 50D and the communication facility 57D starts the partner application 56D by invoking the system control program 55D's start facility. This facility builds the new application execution environment 52D for the partner application 56D. Since the start facility knows that it is building a partner application 56D, it knows that the communications facility 57D will be used in the protected conversation with the originating application 56A. Thus, the start facility temporarily acts as the partner application 56D and invokes the resource adapter 64D for protected conversations. Then, adapter 64D registers the protected conversation with the SPM 60D. Thus, the partner application 56D's protected conversation with the originating application 56A is registered prior to the invocation of the partner (alternatively, the registration could be delayed until the partner application 56D uses the conversation with the application 56A). Thus, in FIG. 2, the SPM 60A within execution environment 52A of the application 56A and the SPM 60D within the execution environment 52D of the partner application 56D are each informed of the protected conversation resource.

At this point in the discussion in FIG. 2, the application 56A and the partner application 56D are each executing in their own execution environments 52A and 52D under respective work units, and each may use one or more protected resources 78A or 78D. Each may, for example, use protected files. When the application 56A makes a request to use a file resource 78A, the file resource adapter 62A is invoked. The adapter uses its registration sub-routine to invoke the SPM 60A registration facility. Then the adapter invokes the file resource manager 63A. Thus, again, application 56A's usage of a protected resource 78A is automatically registered. Analogous registrations can be made in execution environment 52D for one or more resources such as resource 78D.

From the above examples we see that this embodiment of registration is generic because registration does not depend on resource type. In FIG. 10, any resource manager 63, that wants to support a protected resources 78 may add the registration subroutine to its resource adapter 62/64. No changes would be required to the system 50 sync point support.

In FIG. 10, the application 56 may also use non-protected resources. For example, the application may want to create a non-protected partner application that periodically displays messages about the work being done, where the display need not be synchronized with the actual completion of work. For this case, the application 56 makes a work request to have a non-protected conversation. The control flow is much the same as for a protected conversation in the above example. The only difference is that the resource adapter 64 knows from information in the work request that the conversation is not protected and in the illustrated embodiment, does not register with the SPM 60. Thus, the non-protected conversation will not participate in the synchronization point processing of SPM 60.

In FIG. 10, given the registration process described above, whenever the application 56 issues a commit request, the SPM 60 has a complete list of protected resources that need to be synchronized. See the foregoing section entitled "Coordinated Sync Point Management of Protected Resources", where the two-phase commit procedure in SPM 60 is described. This shows how SPM 60 uses the adapter sync point exit entry points in the resource adapter 62/64 to use the sync point support in the resource managers 63. Although not shown in FIG. 10, the application 56 may issue a back out request. For this case, the SPM 60 gives a back out order to the adapter sync point exit entry point in the resource adapter 62/64.

At the end of the synchronization point process, each SPM 60 does not destroy the application 56's registration list. It does, however, invoke the resource adapter's exit one more time for post synchronization processing. For this invocation, the adapter may decide to modify its registration. For performance reasons, the adapter may keep the resource registered until the application 56 ends. On the other hand, if the adapter knows that the resource 78 will no longer be used (for example, a protected conversation may end before the application 56 ends), the adapter may use its registration entry point 62 to unregister with SPM 60.

The control flows above assumed distributed resource managers 63. Thus, any request to use a resource 78 always went to the appropriate resource adapter 62/64 which, in turn, invoked the registration facility in SPM 60 and the work request in the distributed resource manager 63. However, for the case where the resource manager 63 is not distributed, the adapter need not get involved with a work request. For this case, since resource manager 63 and SPM 60 are in the same application execution environment 52, the resource manager 63 may directly invoke the registration facility in SPM 60.

Figure 12:
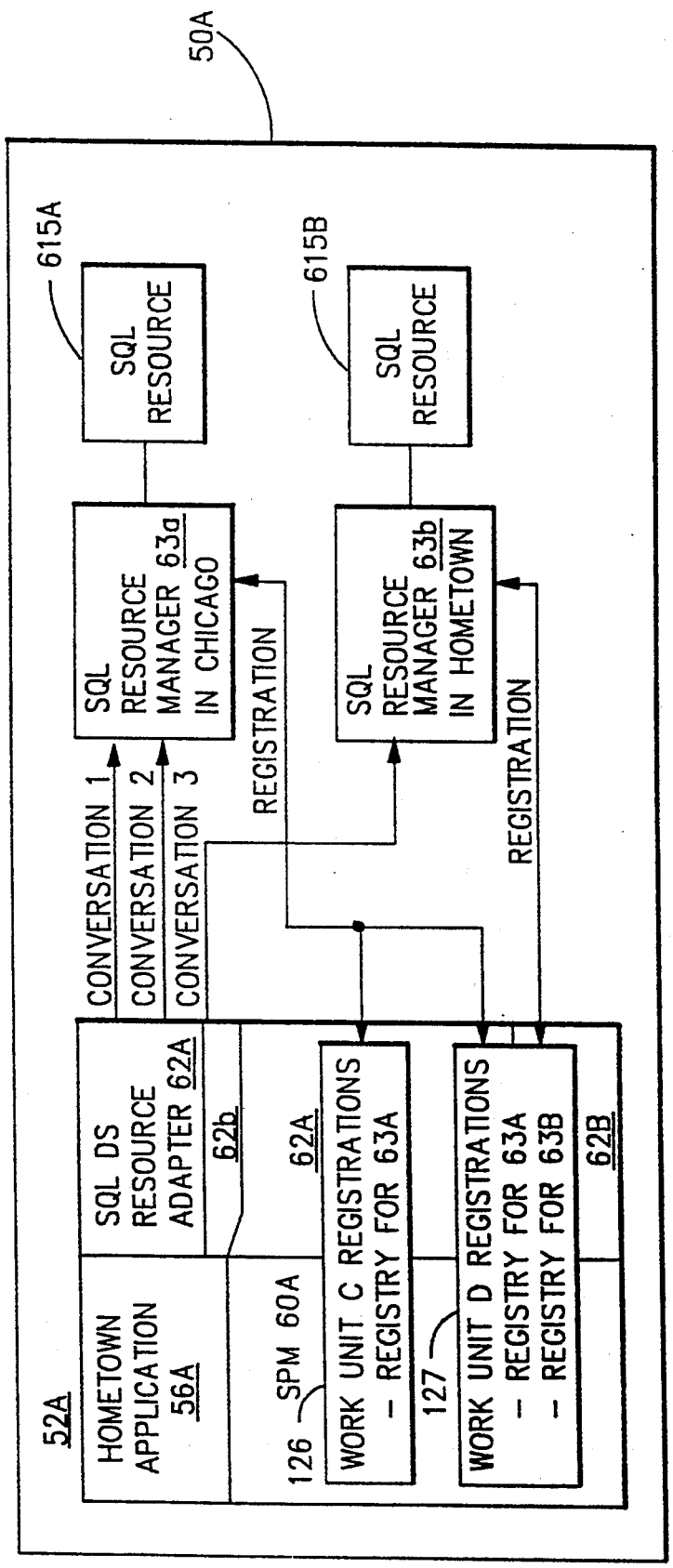
FIG. 12 is a block diagram illustrating registration on a work unit basis within the systems of FIG. 2.
Figure 13:
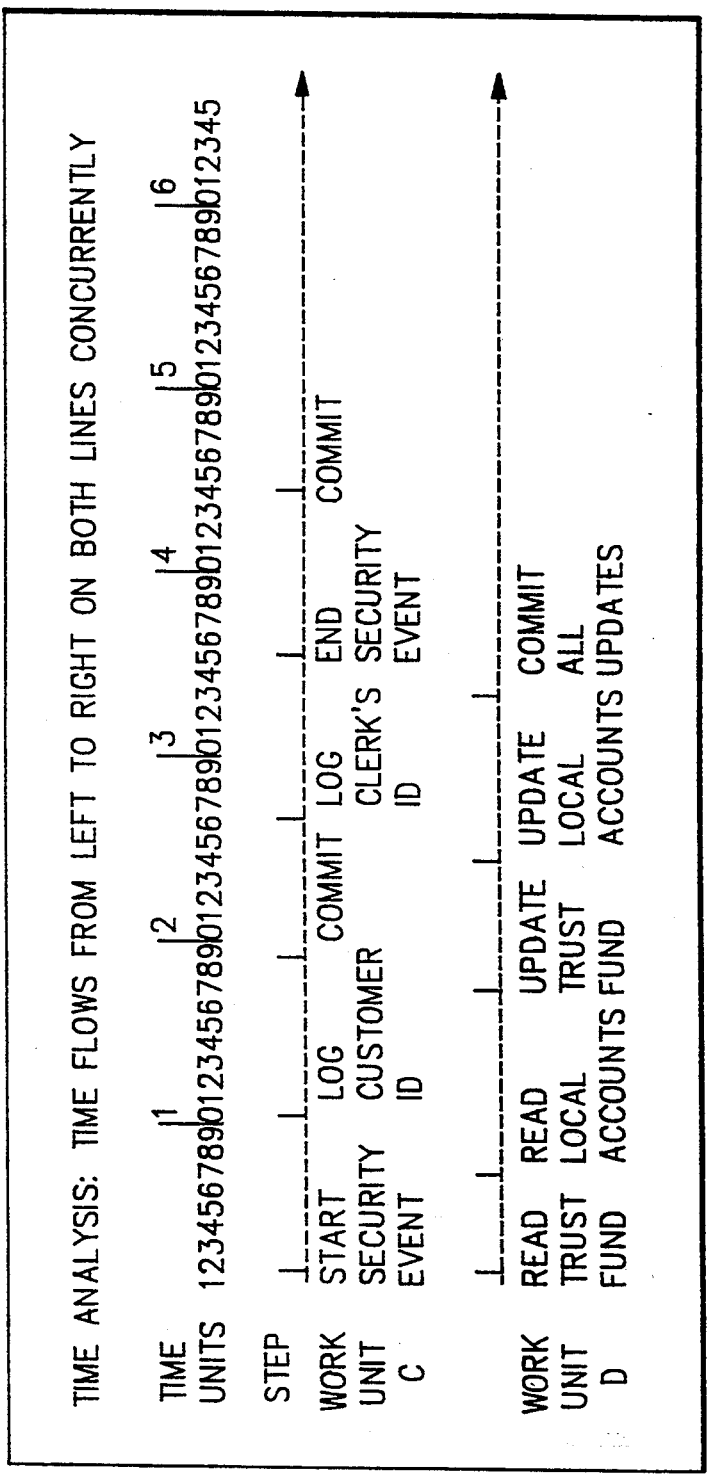
FIG. 13 is time flow diagram of bank transactions illustrating registration on a work unit basis.

In the illustrated example of FIG. 12, application 56A makes multiple work requests. They are processed by system 50A concurrently and involve more than one resource manager and resource. Specifically for the example, application 56A makes eight work requests for two work units, C and D, that ape processed concurrently by system 50A. The commit points, shown in FIG. 13, are at times 19 and 44 for work unit C and at time 33 for work unit D. The time units in FIG. 13 are logical clock units denoting sequence (not physical clock units). In the illustration of FIG. 13, events occurring at the same time implies that their order is not important.

A work unit is an application's understanding, or scope, of which resources participate in a synchronization point. An application can specify fop which work unit changes to protected resources are made. An application can also specify under what work unit protected conversations ape initiated. System 50A permits multiple work units in the application execution environment (52A in FIG. 12). Specifically, applications, sync point manager 60A, and protected adapters (e.g., SOL Resource Adapter in FIG. 12) can support multiple concurrent work units. System 50A also permits tying together the work units of two application execution environments via a protected conversation. Each work unit can have a series of synchronization points. A synchronization point request to a work unit does not affect activity on other work units in an application's environment.

Consider the following example illustrated in FIGS. 12 and 13. Mr. Jones of Hometown wishes to make a transfer to his son's trust fund. The security department for Mr. Jones' bank keeps track of all people involved in any transaction including both customers and employees. The security log and financial records are not in a mutual "all or nothing" embrace but the two work units may need to be processed concurrently-one reason could be that response time would be too slow if the two work units were processed serially.

In the illustrated example, the work request for work unit C at time 1 involves resource manager 63A which controls the security log in the bank's headquarters in Chicago. Unprotected conversation 1 is used by resource adapter 62A to communicate with resource manager 63A. The work request for work unit D at time 1 also involves resource manager 63A in Chicago for Mr Jones' trust fund while the request at time 7 is to resource manager 638 in Hometown where Mr. Jones' other financial records are kept. Unprotected conversation 2 is used by resource adapter 62A to communicate with resource manager 63A and unprotected conversation 3 is used by resource adapter 62B to communicate with resource manager 63B.

Figure 14:
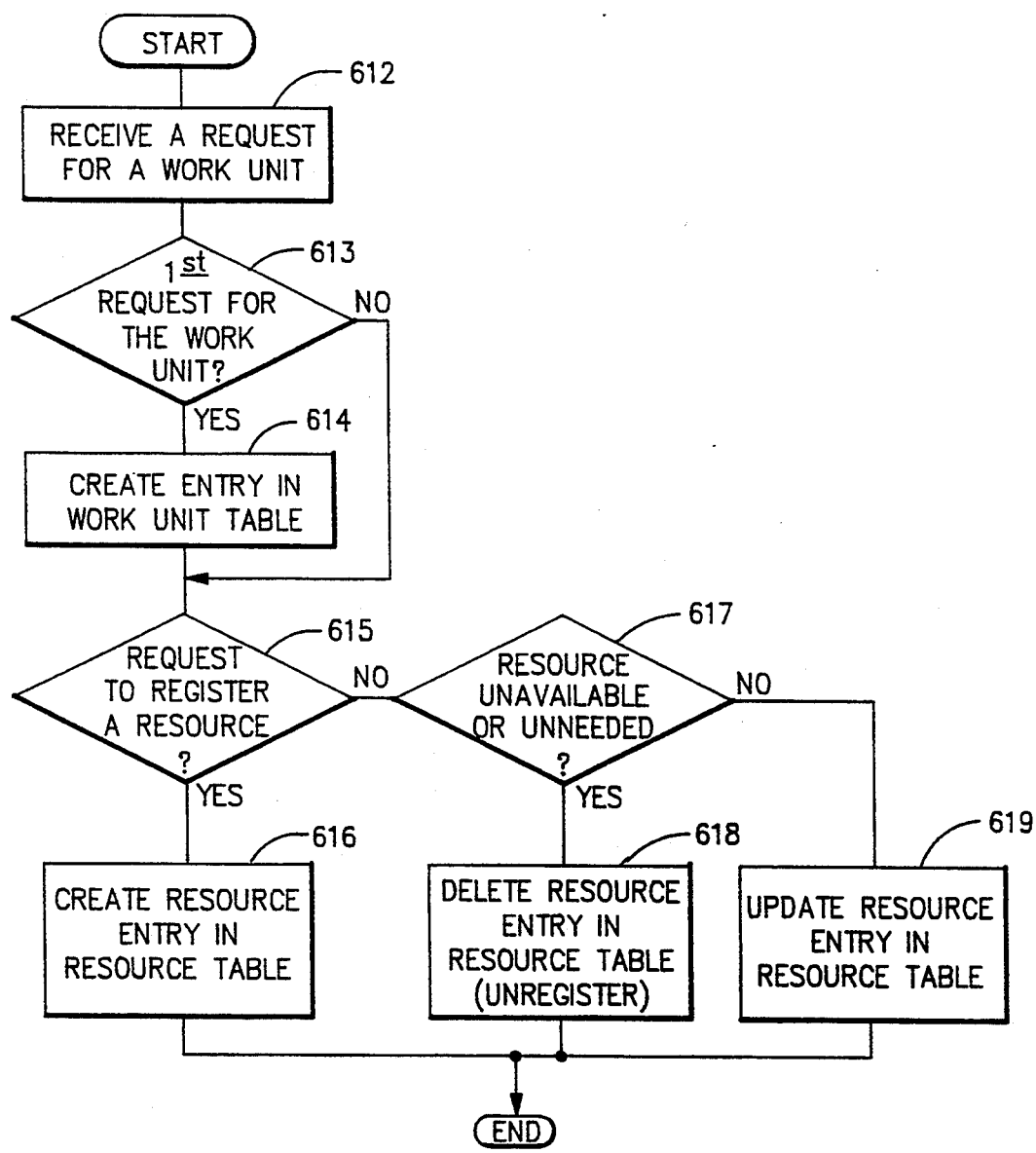
FIG. 14 is a flowchart illustrating a procedure for registering resources, changing registration information for resources and unregistering resources in the sync point manager.

When application 56A writes its first record, a "start security event" message, using work unit C, (Step 612 in FIG. 14) resource manager 63A registers via its resource adapter 62A in application execution environment 52A. Sync point manager 60A builds a registry entry for resource manager 63A in FIG. 12 table 126 under work unit C (Step 614). This entry contains the parameter list to pass to the exit for resource adapter 62A which includes the routine name of the exit and a special and private value that resource adapter 62A passed on registration. The resource adapter exit can use the special value to locate its control block for conversation 1.

Consequently, when application 56A requests a commit at time 19 for work unit C, sync point manager 60A reads table 126 to determine which resource adapter exits should be notified to initiate the commit procedure. In the illustrated embodiment, at time 19 when commit is requested for work unit C, synchronization point manager 60A calls the exit routine for resource adapter 62A to initiate a one-phase commit procedure since only one protected resource is registered; resource adapter 62A's exit routine knows to use conversation I to communicate with resource manager 63A since it receives from synchronization point manager 60A the special value saved in table 126 during registration.

Registration is subsequently avoided (Step 613) at time 26 when logging the employee id of the bank clerk handling Mr. Jones' transaction. Re-registration is not required because sync point manager 60A already knows from the work unit registration table 126, that resource manager 63A is participating in work unit C. Consequently, the processing of each work request for work unit C after the first work request and the subsequent commit at time 44 is expedited. Also, at each synchronization point for work unit C, only resource adapter 62A and resource manager 63A are notified; there is no time wasted notifying other resource adapters or other resource managers.

When application 56A makes work requests at times 1 and 7 under Work Unit D, both resource adapters 62A and 62B register with sync point manager 60A which adds registry entries 63A and 63B to table 127.

When the first security log commit is done at time 19, the trust fund update at time 17 is not affected in any way. When the trust fund and financial records are committed at time 33, the clerk-id message is not affected either. Note that resource manager 63A in Chicago is not confused since it is communicating on two separate conversations, 1 and 2, to application 56A.

The development of a resource adapter is simplified because system 50A knows which work units are active for the resource manager, relieving the resource adapter of that task. Since the design is simple the resource adapter exit performs well; it has everything it needs and simply sends sync point manager 60A's actions to its resource manager. Another performance perspective is that sync point manager 60A can optimize synchronization point procedures because it knows for which work units the resource manager is active, avoiding the overhead of calling resource adapters or resource managers for resources which are not involved in synchronization points.

In system 50A, there may be occasions when the type of work request made on a protected resource, such as a shared file or database, changes the state of the resource such that the registration information should be changed. This is important because an original work request may be a read-only request and require only a one-phase commit procedure, but a subsequent related work request under the same work unit may be a write request and require a two-phase commit procedure in order to coordinate the multiple protected resources involved.

As another example illustrated in FIG. 3, an application 56A typically makes one or more read requests on a file before making a write request in order to locate a particular record in the file to update. Such read operations can be implemented using a one-phase commit procedure in which case, upon receipt of the read work request by resource adapter 62A (Step 500), the resource adapter registers with syncpoint manager 60A for read mode (Step 502). It should be noted that during subsequent read operations, the resource adapter 62A need not interact with syncpoint manager 60A because there is no change in the type of commit procedure that is required. However, when application 56A subsequently makes a write request to resource adapter 62A under the same work unit (Step 504), resource adapter 62A changes its registration status with syncpoint manager 60A to write mode. As described in more detail below, the rather time-consuming two-phase commit procedure will be used if more than one protected resource is registered fop write mode on the same work unit.

Figure 11:
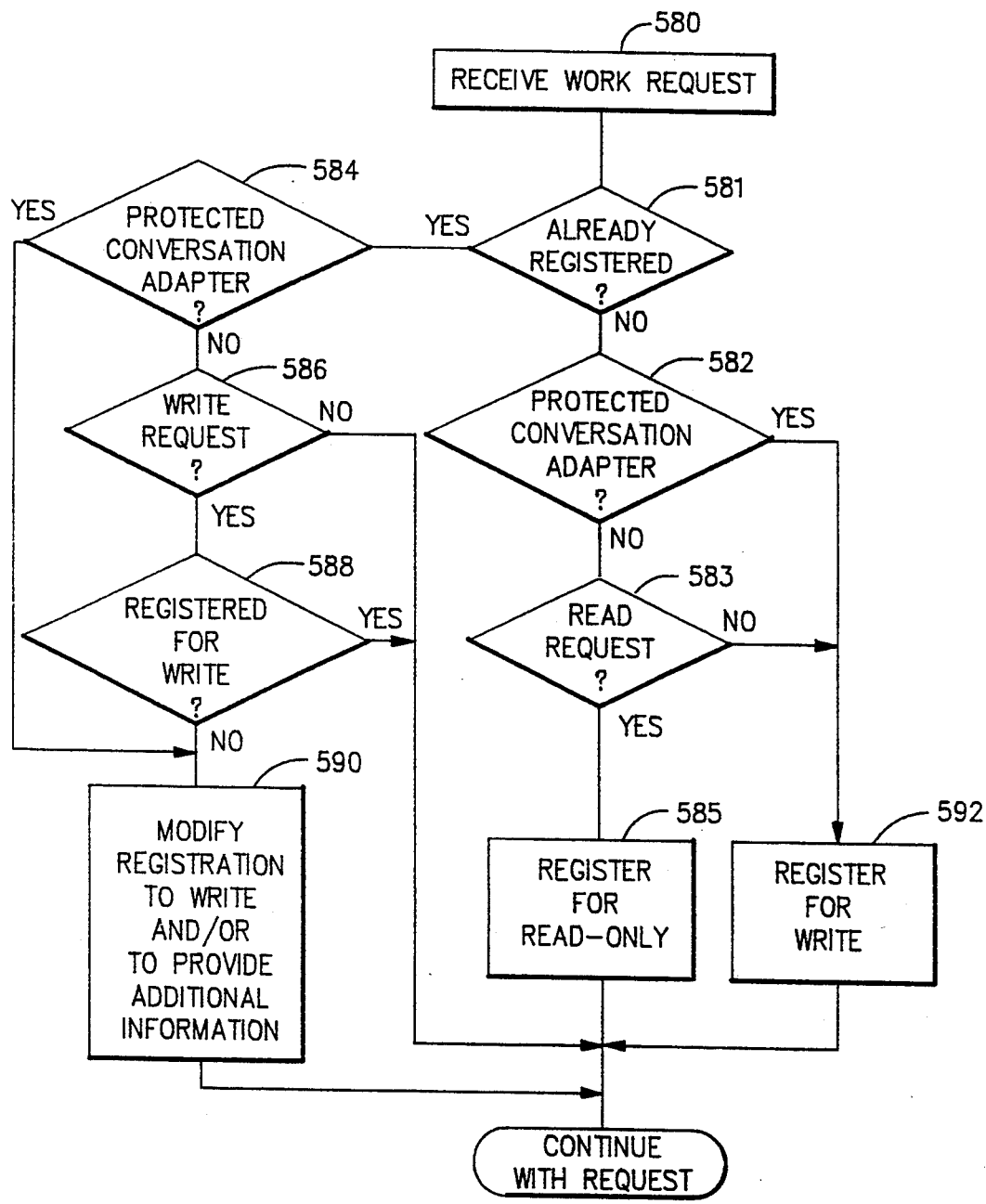
FIG. 11 is a flowchart illustrating a procedure for registering resources in a sync point manager of FIG. 6 for a suitable type of commit procedure and the steps of the commit procedure.

This example of registration change is illustrated in detail by the flow chart of FIG. 11. When the work request in step 580 is the first one for the protected resource and the request is read-only, decision block 581 leads to decision block 582. It should be noted that the resource adapter 62A keeps an internal indicator for each resource under each work unit for which it has already registered. This indicator is tested in decision block 581. The resource is not a protected conversation, therefore decision block 582 leads to decision block 583. Because the work is read-only, decision block 583 leads to step 585. In step 585, the corresponding resource adapter 62A registers as a read-only resource. When the next work request to step 580 is to write into, or update, the same resource under the same work unit, decision block 581 leads to decision block 584 because the resource adapter 62A previously registered in step 585, albeit for read mode. Decision block 584 leads to decision block 586 because the resource is not a protected conversation, and decision block 586 leads to decision block 588 because the request is for update mode. Next, decision block 588 leads to step 590 where the resource adapter 62A (which had previously registered in step 585 for read mode) changes its registration within syncpoint manager 60A to write mode. It should be noted that according to FIG. 11, if the first work request under a work unit for the resource is write mode, then the resource adapter 62A registers for write mode in step 592.

There is also the situation of a resource manager 65 which has completed a sync point and has had no further requests since completing that sync point. Its resource adapter 62 is allowed to modify its registration status to "suspended", at the completion of a sync point procedure, so that the sync point manager 60 will know that resource manager 63 is currently not participating in any sync points fop the work unit. The suspension of a write mode resource may permit sync point manager 60 to optimize a subsequent commit procedure (one-phase commit) fop the remaining resources when, for example, there is only one other write mode resource in the work unit. If the suspended resource adapter 62 receives a new work request for the work unit, it can reactivate its registration through the same registration modification function. The designs of certain resource managers require that their resource adapters register early in their interaction with the application in order to be notified of distributed sync point activities. However, they may not have a complete set of registration information at that time. For example, the protected conversation adapter 64A needs to register at the point that it initiates a protected conversation with a partner application 56D because it needs to know if a sync point occurs, yet it will not have all registration information until the conversation partner accepts the conversation, an event which may occur much later. This information can be added later under the foregoing change of registration process illustrated in step 590.

System 50 provides additional time-saving techniques in the registration process. When each resource adapter 62 registers a first time with syncpoint manager 60, it registers information in addition to the identification of the resource manager 63 and the resource adapter exit routine name fop sync point processing. Much of this additional information usually does not change when the registration changes. Consequently, this additional information is not re-registered when the registration changes in step 590 for a resource adapter 62. The following is a list of some of the additional information which the resource adapter 62 registers only once with the syncpoint manager and which does not change when other registration information changes:

1. Resource and network identifiers which describe where the resource manager and resource are located in the system and the network;
2. Product identifier which indicates the product and thus the type of resource-e.g., shared file, database, protected conversation etc.; and
3. Additional data which is required for resynchronization.

Because this additional information is not re-registered each time, the registration process is expedited.

There are a variety of occasions when an application can or will no longer use a protected resource. Examples include such events as end of application, termination of a resource manager, or unavailability of the path to the resource manager. There may be application/resource manager protocols which allow the application to declare a resource to no longer be in use. The application execution environment may support protocols which make it appropriate to unregister resources prior to end of application. Protected conversations may also terminate due to application action or due to an error condition such as a path failure. Upon any such occasion, it is preferable for the resource adapter of protected conversation adapter to unregister all applicable instances of the resource from the syncpoint manager because such unregistration will make subsequent syncpoint processing more efficient (fewer resources to consider and probably less memory consumed) (step 618 of FIG. 14). In addition, the resource adapter or protected conversation adapter can delete any control information about the registered resource and thus be more efficient in its subsequent processing.

Figure 15:
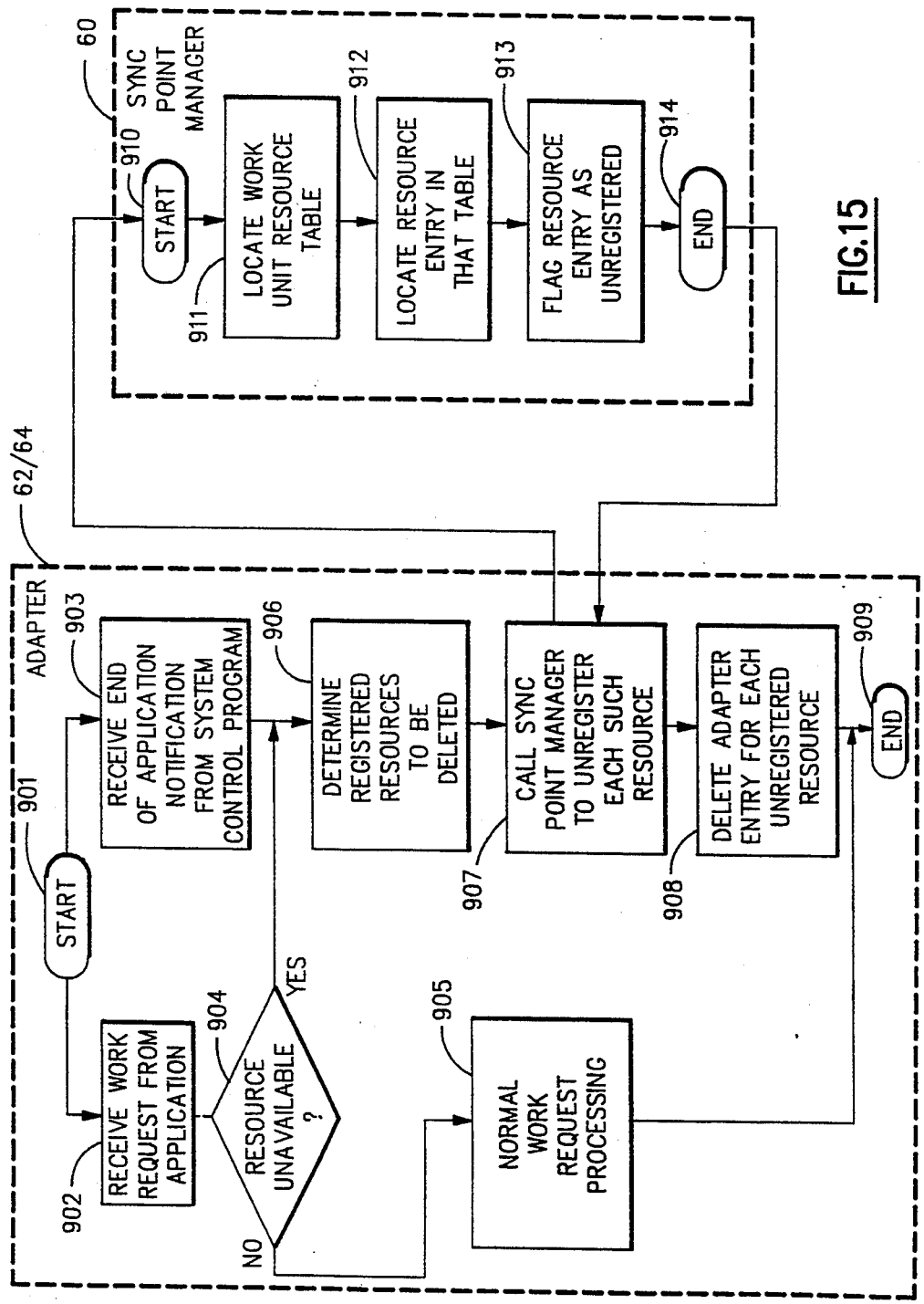
FIG. 15 is a flowchart illustrating the procedure used by resource adapters, protected conversation adapters, and the sync point manager to unregister resources.

FIG. 15 shows the flow of unregistration activity when a resource adapter 62 or a protected conversation adapter 64 discovers that a resource 78 or protected conversation is not available (step 904) or that the application has ended (step 903). Note that the adapter would typically discover that the resource is not available while processing an application work request (step 902). The adapter would determine from its own resource registration status information what registered resources should be unregistered (step 906). For each such registered resource, the adapter would call the syncpoint manager 60 to unregister the resource (step 907). Note that the adapter must identify the resource and the work unit to the syncpoint manager 60.

In FIG. 15, for each call to syncpoint manager 60 (step 910), the syncpoint manager 60 uses the adapter-supplied work unit identifier to locate the work unit resource table (step 911). Within this work unit resource table, the syncpoint manager 60 uses the adapter-supplied resource identifier to locate the desired resource entry (step 912). The syncpoint manager 60 then flags the resource entry as unregistered (step 913) and returns to the calling adapter (step 914 back to step 907). However, the syncpoint manager 60 cannot yet erase the unregistered resource entry because the resource entry logically contains error information which must be preserved until the next synchronization point (see "Coordinated Handling of Error Codes and Information Describing Errors in a Commit Procedure").

The adapter can now delete its control information (or otherwise mark it as unregistered) about the unregistered resource (step 908). Note that an event which causes unregistration may cause multiple resource registrations to be deleted (for example, a resource may be registered for multiple work units). Thus, steps 906, 907, and 908 can be a program loop to handle each applicable previously registered resource. At this point, the adapter can return to its caller (step 909). If the work request has failed due to an unavailable resource, the adapter can report the error condition to the application by whatever mechanism the resource adapter has chosen to return error information to its application users.

The resource adapter may have other processing considerations as a result of the unavailable resource or the application termination. For example, if the unavailable resource condition will cause the backout of resource updates, the adapter will need to notify the application and/or the syncpoint manager 60 that the next syncpoint on the applicable work unit(s) must be a backout. This condition during syncpoint processing requires the adapter to notify syncpoint manager 60 of the resource status (which is backing out). There may be other resource, environment, or implementation dependencies.

Figure 16:
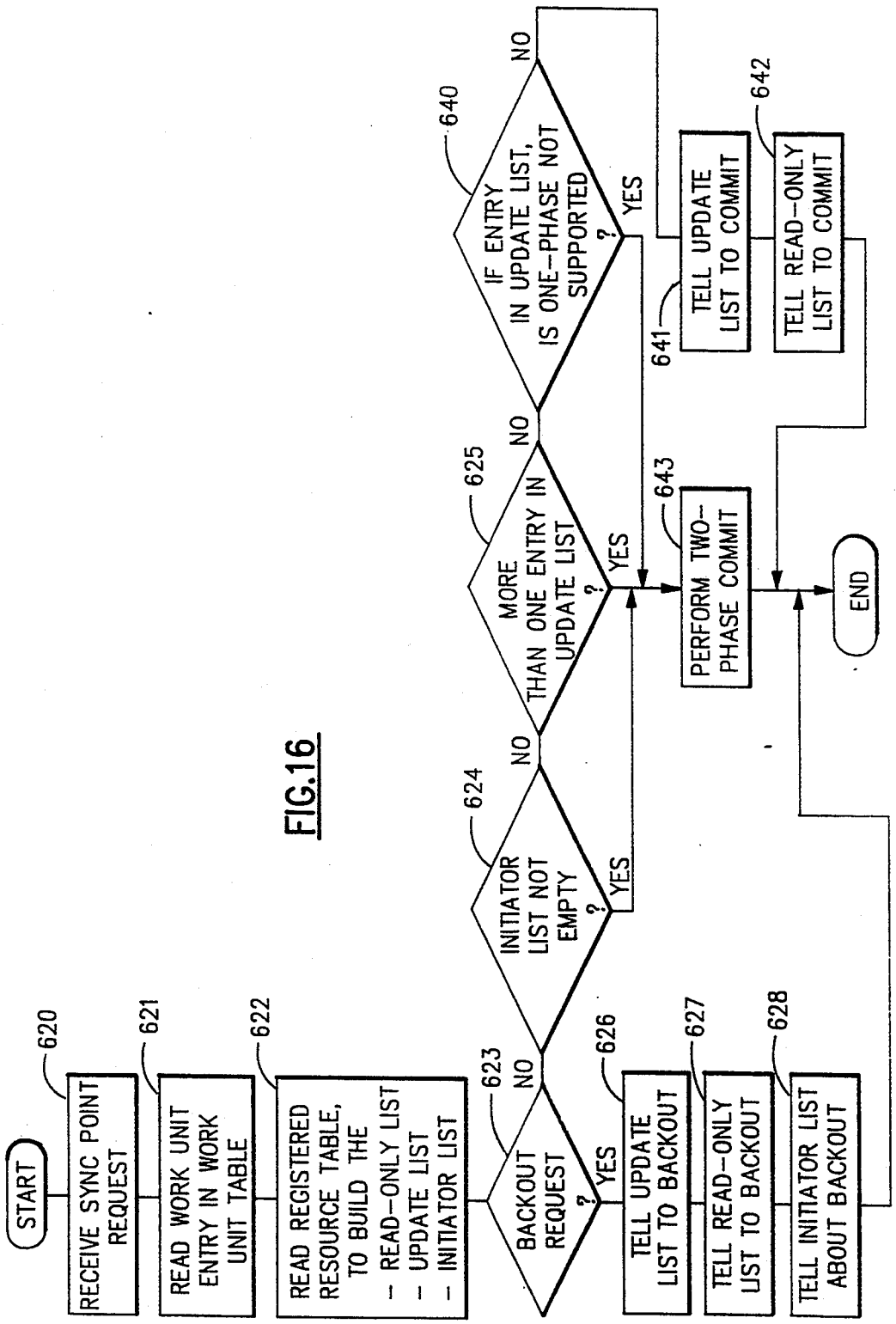
FIG. 16 is a flowchart illustrating processing by the sync point manager in response to a sync point request, and optimizations by the sync point manager in selecting one-phase or two-phase commit procedures.

Syncpoint manager 60 is now concerned with handling the flagged unregistered resources (from step 913) so that they are ignored for normal operation and so that they are eventually erased. Syncpoint manager 60 can erase flagged unregistered resource entries at the beginning of the next syncpoint for the affected work unit. FIG. 16 describes the syncpoint process flow within syncpoint manager 60. When the next syncpoint process reads the registered resource table (step 622), it can erase any flagged unregistered resource entries in that table (an action not shown in FIG. 16). Because step 622 builds all syncpoint resource participation lists for the duration of the current syncpoint process, resource unregistrations and modifications of resource registry entries by adapters will not affect the current syncpoint process. At this point, the total unregistration process is complete.

OPTIMIZATION OF COMMIT PROCEDURES

Each participating resource manager is capable of performing the two-phase commit procedure, such as the two-phase commit procedure described by System Network Architecture LU 6.2: Peep Protocols, SC31-6808, Chapter 5.3 Presentation Services—Sync Point verbs, and may or may not be capable of performing the one-phase commit procedure. The two-phase commit procedure is important to protect resources; however, the two-phase commit procedure is a relatively complex and time consuming process compared to the one:phase commit procedure. For example, as described in more detail below, the two-phase commit procedure requires the time-consuming step of logging information about the sync point participants in the recovery facility log 72 (FIG. 2), whereas the one-phase commit procedure does not require such logging. Also, the two-phase commit procedure requires invocations of the resource adapter coordination exit to perform the commit, whereas the one-phase commit procedure requires only one such invocation to commit data. A "resource adapter coordination exit" is the mechanism for the sync point manager 60 (FIG. 2) to provide information to the associated resource manager. The sync point manager utilizes the two-phase commit procedure only when necessary to make the system operate as expeditiously as possible. In summary, the sync point manager utilizes the two-phase commit procedure whenever a protected conversation is involved, of at least two resources ape in update mode, or one or more participating resource managers is not capable of performing the one-phase commit procedure. Whenever all resources are capable of performing the one-phase commit procedure and no more than one resource is in update mode, the sync point manager utilizes the one-phase commit procedure. Also, if any resource is in read-only mode such that the data in the resource is read and not updated and the resource manager is capable of performing the one-phase commit procedure, then a one-phase commit procedure is used for this resource regardless of the type of commit procedure used for the other resources. A key component of this optimization is the resource manager's ability and resource adapter's ability to determine prior to the synchronization point its state defined by the work request, that is, whether the resource is in read-only mode or in update mode. When a resource is in read-only mode, it means that the application has only read data from the resource. When a resource is in update mode, this means that the application has changed the data in the resource.

The optimization process begins as follows. Application 56 (FIG. 2) makes a work request to a resource (step 612 of FIG. 14). If this is the first work request fop a particular work unit (decision block 615 in FIG. 14), the resource adapter 62 (FIG. 2) associated with the resource registers with the synchronization point manager the fact that it is now an active, participating resource fop the work unit (step 615 in FIG. 14). One of the pieces of information about the resource that must be provided at registration time (step 616 in FIG. 14) is whether the associated resource manager is capable of performing the one-phase commit procedure, e.g., is the resource a database manager which under certain circumstances could perform a one-phase commit procedure. Also during registration, the resource adapter records with the sync point manager whet-her the work request made by the application placed the resource in the read-only mode or update mode (step 616 in FIG. 14).

After the initial registration of a resource, subsequent work requests made by the application against that resource may change the state of the resource. That is, the resource may change from read-only to update mode. When these changes occur, the resource adapter must inform the sync point manager about these changes, and the registration information is updated to reflect the new state (step 619 in FIG. 14).

If the work request from the application is for a protected conversation, the registration entry for the protected conversation adapter will always show that the protected conversation adapter is in update mode and that it is not capable of performing a one-phase commit procedure. Since the protected conversation adapter represents a communication path to another application execution environment, which may involve a plurality of resources, it is not possible fop the protected conversation adapter to determine accurately if it represents a communication path to read-only mode resources or to update mode resources. Therefore, the presence of a communication path to another application execution environment requires the two-phase commit procedure, to provide the necessary protection of the critical resources. The protected conversation adapter insures that the two-phase commit procedure will be used by registering as an update mode resource that is not capable of performing the one-phase commit procedure.

After the application has completed all its work, it will attempt to either commit or back out the data at the resources. To accomplish this, the application issues a sync point request to the sync point manager. To start processing the sync point request, (step 620 in FIG. 16) the sync point manager reads the work unit table to find the entry for the affected work unit (step 621 in FIG. 16). For more information on work units, see *Local and Global Commit Scopes Tailored To Work Unit*. Once the correct work unit entry is located; the sync point manager reads the information in that entry about the resources registered for that work unit and creates three lists of resources (step 622 in FIG. 16).

Each of these lists has a different meaning. The read-only list contains those resources whose data has only been read by the application. The update list contains those resources whose data has been changed by the application and those resources that ape in read-only state but whose resource manager is not capable of performing the one-phase commit procedure. The initiator list contains the list of communication partners that have sent a message that they want to synchronize updates to resources. Each resource may appear in only one of the lists.

In practice, the registration for each resource includes two flags which ape read by the sync point manager and used to determine if a resource should be entered into the update list or the read-only list. The first flag is on when the resource is in read-only mode, and is off when the resource is in update mode. The second flag is on when the resource supports both the one-phase commit procedure and the two-phase commit procedure, and is off when the resource is capable of performing only the two-phase commit procedure. In practice, the registration fop each resource also includes a field that contains information about whether this resource adapter received a message from a communication partner indicating that it wants to synchronize updates to resources. The sync point manager reads this field and uses the data to determine if the resource should be entered into the initiator list.

Once the lists of resources have been built, the sync point manager examines the sync point request type (decision block 623 in FIG. 16). If the sync point request is to back out, the sync point manager performs backout processing as follows. First, all the resource adapters in the update list, if any, are told to back out the changes to their resource (step 626 in FIG. 16). Then, all the resource adapters in the read-only list, if any, are told to back out the effects on their resource (step 627 in FIG. 16). It should be noted that the processing of a "backout" for a read-only resource is defined by the resource implementation, since there are no changes to the actual data in the resource to be backed out. For example, processing for a backout of a read-only file in a shared file resource manager 63 (FIG. 2), could include closing the file and discarding any file positioning information previously maintained for the application's use. After the read-only resources are told to back out, then all the resource adapters in the initiator list, if any, are told that this application execution environment backed out the changes for this synchronization point (step 628 in FIG. 16).

If instead the sync point request is to commit (decision block 623 in FIG. 16), then the sync point manager starts the optimization process for the commit. The first step in the optimization process is to determine if the initiator list is not empty (decision block 624 in FIG. 16). If the initiator list is not empty, this means that this application execution environment is a cascaded initiator in the sync point tree, and that the full two-phase commit procedure must be used for this commit. This is necessary because neither application execution environment knows the full scope of the sync point tree, that is, how many resources are active and in update mode for this synchronization point. Since the number is not known, the two-phase commit procedure must be used, to provide the necessary protection of these critical resources.

If the initiator list is empty (decision block 624 in FIG. 16), the next step is to determine if more than one resource is in the update list (decision block 625 in FIG. 16). If this is true, then the full two-phase commit procedure must be used for this commit. The two-phase commit procedure provides more protection for the update mode resources, because no resource commits its changes until all resources have voted that they can commit their changes.

If there are less than two resources in the update list (decision block 625 in FIG. 16), the next step is to determine if there are zero or one resources in the update list 640 (FIG. 16). If there are zero resources in the update list, then the one-phase commit procedure will be used to commit the read-only resources. Likewise, if there is exactly one resource in the update list, and its resource manager is capable of performing the one-phase commit procedure, then the one-phase commit procedure will be used.

The one-phase commit procedure starts by the sync point manager telling the resource adapters in the update list, if any, to commit their changes (step 641 in FIG. 16). It should be noted that the one-phase commit of data by the resource manager is achieved by only one invocation of the resource adapter, in contrast with the two invocations needed during the two-phase commit procedure. Since there can be only zero or one resources in update mode in the entire synchronization point, there is no chance of data inconsistency caused by different decisions fop different resources. Also note that during the one-phase commit procedure, there is no writing to the recovery facility log 72 (FIG. 2), as opposed to the required logging that is part of the two-phase commit procedure (steps 644, 648, 651, 658, 659 of FIG. 17). The one-phase commit procedure ends with the sync point manager telling the resource adapters in the read-only list, if any, to .commit their changes (step 642 in FIG. 16). It should be noted that a "commit" of a read-only resource is defined by the resource implementation, since there are no actual changes to the data to be committed. For example, some shared file resource managers 63 (FIG. 2) provide read consistency, so when an application reads a file in a shared file resource manager, the application is provided with a consistent image of the file, that is, changes made to the file by other application environments will not interfere with the reading of the contents of the file, as they existed at the time the file was opened. When the application opens the file with the intent of read, the image is created by the resource manager, which is considered to be a read-only resource. When the application is done reading the file, it closes the file and attempts a commit. When the shared file resource manager performs the commit as a read-only resource, it could discard the image maintained for the application's use. Now, if the application opens the file again, it will see an image of the file which contains all committed updates made by other applications.

If the sync point request results in a two-phase commit procedure according to the outcome of decision blocks 624, 625, or 640 of FIG. 16, the sync point manager 60 (FIG. 2) still optimizes the commit of the read-only resources. There are several parts to this optimization for the read-only resources. First, (step 644 of FIG. 17) information about the read-only resources is not written to the recovery facility log 72 (FIG. 2). Information about the read-only resources does not have to be logged at the recovery facility 70 (FIG. 2) because the read-only resources will never log the state of "Indoubt" on their own logs. This means that the resource manager will never attempt to resynchronize with the recovery facility 70 (FIG. 2), so the recovery facility does not need any knowledge about the resource. Second, the read-only resources are not involved in the first phase of the commit, which is sending prepare to all resource adapters in the update list (step 645 of FIG. 17). The actions of a read-only resource cannot affect the protection of the resources, since in terms of data consistency, a backout is equivalent to a commit for a read-only resource.

Figure 17:
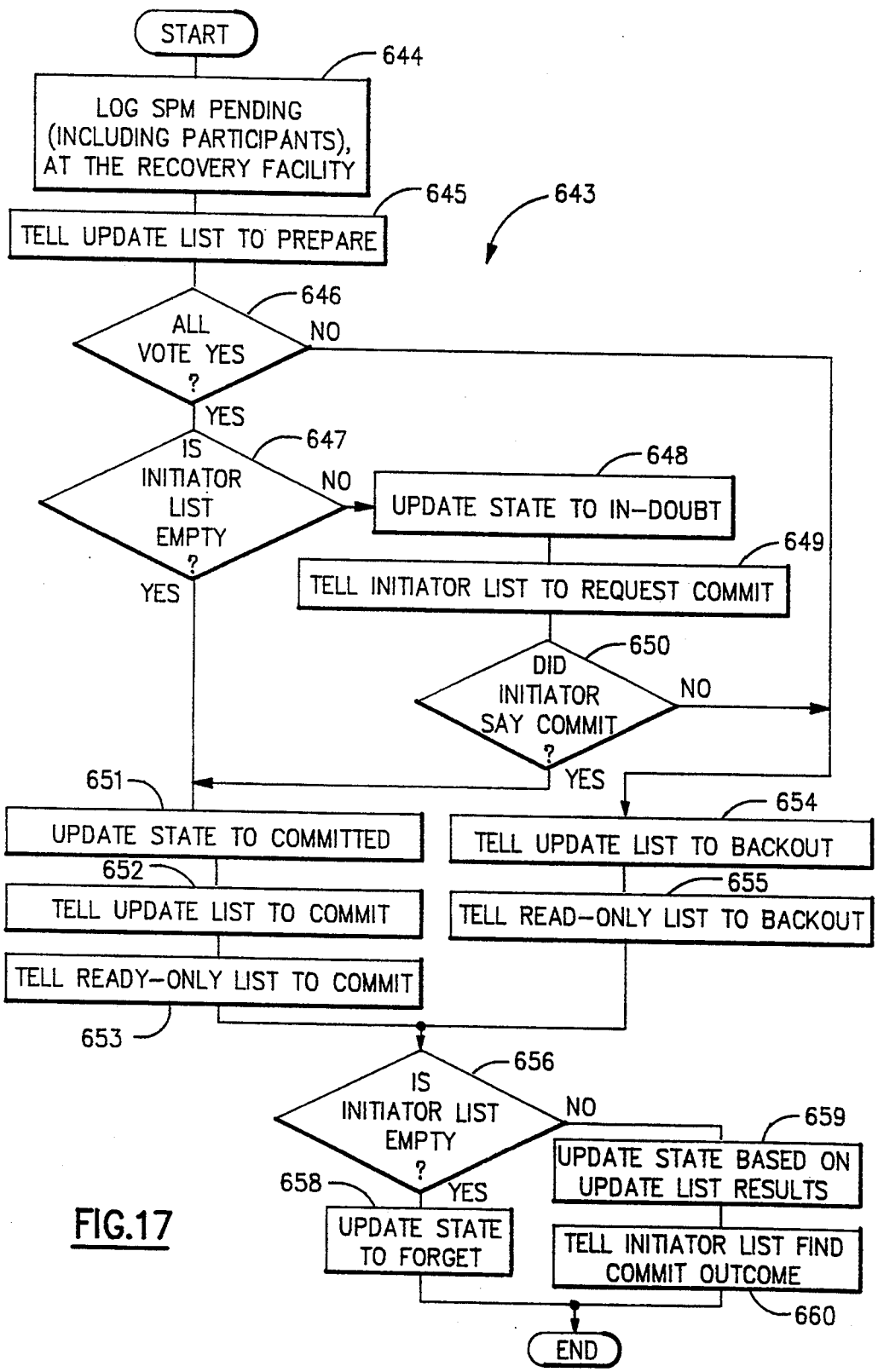
FIG. 17 is a flowchart illustrating the two-phase commit procedure.

The only time that the read-only resources are involved in the two-phase commit procedure is when they are told the final direction of the commit, that is, they are told whether to commit their changes (step 653 of FIG. 17) or told to back out their changes (step 655 of FIG. 17).

Figure 18:
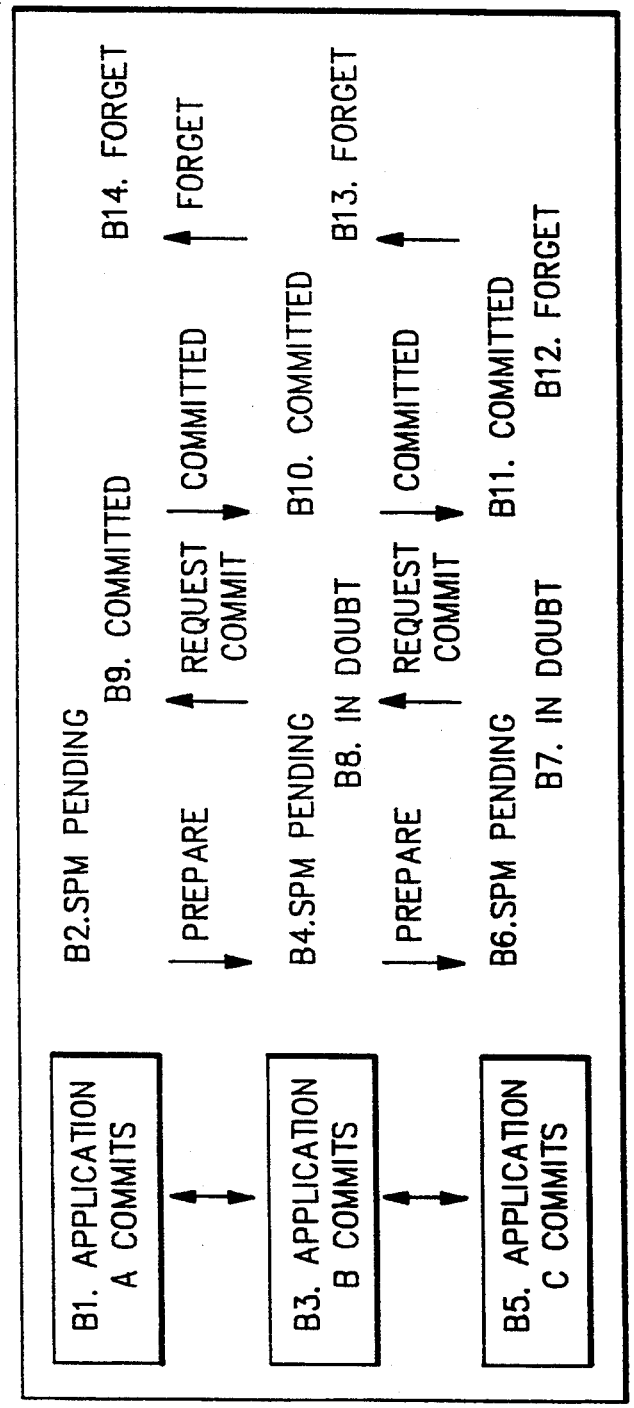
FIG. 18 is a flow diagram illustrating three distributed application programs participating in a two-phase commit procedure.

The following is an example of a two-phase commit procedure involving three different application execution environments, which are part of a system such as System. 50 (FIG. 2). Each application execution environment is executing a different application. Application A and Application B are communicating via a protected conversation; Application B and Application C are communicating via a protected conversation. The two-phase commit procedure is started when Application A attempts to commit by issuing a commit request B1 (FIG. 18) to the sync point manager which is currently running in the same execution environment as Application A. Phase one starts when the sync point manager writes the SPM Pending log record to the recovery facility log B2 (FIG. 18). The SPM Pending log record contains the logical unit of work identifier for the synchronization point and information about the synchronization point participants, in this case, the SPM Pending record shows one participant, Application B.

After the SPM Pending log record is successfully written to the recovery facility log, the sync point manager sends a prepare message via the protected conversation adapters to Application B. Application B is notified that its conversation partner Application A wishes to synchronize resources, and Application B subsequently issues a commit request B3 (FIG. 18) to the sync point manager which is currently running in the same execution environment as Application B.

For the sync point manager at B, the first phase of the two-phase commit procedure starts by writing the SPM Pending record to the recovery facility log B4 (FIG. 18). The SPN Pending record contains the logical unit of work identifier for the synchronization point and information about the synchronization point participants. In this case, the SPM Pending log record contains information about Application A, showing it as the synchronization point initiator, and Application C as a synchronization point participant. Once the SPM Pending log record is successfully written to the recovery facility log, the sync point manager sends a prepare message via the protected conversation adapters to Application C. Application C is notified that its conversation partner Application B wishes to synchronize resources, and Application C subsequently issues a commit request B5 (FIG. 18) to the sync point manager which is currently running in the same execution environment as Application C.

The sync point manager starts the first phase of the two-phase commit procedure by writing the SPM Pending record to the recovery facility log B6 (FIG. 18). The SPM Pending record contains information about the synchronization point participants and the logical unit of work identifier for the synchronization point. In this instance, the SPM Pending record contains information about Application B, which is the synchronization point initiator. The SPM Pending record also shows that there are no synchronization point participants for Application C.

Since there are no more participants, there is no need for the sync point manager at C to send a prepare message via any protected conversation adapter. The sync point manager at C then sends a state record to the recovery facility, updating the state of the syncpoint to Agent, In-Doubt B7 (FIG. 18). Once the skate record is successfully written to the recovery facility log, the sync point manager at C responds to the prepare message by sending a request commit message via the protected conversation adapters to the sync point manager at 8.

The sync point manager at B receives the request commit message from the sync point manager at C via the protected conversation adapters. Since only request commit messages were received, the next step is to send a state record to the recovery facility, updating the state of the synchronization point to Agent, In-Doubt B8 (FIG. 18). Once the state record is successfully written to the recovery facility log, the sync point manager at B responds to the prepare message from A by sending a request commit message via the protected conversation adapters to the sync point manager at A.

The sync point manager at A receives the request commit message from the sync point manager at B, which completes the first phase of the synchronization point. The sync point manager must then make the decision, as the synchronization point initiator, whether to commit or back out the logical unit of work. Since only request commit messages were received by the sync point manager at A, the sync point manager at A will decide to commit the logical unit of work. The second phase of the two-phase commit procedure starts by the sync point manager recording this decision by sending a state record to the recovery facility. The state record changes the state of the synchronization point to Initiator, Committed B9 (FIG. 18). Once the state record is successfully written to the recovery facility log, the sync point manager sends a committed message via the protected conversation adapters to the sync point manager at B.

The sync point manager at B receives the committed message, which completes the first phase of the two-phase commit procedure. The second phase is started when the sync point manager sends a state record to the recovery facility, updating the state of the synchronization point to Initiator-Cascade, Committed B10 (FIG. 18). The sync point manager at B then sends a committed message to the sync point manager at C via the protected conversation.

The sync point manager at C receives the committed message, which completes the first phase of the two-phase commit procedure. The sync point manager at C starts the second phase by sending a state record to the recovery facility, updating the state of the synchronization point to Initiator-Cascade, Committed B11 (FIG. 18). Since there are no more participants to receive the committed message, the sync point manager at C is finished with the synchronization point. To record this, the sync point manager at C sends a state record to the recovery facility, updating the state of the synchronization point to Forget B12 (FIG. 18). This state tells the recovery facility that all records written by the sync point manager at C for the logical unit of work identifier ape no longer needed and can be erased. After the state record is successfully written to the recovery facility log, the sync point manager at C responds to the committed message by sending a forget message to the sync point manager at B via the protected conversation adapters, which ends the second phase of the two-phase commit procedure fop the sync point manager at C. After the forget message is sent, the sync point manager at C returns control to Application C, with an indication that the synchronization point has completed successfully.

The sync point manager at B receives the forget message from the sync point manager at C via the protected conversation adapters. The receipt of the forget message indicates that the sync point manager at B has completed the synchronization point. To record this, the sync point manager at B sends a state record to the recovery facility, updating the state of the synchronization point to Forget B13 (FIG. 18). This state tells the recovery facility that all records written by the sync point manager at B fop the logical unit of work identifier ape no longer needed and can be erased. After the state record is successfully written to the recovery facility log, the sync point manager at B responds to the committed message by sending a forget message to the sync point manager at A via the protected conversation adapters, which ends the second phase of the two-phase commit procedure for the sync point manager at B. After the forget message is sent, the sync point manager at B returns control to Application B, with an indication that the synchronization point has completed successfully.

The sync point manager at A receives the forget message. The receipt of the forget message indicates that the sync point manager at A has completed the synchronization point. To record this, the sync point manager at A sends a state record to the recovery facility, updating the state of the synchronization point to Forget B14 (FIG. 18), which tells the recovery facility that all records written by the sync point manager at A for the logical unit of work identifier are no longer needed and can be erased. This ends the second phase of the two-phase commit procedure for the sync point manager at A, which means that the sync point has completed at every participant. After the state record is successfully written to the recovery facility log, the sync point manager at A returns control to Application A, with an indication that the synchronization point has completed successfully.

COORDINATED HANDLING OF ERROR CODES AND INFORMATION DESCRIBING ERRORS IN A COMMIT PROCEDURE

FIGS. 29-32 illustrate components of system 50A which provide to application 56A a return code, if any resource or protected conversation reports an error or warning. Also, application 56A can request detailed error information from each resource and protected conversation. The detailed error information identifies the reporting resource and describes the reason for synchronization point errors or could be a warning about the synchronization point.

Application 56A is running in application execution environment 52A (see FIG. 52) in system 50A. Resource adapter 62A is the adapter for a shared file resource manager 63A, resource adapter 62G is the adapter for SQL resource manager 63G, and protected conversation adapter 64A is the adapter for a protected conversation with system 50B via protected conversation adapter 64B. In this example, adapters 62A and 64A have the same product identifier since they are integral components of the system control program in system 50A; adapter 62G has a unique product identifier since it is part of a different product; adapters 62A and 64A have different resource adapter exit identifiers. For illustrative purposes, resource adapter 62G produces error blocks that are indecipherable to adapter 56A and has a prior art function to return detailed error information to adapter 56A.

In response to work requests (Step 651, FIG. 29), adapters 62A and 62G and 64A register (Step 655), with sync point manager 60. Sync point manager 60 creates registry objects 162A, 162B, and 162C, filling in the identifiers of the participating resources (shared file resource manager 63A, SQL resource manager 63G and the protected conversation partner in system 50B). Also, the registration information includes the resource adapter exit routine names, product identifiers for the resources and protected conversation, and the required length of an error block for each resource. The resource adapter exit name is required when a product such as the system control program in system 50A in this illustrated example, owns two resource types. The product identifier and the resource adapter exit name both identify the participating resource type e.g. a shared file resource manager, a SQL resource manager, or a protected conversation. All resource adapters of the same resource type within an execution environment use error blocks from the same pool to reduce the paging set of the system 50A. (See FIG. 31 for a graphical description.) If a resource asks in Step 653 (FIG. 29) for an error block of the same size as another resource type, the error block pool is shared by both resources. For each registrant (62A, 62G, and 64A) the parameter list to call a resource adapter exit is built by sync point manager 60; it contains the address and length of usable error information of the resources error block. Placing the usable error information length in the registry entry results in system 50A's paging set being unaffected if no error occurs.

Figure 29:
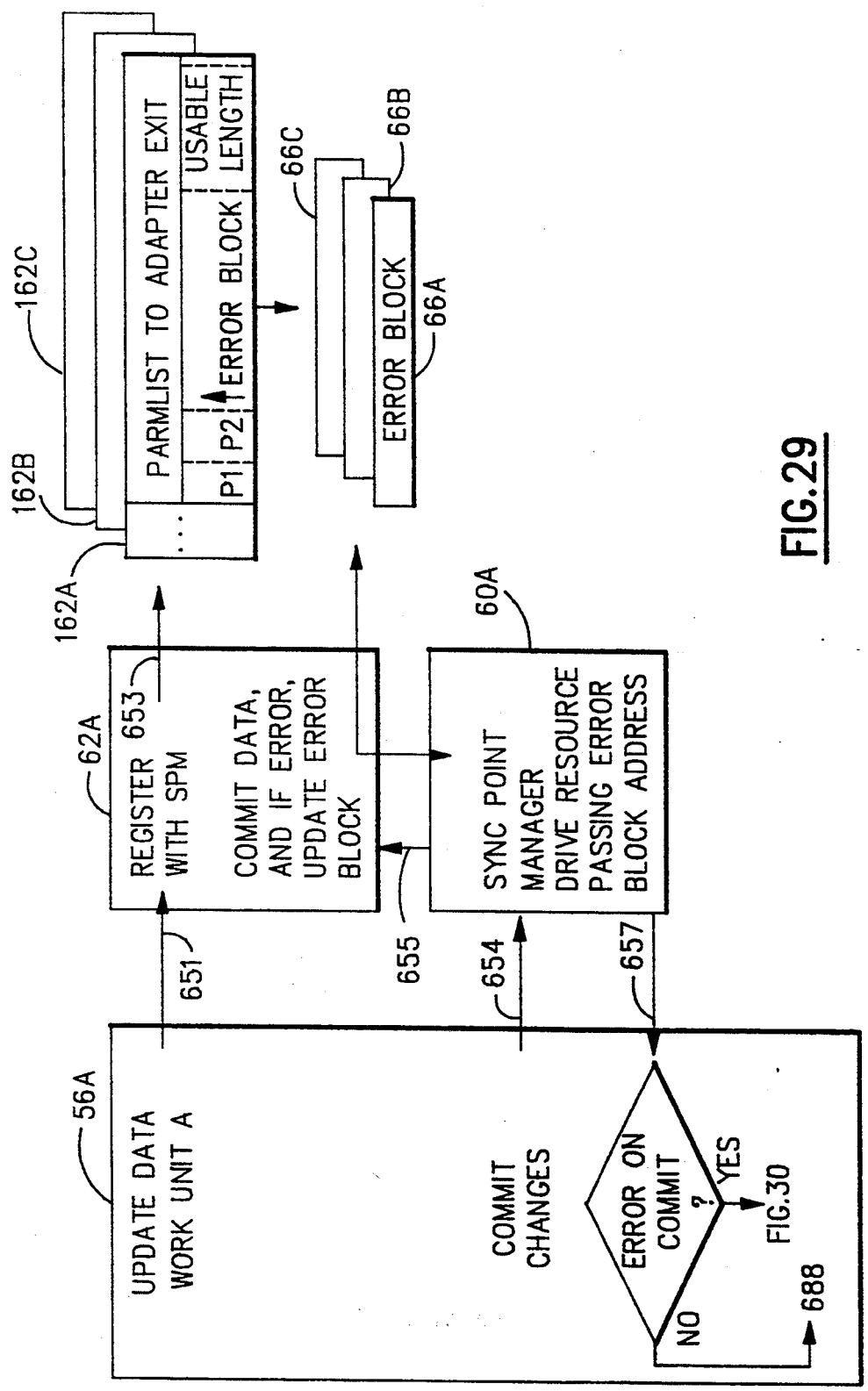
FIG. 29 is a block diagram which illustrates participation by the resource adapter and sync point manager of FIG. 2 in passing an error flag and information that defines a problem in a commit procedure to an application program.

Next, application 56A requests a commit from sync point manager 60 (Step 654, FIG. 29). If application 56A desires detailed information from shared file resource manager 63A in the event an error occurs during this synchronization point—a prior-art function of shared file resource manager in system 50A—then application 56A transmits an error data address on the Commit verb 654, FIG. 29) of a data area in its execution environment to store a copy of the detailed error information. This area is used if resource manager 63A reports an error or warning. The sync point manager 60 receives the verb instead of the shared file resource adapter 62A and the error data address is saved by the sync point manager 60. On completion of the synchronization point all errors and warnings (stored in error block 66A, FIG. 29) would be moved to application 56A's error data area (not shown). Thus, compatibility with the prior-art error-pass-back architecture of shared file resource manager is preserved.

In Step 655 (FIG. 29) sync point manager 60 passes each resource adapter (62A, 62G, 64A, shown in FIG. 32) the address of its error block (objects 66A-C) saved in registry objects 162A-C that were built for each resource adapter when the resource adapter registered (Step 653). If there are no failures, the commit from Step 654 is complete, then sync point manager 60 reports back to application 56A the fact that the updates have been committed (Step 657).

However, if a resource detects errors or warnings, its adapter, 62A, 62G or 64A (Step 670 in FIG. 30) fills in the detailed error information using the error block (FIG. 29) as a place to store whatever is required by its design and updates the usable error length, which is an input/output parameter. Since a resource adapter exit can be called many times during a two-phase commit procedure it can append error information to the error block if necessary; it may have three warnings and one severe error for instance; it manages the usable error length itself (Step 672), Sync point manager 60 receives from the resource adapter exit a single return code in a common format and proceeds with the two-phase commit procedure's logic (Step 673); Sync point manager 60 neither knows nor cares about the contents of the error blocks 66A-C. If the two-phase commit procedure's logic dictates an error or warning, the sync point manager transmits a consolidated return code to application 56A (Step 657 in FIG. 29 and 674 in FIG. 30).

Figure 30:
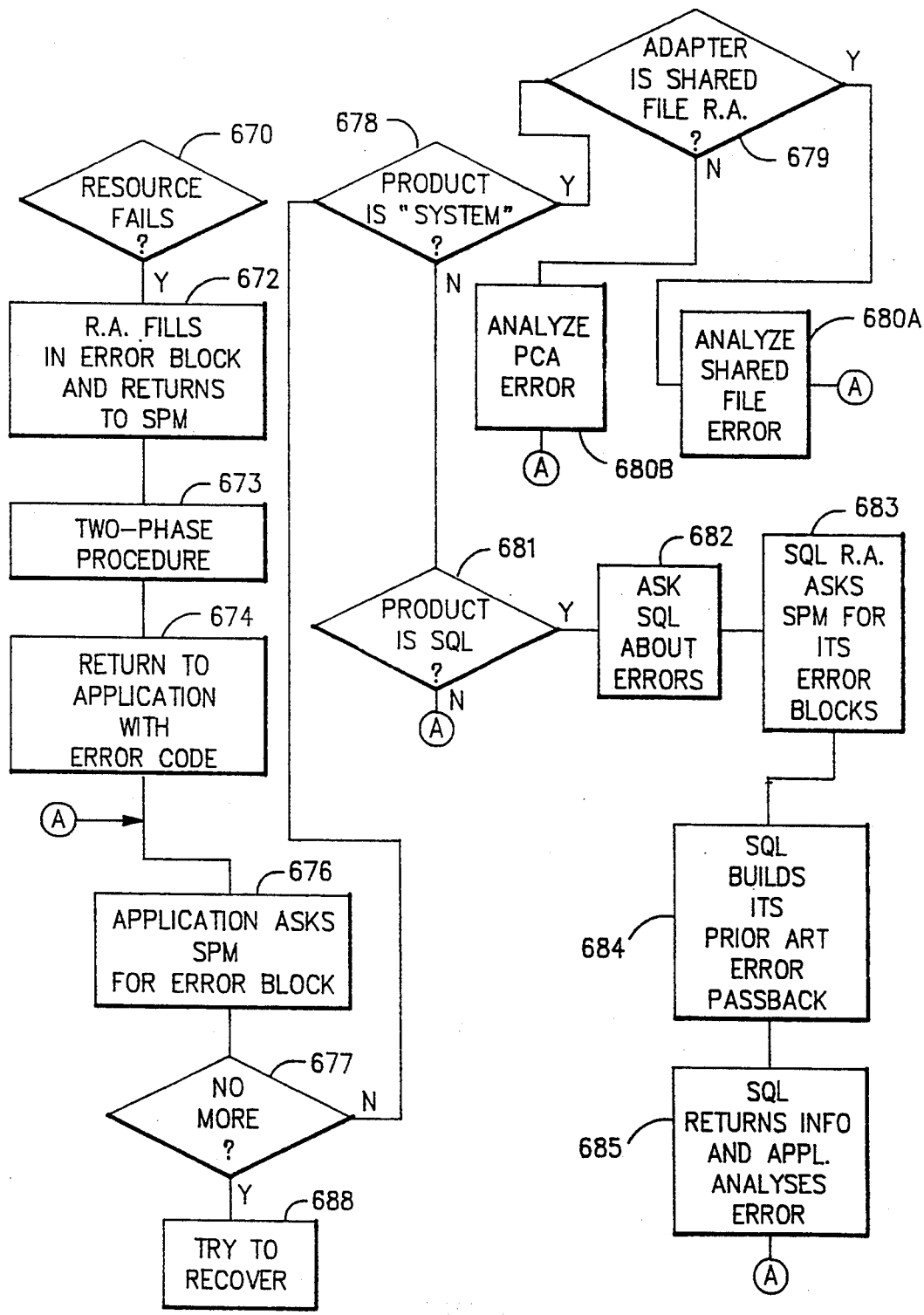
FIG. 30 is a flowchart illustrating a procedure for using the components of FIG. 29 to pass the error information to the application program.
Figure 31:
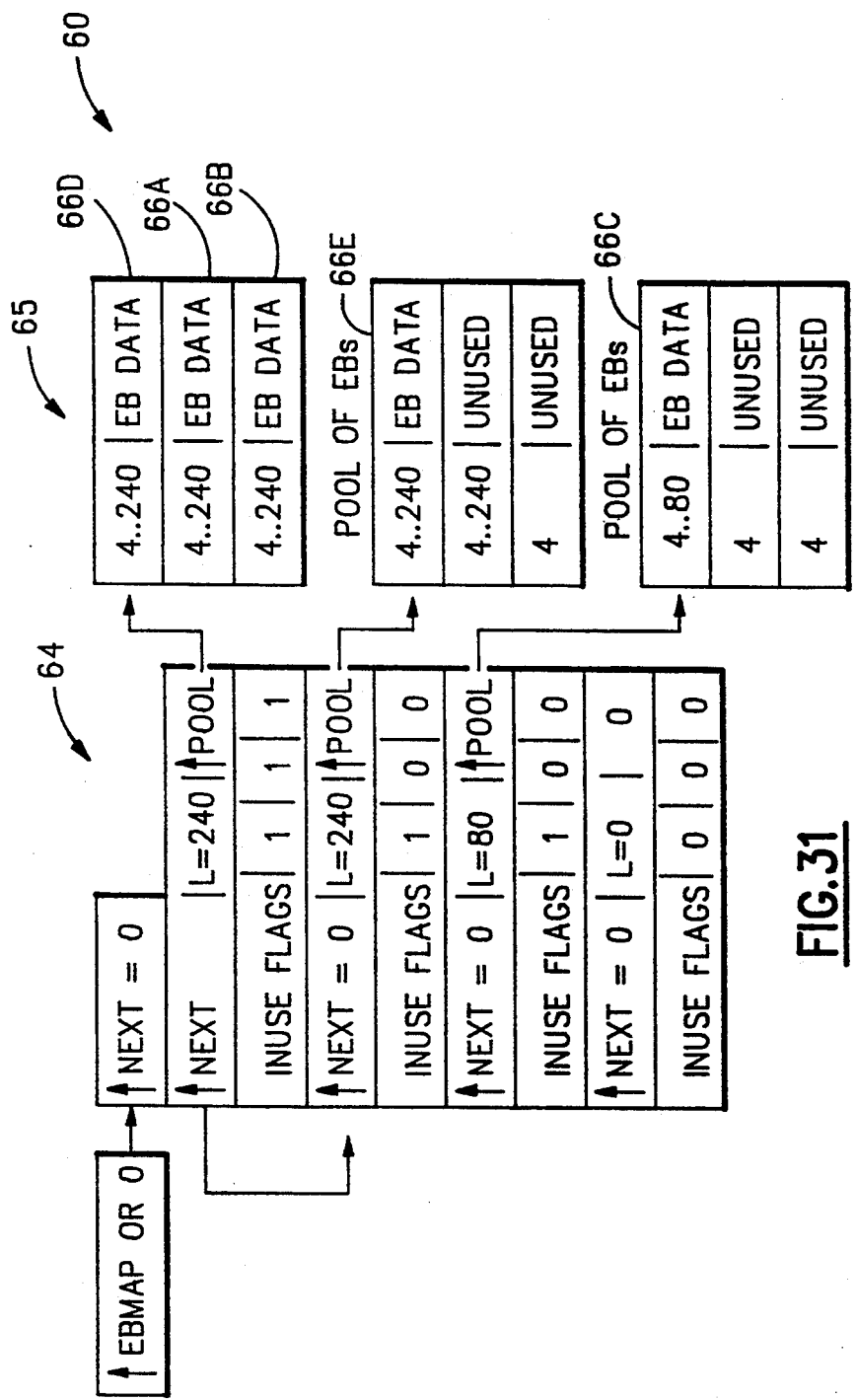
FIG. 31 is a control block structure for sharing the pages used by error blocks associated with FIG. 29 in order to reduce system working storage.
Figure 32:
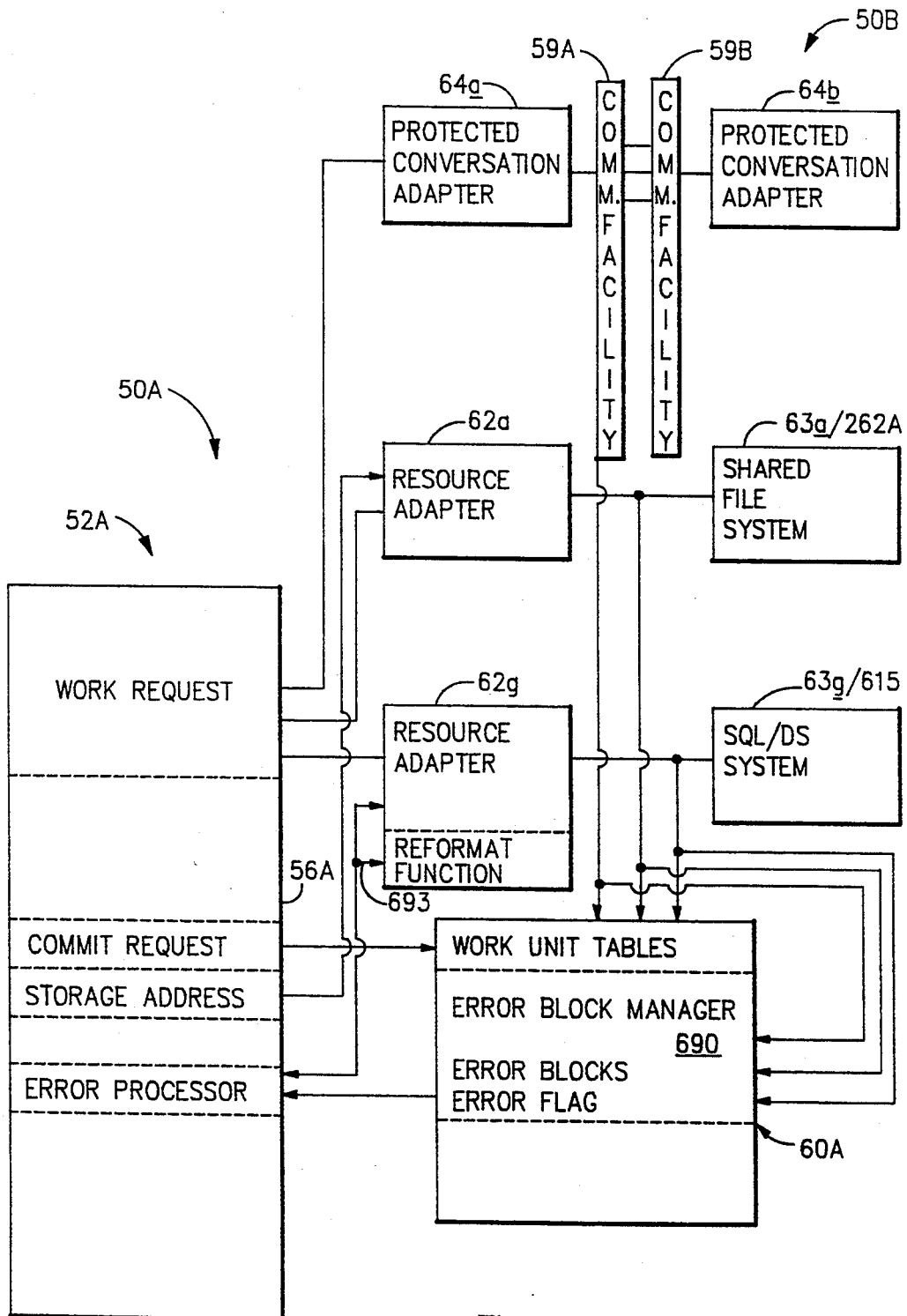
FIG. 32 is a block diagram of components of FIG. 2 that participate in the generation and management of the error flags and information of FIG. 29.

On receipt of the return code, application 56A asks for a detailed error block by calling a routine provided by sync point manager 60 (Step 676, FIG. 30). In response, the error block manager (Function 690, FIG. 32) within sync point manager 60 looks for a non-empty error block and moves it to application 56A's buffer. Other output parameters are the product identifier and resource adapter exit name for the owner of this error block. Application 56A then examines the product identifier. If the reporting product is the system control program in system 50A (decision block 678, FIG. 30), then application 56A examines the resource adapter exit name to distinguish between the two system control program adapters. Now it can look at the error block for the resource name and the cause of failure (Step 680A or B). Mapping macros are provided by the system control program in system 50A for the shared file resource manager and for protected conversations to aid in reading error blocks. Also a routine (Interaction 693, FIG. 32) is provided by each adapter to reformat its error block into a convenient form, parameter list. Existing applications using the shared file resource manager require no change since its error-pass-back method is unchanged. Protected conversations are new so the compatibility object is not violated for existing applications using communications.

If the product is a SQL resource manager (decision block 681 FIG. 30), then the error block must be deciphered, assuming for illustration that it is not in a form which application 56A can presently understand. Thus, application 56A asks resource adapter 62G to identify the type of error in a form that application 56A can understand (Step 682). In response (Step 683), the SQL resource adapter 62G—reads the error block from the sync point manager, using a routine very similar to the routine used by application 56A but specialized for resource adapters. Note that the SQL resource adapter 62G and application 56A are given unique tokens so that both can loop through the same error blocks without confusion. SQL resource adapter 62G reformats the data in error block 66C (FIG. 29) to a form compatible with application 56A (Step 684 FIG. 30), and then sends the reformatted detailed error information to application 56A (Step 685). It should be noted that only a minor internal change is required to this example of a pre-existing SQL resource adapter to participate in coordinated handling of error information, i.e. it must ask sync point manager 60 for its error blocks. No change is required by pre-existing applications if only one resource is updated by adapter 56A; the external appearance of the SQL resource adapter error-passback interface is preserved. Additional error codes indicating adapter 56A is using a new function, coordinated synchronization point, are not considered an incompatibility.

Application 56A then queries sync point manager 60 to determine if there are additional error blocks (Step 676 FIG. 30). If so (Decision block 677), Steps 678-685 are repeated to obtain one or more additional error blocks From sync point manager 60. If there are no additional error blocks, decision block 677 leads to Step 688 in FIG. 29 in which application 56A continues processing, either to pursue a different function or to attempt to correct the failure.

The sync point manager 60 keeps error blocks until the next synchronization point. as described in the foregoing section entitled "Registration of Resources For Commit Procedure."

LOG NAME EXCHANGE FOR RECOVERY OF PROTECTED RESOURCES

When application 56 (FIG. 2) issues a sync point request, a two-phase commit procedure is initiated for committing changes for all protected resources. Protected resources include protected resources such as data bases managed by a resource manager, as well as a special classification of resources called protected conversations, which represent a distributed partner application. As noted in the section "Coordinated Sync Point Management of Protected Resources for Distributed Application", the first phase in the two-phase commit procedure is to prepare the resources for the commit. Once all resource managers have agreed to a commit during the first phase, then the second phase accomplishes the actual commit. If any resource is unable to prepare during the first phase, then all the resources are ordered to back out their changes during the second phase instead of committing them. All resource data changes are subject to back out until the time that they are actually committed.

In order to support a recovery procedure, as described in the section "Recovery Facility For Incomplete Sync Points For Distributed Application", for completing a sync point when the sync point cannot complete due to a failure, it is necessary that sync point information be previously stored and retained in recovery facility logs 72 and resource manager logs 800, which are in non-volatile storage facilities. Logging is done by each sync point manager 60 as well as by each participating resource manager 63. Information recorded in the log includes the current state of the sync point from the standpoint of the logging sync point manager or resource manager, the current name(s) associated with the sync point log of known sync point participants, and, in the case of sync point managers, information required to establish conversations with sync point participants at the time of recovery from sync point failures.

Information concerning the log name of known sync point participants is logged separately or partitioned from the remaining sync point information. The log name information is recorded in a log name log 72A2 (FIG. 19), while the remaining information is recorded in a sync point log 72A1.

When a failure occurs in recording information in any of the sync point logs, requiring that the log be reinitiated, in effect beginning a new log, the log is assigned a new name. When this occurs it is important that other sync point managers and resource managers that are sync point participants with the holder and maintainer of the new log be notified that the log has been reinitialized and that a new name is in effect.

It is essential for automatic resynchronization that each sync point manager and participant have valid sync point logs. That is, the logs at the time of resynchronization must be the same logs that were used during sync point. If any logs have been replaced or damaged then resynchronization cannot proceed normally. To ensure that all logs are correct, there is a pre-sync point agreement on the log names of each sync point manager and participating resource, which is accomplished by a procedure called exchange of log names. There is another exchange of log names just before the resynchronization begins, whereupon, the log names of all participants being determined to be the same as when the sync point began, the resynchronization can proceed to recover the failed sync point, knowing that no participant had a log reinitialization. Without this procedure, invalid sync point log information could lead to a failure in or erroneous results from the recovery processing.

As an optimization for protected conversations between application environments in the same system (for example application environments 52A and 52B in system 50A) it is not necessary to exchange log names since the respective sync point managers 60A and 60B share the same recovery facility 70A and recovery facility log 72A. When there is a common recovery facility log 72A, the step of synchronizing logs (by exchanging log names) is not necessary and may be omitted. Sync point manager logging is accomplished by the common recovery facility 70 which resides in the same system as the supported sync point manager(s) 60. All sync point managers 60A, 60B, and 60C in a system 50A share the common recovery facility 70A and the same supporting pair (sync point and log name) of logs in recovery facility log 72A.

Figure 33:
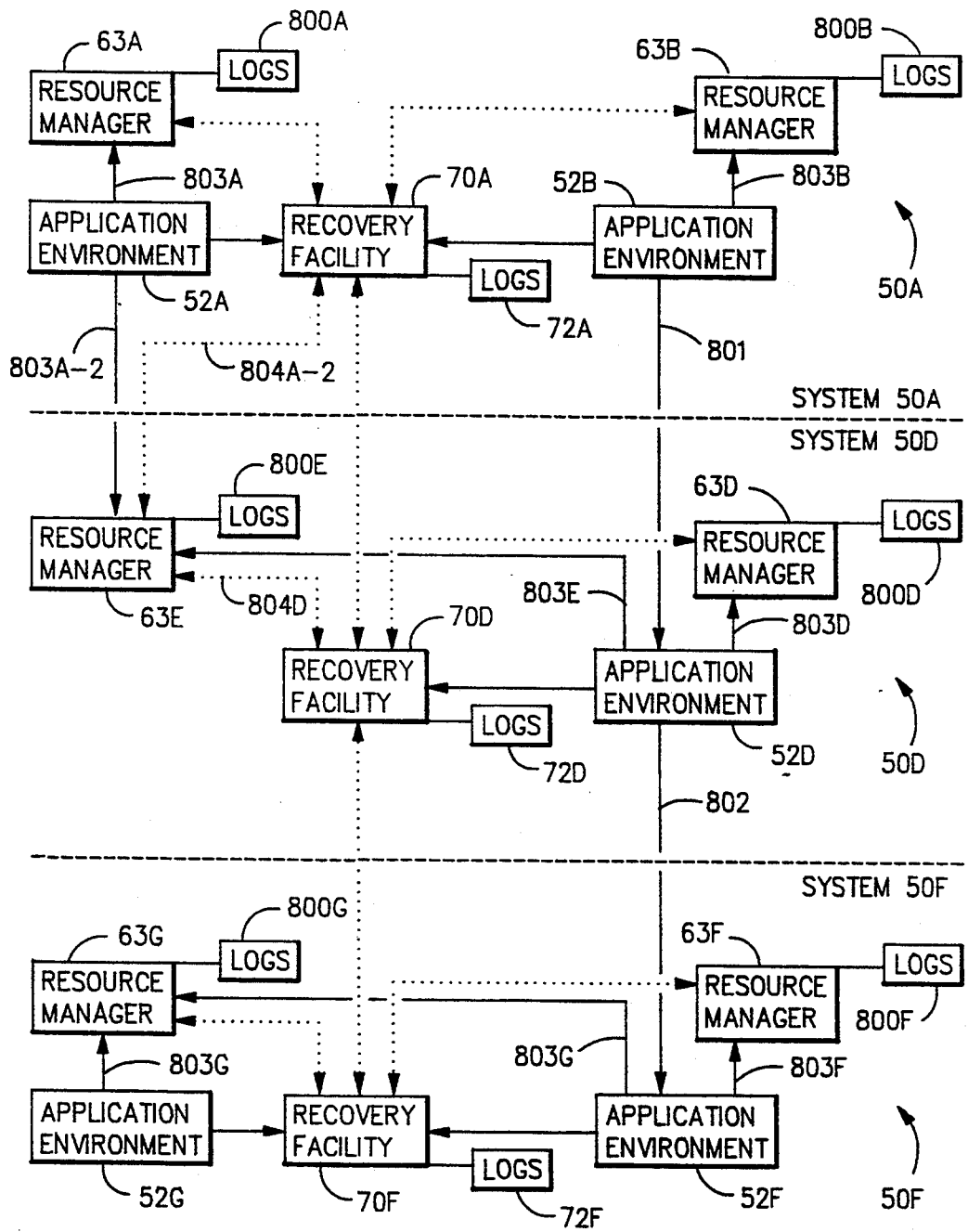
FIG. 33 is a block diagram illustrating three systems including commit cycles that encompass more than one of the systems commit scopes incorporating resource managers that reside in the same and different systems as an initiating application and communications paths employed during commit processing as well as paths used for sync point recovery processing.

FIG. 33 illustrates three systems 50A, 50D, and 50F, the recovery facilities in each, and communications between the systems. Each application environment 52A, 52B, 52D, 52F, and 52G includes an application program 56A, 56B, 56D, 56F, and 56G respectively (not illustrated), which utilizes a sync point manager 60A, 60B, 60D, 60F, and 60G, respectively, for purposes of coordinated resource-recovery. A sync point manager uses the recovery facility in its system to manage the sync point and log name logs required for recovery from a failing sync point. For example, the sync point managers in application environments 52A and 52B use the recovery facility 70A to record in log 72A. Resource managers 63A, 63B, 63D, 63E, 63F, and 63G maintain their own sync point and log name logs 800A, 800B, 800D, 800E, 800F, and 800G, respectively. The illustrated scope of sync points are indicated by solid lines and arrows. Although sync points may be initiated by any participant and the scope of a sync point is dynamic, the illustration is static for simplicity of illustration. For the illustrated static cases, sync points flow between application environments 52B to 52D to 52F via the associated sync point managers and protected conversation adapters (not shown) via communication solid lines 801 and 802; and from application environments 52A, 52B, 52D, 52F, and 52G via the associated sync point managers and resource adapters to the resource managers 63A, 63B, 63D, 63E, 63F, and 63G via communications solid lines 803A-1, 803A-2, 803B, 803D, 803E, 803F, and 803G, respectively. The dotted lines show communication paths employed at the time of pre-sync point agreements and at the time of resynchronization for recovering a failing sync point. For resource managers, this dotted line communication is between the resource manager and the recovery facility of the system of the originating application environment, for example, resource manager 63E to 70A, not 70B.

Three sync point scopes are included in FIG. 33. The first involves a single application environment 52A (and sync point manager) and utilizes two resource managers 63A and 63E. The second sync point scope involves three application environments 52B, 52D, and 52F each involving various participating resource managers (63B for 52B, 63D and 63E for 52D, and 63F, G for 52F), as further illustrated by a sync point tree in FIG. 34.

Figure 19:
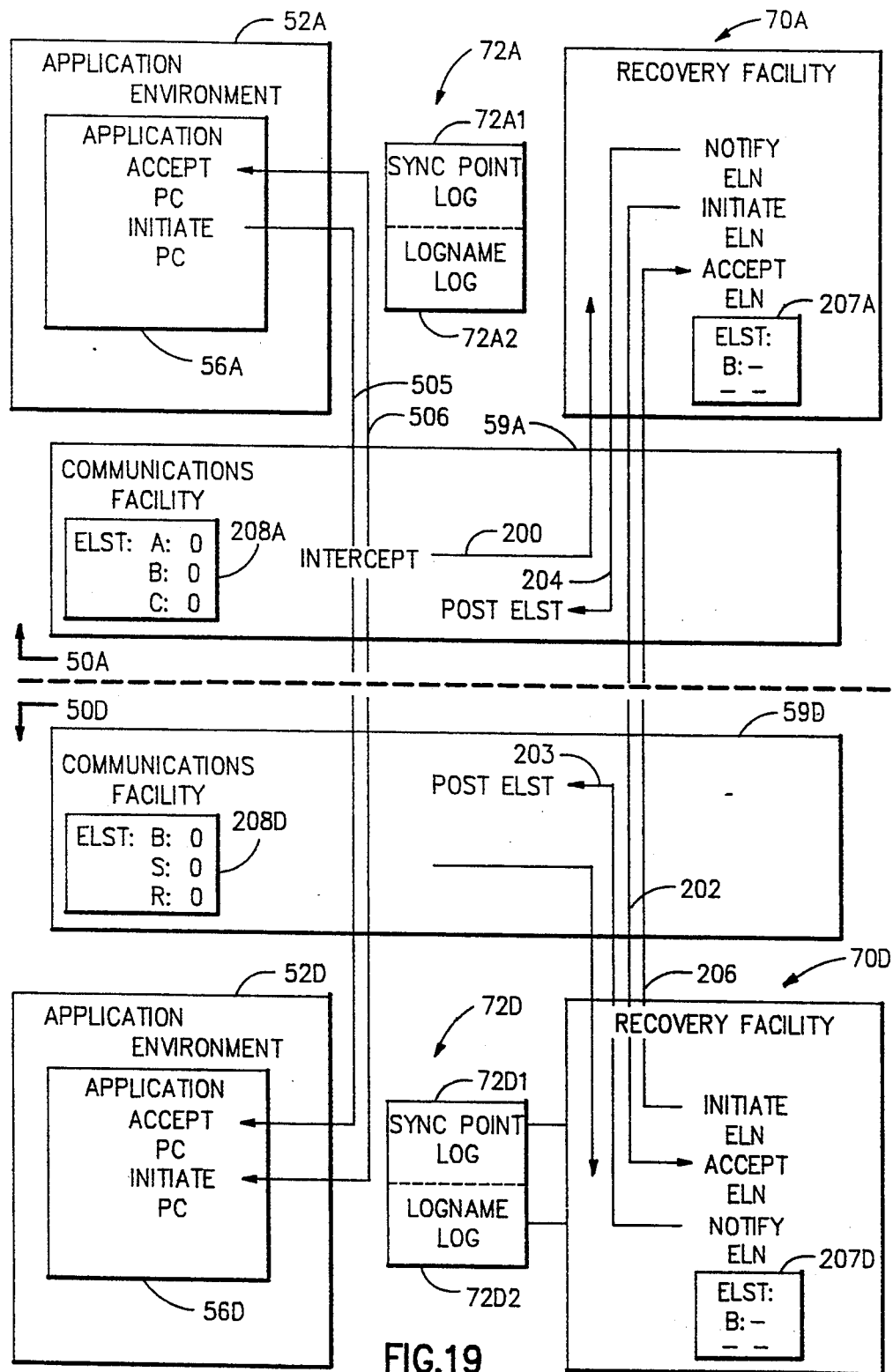
FIG. 19 is a timing diagram of a protected conversation in the global logical unit of work of FIGS. 7 and 8.

FIG. 19 block diagram and FIGS. 20A, 20B, 21, and 22 flowcharts illustrate by example the process for log name exchange involving a protected conversation between system 50A and 50D. Application 56A initiates a protected conversation with application 56D (step 831 in FIG. 20A). Application 56A is running in application environment 52A in system 50A and application 56D is running in application environment 52D in system 50D. The conversation initiation includes specification of a path (system identifier), "B" in the current example, and a resource identifier for the application partner. The path identifies system 50D and the resource identifier identifies target application 56D. Resource identifiers are explained in detail below in this section. The system control program includes a facility which acts as the resource manager of applications, to support the establishment of an application resource identifier for applications and to recognize those identifiers when used in conversation initiation, then to either activate the application in an execution environment or, if already activated, route the new conversation to that active application. Thus conversation routing for applications utilize paths (system identifiers) and resource identifiers, where paths accomplish the routing between systems, as interpreted by communication facilities, each of which represent a system, and resource identifiers accomplish routing to or activation of an application in an execution environment within a system, as interpreted by the system control program which acts as the resource manager for application resources.

Upon receipt of this conversation initiation, communication facility 57A searches its exchange log name status table (ELST) 208A for an entry for the current path, path B (step 833 in FIG. 20A). The exchange log name status table entry for path B indicates by status zero that no protected conversations have occurred on this path since system 50A was last initiated. Therefore (decision step 834 in FIG. 20A), the exchange log name status table entry 208A for path B is changed to status one (step 836 in FIG. 220A), the conversation initiation message 505 FIG. 19 is intercepted, and the conversation is suspended by the communication facility 57A (step 837 in FIG. 20A). Next, communication facility 57A FIG. 19 sends message 200 FIG. 19 on a control path to the local recovery facility 70A to indicate that an exchange of log names should be initiated for path B before the conversation initiation is accepted by the communication facility 57A (step 838 in FIG. 20A).

Figure 21A:
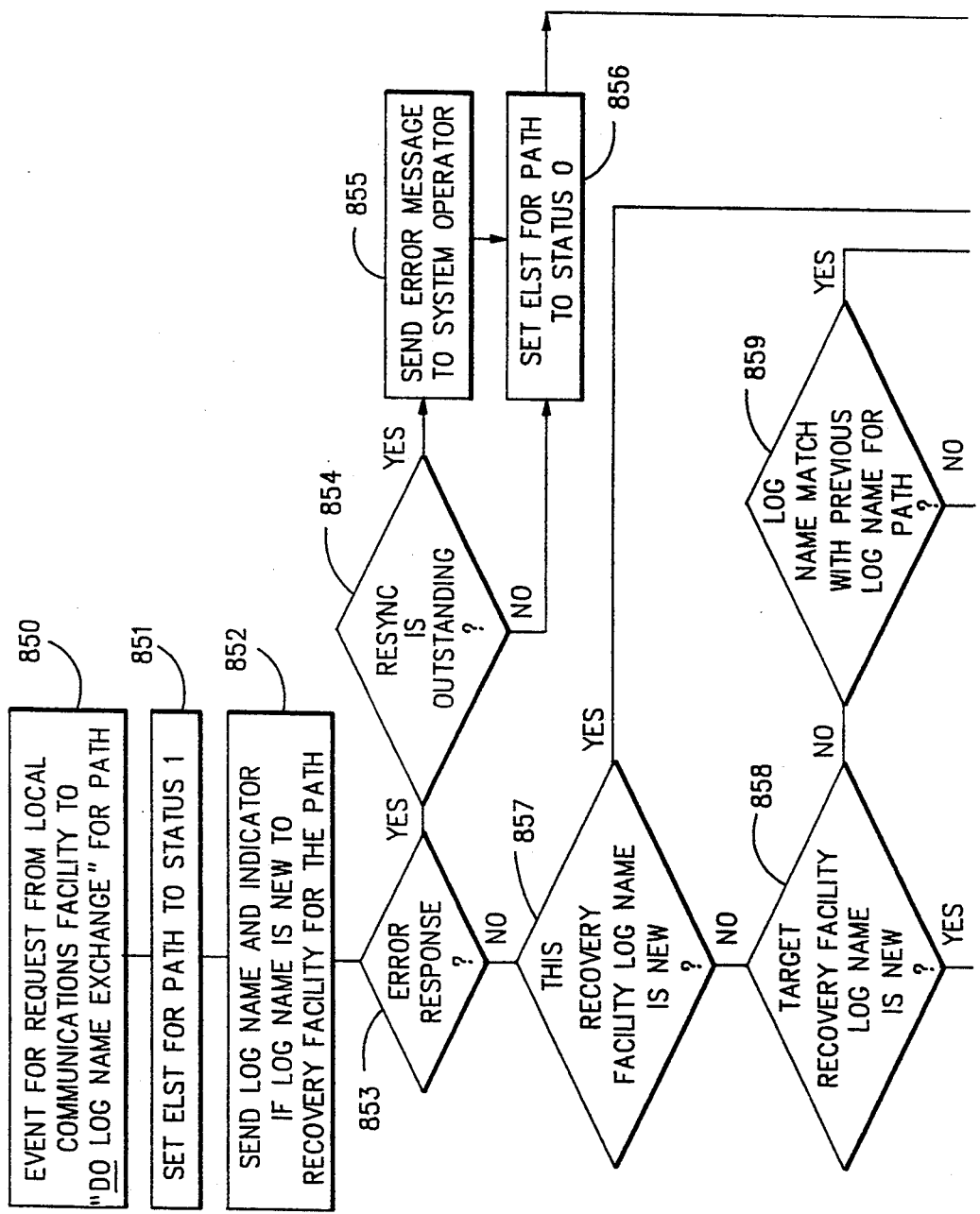
FIGS. 21, 21(A) and 21(B) are a flowchart of recovery facility processing associated with FIG. 19 that results when a local communications facility requests that the recovery facility exchange log names for a path.
Figure 21:
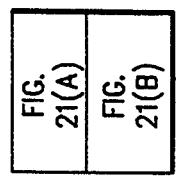
Figure 21B:
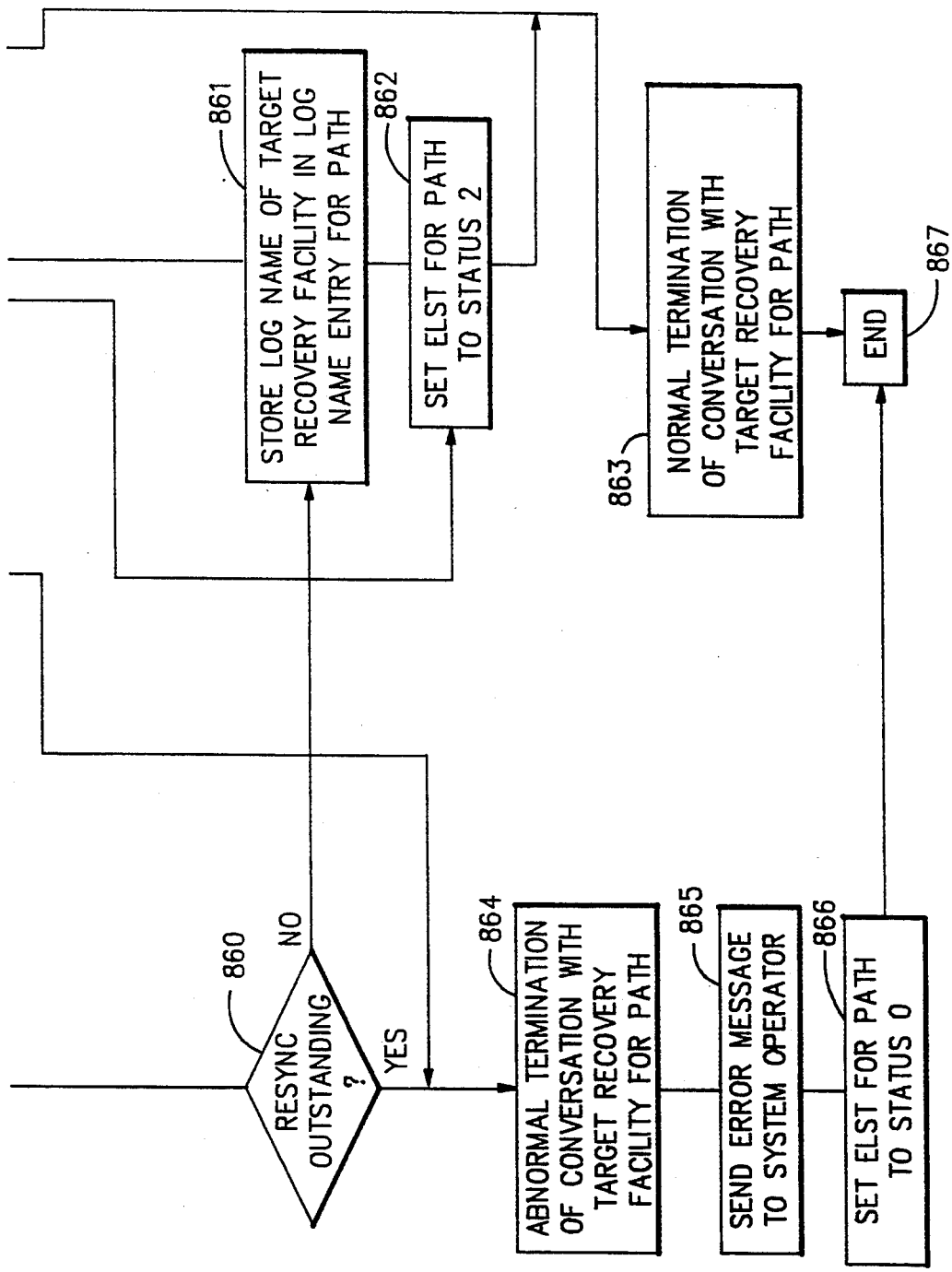

Recovery Facility 70A receives this message (step 850 in FIG. 21) and then sets ELST 267A entry for path B to status 1, indicating that exchange of log names for path B is in progress (step 851 in FIG. 21). Then recovery facility 70A FIG. 19 initiates a non-protected conversation on communication path B (message 202 FIG. 19). Since the conversation is NOT "protected", there is no possibility of interception by a communication facility since only protected conversations are monitored for interception to enforce log name exchange procedures, The routing from system 50A to system 50D through their communication facilities is as described above.

The conversation initialization also utilizes a globally reserved resource identifier called protected_conversation_recovery resource identifier, which permits routing to the recovery facility 70D of the identified target system 50D. As each recovery facility 70A, 70D is initialized, the recovery facility identifies itself to the system control program as the local resource manager for the global resource called "protected_conversation_recovery". The result is that the system control program for system 50D routes conversations with the protected_conversation_recovery resource identifier to the local recovery facility 70D and that recovery facility 70D also determines, based on the protected_conversation_recovery resource identifier that was used to initiate the conversation, that the purpose of the conversation is to exchange log names with another recovery facility 70A. The initial message 202 FIG. 19 in this conversation includes the log name of log 72A along with an indication of whether that log name is "new", that is whether the name of the log was changed to reflect a new log as a result of a major failure/loss associated with the "old" log (step 852 in FIG. 21). The current example assumes the log is not new. Recovery Facility 70A waits for a response to message 202 FIG. 19.

Figure 20:
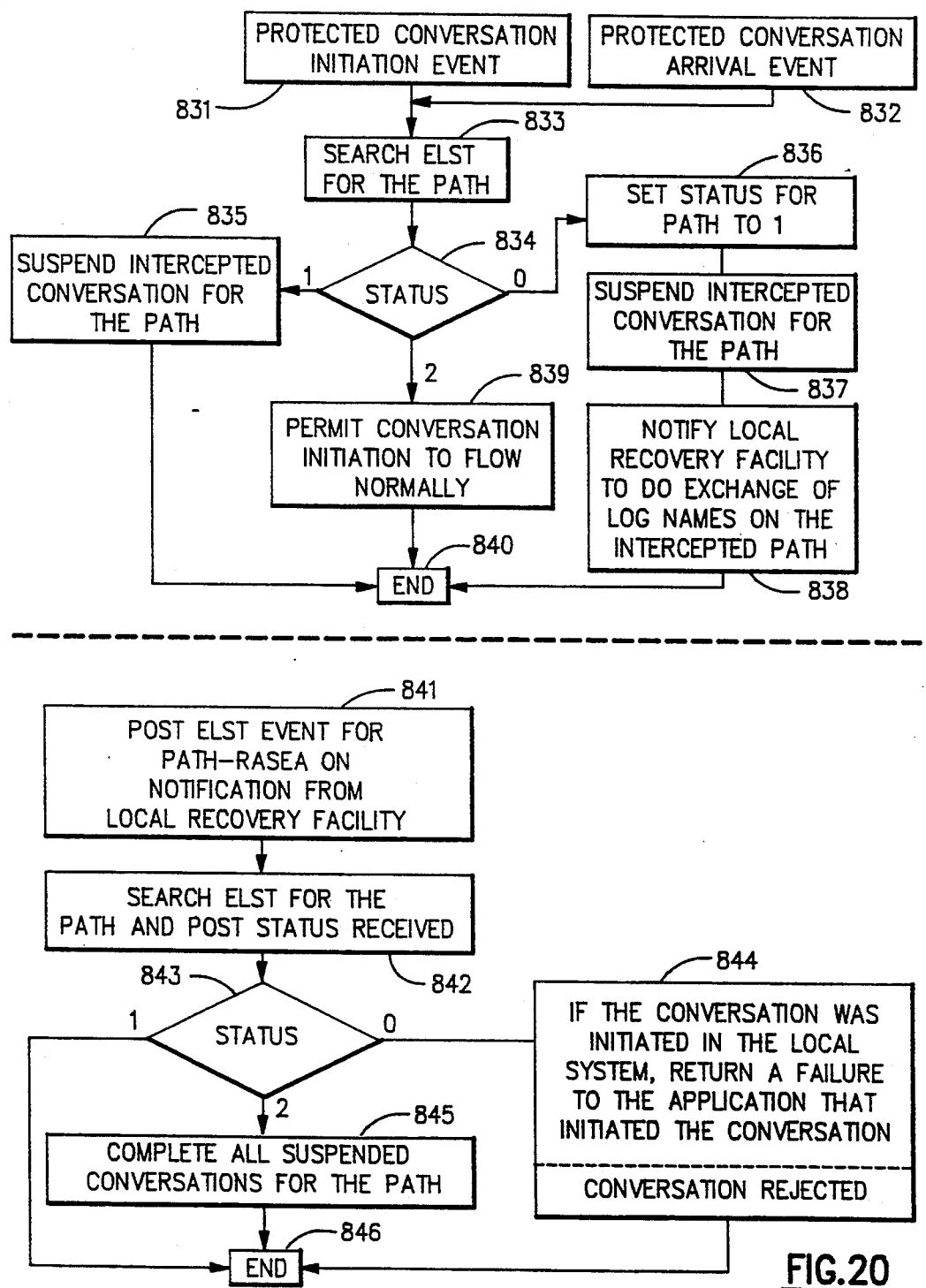
FIG. 20 is flowcharts of communications facility processing associated with FIG. 19 for an initial event and a subsequent conversation event, respectively.
Figure 22:
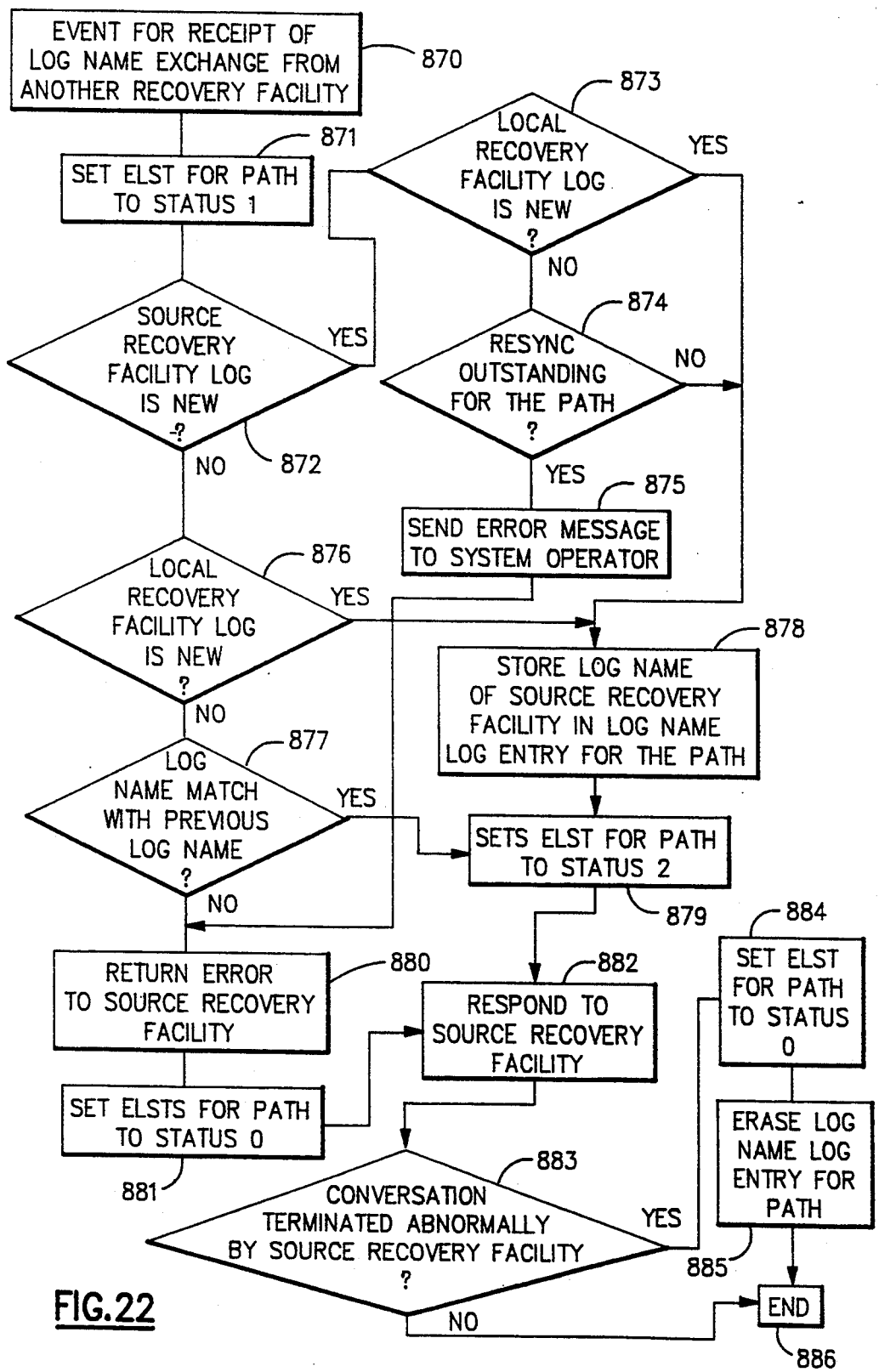
FIG. 22 is a flowchart of recovery facility processing associated with FIG. 19 that results from receiving an exchange of log names request from another recovery facility.

After recovery facility 70D receives the log-name information transmitted by recovery facility 70A along communication line 202 (step 870 in FIG. 22), recovery facility 70D sets ELST 207D for path B to status 1 and the local communication facility 57D is notified via message 203 FIG. 19 to also change ELST 208D to status 1 for path B (step 871 in FIG. 22). Steps 841 in FIG. 20B, 842 in FIG. 20B, 843 in FIG. 20, and 846 in FIG. 20B illustrate the steps for changing the ELST in a communication facility. Recovery facility 70D determines from message 202 FIG. 19 that the log name of recovery facility 70A is not new (decision step 872 in FIG. 22) and that its own log is also not new (decision step 876 in FIG. 22), and finally that the log name in message 202 FIG. 19 matches with the log name stored in recovery facility 70D log name log 72D2 entry for path B (decision step 877 in FIG. 22); therefore ELST 207D is set to status 2 for path B and the local communication facility 57D is notified via message 203 FIG. 19 to also change ELST 208D to status 2 for path B (steps 879 in FIG. 22, 841 in FIG. 20B, and 842 in FIG. 20B). Then recovery facility 70D responds (message 206 FIG. 19) normally to recovery facility 70A by passing the log name of its log 72D and an indication of whether it is new or not (step 882 in FIG. 22). Recovery facility 70A receives this normal response (decision step 853 in FIG. 21) and, since recovery facility's 70A log 72A is not new (decision step 857 in FIG. 21) and recovery facility 70D log 72D is not new according to message 206 FIG. 19 (decision step 858 in FIG. 21), recovery facility 70A successfully matches the name of log 72D sent by recovery facility 70D in message 206 FIG. 19 with the log name stored in the log 72A2 entry for path B (decision step 859 in FIG. 21) and therefore set ELST 207A entry for path B to status 2 and notifies the local communication facility 57A via message 204 FIG. 19 to set ELST 208A to status 2 (step 862 in FIG. 21). Then recovery facility 70A does a normal termination of the conversation on path B with recovery facility 70D (step 863 in FIG. 21), allowing recovery facility 70D to complete normally (decision step 883 in FIG. 22 and step 886 in FIG. 22). Once the communication facility 57A has received message 204 FIG. 19 to post the status for path B in ELST 208A (steps 841 in FIG. 20B and 842 in FIG. 20A), the intercepted and suspended conversation 505 on path B is permitted to complete its initialization (decision step 843 in FIG. 20B, and steps 845 in FIG. 20 and 846 in FIG. 20B). This completion removes the suspended status of the conversation and permits it to flow to its destination, communication facility 57D. In the target communication facility 57D there is a protected conversation arrival event (step 832 in FIG. 20A), then the search for the path entry in the ELST 208D (decision step 834 in FIG. 20A) indicates a status of 2, permitting the conversation initiation to flow normally (step 839 in FIG. 20A) to application 56D.

This completes the normal case flow for conversation interception and exchange of log names. Some additional cases are also illustrated. Steps 834 in FIG. 20A and 835 in FIG. 20A illustrate that additional conversations on the same path are also suspended once the status of 1 has been established to indicate that an exchange of log names for the path is already in progress.

In the case where the target recovery facility 70D finds a log name mismatch between the log name sent in message 202 FIG. 19 and the one stored in log 72D2 for path B (decision step 877 in FIG. 22), an error is returned in message 206 FIG. 19 (step 880 in FIG. 22) and ELST 207D is set to status 0 for path B and communication facility 57D is notified to change its ELST 208D via message 203 FIG. 19 similarly (steps 841 in FIG. 20B, 842 in FIG. 20B and 881 in FIG. 22).

In the case where recovery facility 70D receives a message 202 FIG. 19 indicating that the source log 72A is new (decision step 872 in FIG. 22) and log 72D is also new (decision step 873 in FIG. 22), the new log name for 72A is stored in log 72D2 for path B (step 878 in FIG. 22) and normal completion continues as before (steps 879 in FIG. 22, 882 in FIG. 22 etc.).

In the case where recovery facility 70D receives a message 202 FIG. 19 indicating that the source log 72A is new (decision step 872 in FIG. 22), but log 72D is not new (decision step 873 in FIG. 22), and it is determined from the sync point log 72D1 that there is an unresolved sync point recovery (outstanding resynchronization) for path B, (decision step 874 in FIG. 22), an error message is generated for the system 50D operator (step 875 in FIG. 22), an error is returned to recovery facility 70A in message 206 FIG. 19 (step 880 in FIG. 22), ELST 207D is changed to status 0, and the local communication facility is notified via message 203 FIG. 19 to change ELST 208D to status 0 (steps 881 in FIG. 22B, 841 in FIG. 20B, and 842 in FIG. 20) before return (step 882 in FIG. 22).

When recovery facility 70A detects an error response in message 206 FIG. 19 from recovery facility 70D (decision step 853 in FIG. 21) and there is an outstanding resynchronization indicated in log 72A1 (decision step 854 in FIG. 21), then a message is sent to the system 50A operator (step 855 in FIG. 21) and ELSTs 207A and 208A are changed to status 0 (step 856 in FIG. 21). ELST 208A is changed to status 0 via message 204 FIG. 19 to the communication facility 57A (steps 841 in FIG. 20B, and 842 in FIG. 20B). This results in an error return to the application 56A that originated the intercepted conversation, and rejection of the conversation (step 844 in FIG. 20B). If no resynchronizations are outstanding (decision step 854 in FIG. 21) then the operator message is avoided (decision step 854 in FIG. 21).

When a new log name is returned to recovery facility 70A in message 206 FIG. 19 from recovery facility 70D (decision step 857 in FIG. 21), then it is stored in the log 72A2 entry for path B (step 861 in FIG. 21), ELST status of 2 is set for path B (step 862 in FIG. 21), and the communication facility 57A permits the conversation to be released from suspension (steps 841 in FIG. 20B, 842 in FIG. 20B, decision step 843 in FIG. 20B, and step 845 in FIG. 20B).

When recovery facility 70A detects that the log name returned by recovery facility 70D in message 206 FIG. 19 does not match with that stored in log 72A2 for path B (decision step 858 in FIG. 21 and 859 in FIG. 21), or a new log name for 72D2 is returned (decision step 858 in FIG. 21) and recovery facility 70A determines from log 72A1 that there are outstanding resynchronizations required for path B (decision step 860 in FIG. 21), then recovery facility 70A signals recovery facility 70D that there is a serious error by abnormally terminating the conversation that supported messages 202 and 206 FIG. 19 (step 864 in FIG. 21), generates a message for the operator of system 50A (step 865 in FIG. 21), resets the status of ELST 207A, and, through message 204 FIG. 19 to communication facility 57A, also resets the status of ELST 208A (step 866 in FIG. 21). This results in an error return to the application 56A that originated the intercepted conversation, and rejection of the conversation (step 844 in FIG. 20B).

After recovery facility 70D responds to recovery facility 70A in all cases (step 882 in FIG. 22), it can nevertheless detect (decision step. 883 in FIG. 22) errors signalled by recovery facility 70A (step 864 in FIG. 21) through abnormal conversation termination. When this occurs path B entries in ELST 207D and, though message 203 FIG. 19 to communication facility 57D (and steps 841 in FIG. 20B and 842 in FIG. 20), ELST 208D are reset to 0 status (step 884 in FIG. 22) and the log name entry in log 72D2 for for path B is erased (step 885 in FIG. 22), negating previous step 878 in FIG. 22.

As illustrated in FIG. 19 ELSTs 208A and 208D, each communication facility controls conversation interception for each path (status other than 2), initiation of log name exchange (status 0), and normal conversation flow (status 2). The ELSTs 207A and 207D maintained by each recovery facility are similar, but are optional optimizations. They permit bypassing messages to the local communication facility to update the ELST of the communication facility when the update is not really necessary. This is further illustrated below.

FIG. 19 further illustrates the processing required when one of the systems experiences a failure. Assume that there is a failure of communication facility 57A, recovery facility 70A or the communication paths between them. Any such failure causes all entries in the exchange log status tables 208A, 207A in communication facility 57A and recovery facility 70A to be reset to status zero. This is essential because any such failure could otherwise mask the possibility that there may have also been a log failure. Because of this possibility all sync point agreements are reset by zeroing the status of the exchange log name status table entries. It should be noted that failure of either application environment 52A or 52D does not cause a resetting of the exchange log name status tables because the application environments do not directly affect the log name exchange process. This is important because application environments are more prone to failure than the system facilities. Likewise, failure of one of several application environments sharing a common logical path (not illustrated) does not affect the processing for other applications that utilize the path.

Assume further that after the failure of communication facility 57A, recovery facility 70A or the control paths between them, application 56D initiates a conversation along path B to application 56A in application environment 52A. This conversation is not intercepted by communication facility 57D because the exchange log name status table within communication facility 57D indicates status two for path B; the tables in communication facility 57D were not reset upon the failure in system 50A. However, when the conversation proceeds to communication facility 57A, there is a protected conversation arrival event (step 832 in FIG. 20A), the search of the ELST 208A (decision step 833 in FIG. 20A) indicates status 0, the communication facility 57A intercepts the routing of the conversation (steps 836 in FIG. 20A and 837 in FIG. 20A), and therefore communication facility 57A requests a log name exchange (step 838 in FIG. 20A) by message 200 FIG. 19 to recovery facility 70A. This causes a repetition of the previously described log name exchange process. When the log name exchange is received at recovery facility 70D during the exchange process, the exchange log name status table within recovery facility 70D indicates status two for the path B entry. Therefore, recovery facility 70D does not notify communication facility 57D to change the exchange log name status table for path B; such exchange is not necessary. This is the only difference in this log name exchange process from that described above before the failure. At the completion of the log name exchange process, recovery facility 70A notifies communication facility 57A via message 204 FIG. 19 to change the status for path B from zero to two. Then, the communication facility 57A releases the conversation along path B so that it flows to application environment 52A.

It should be noted that in the foregoing two examples, recovery facility 70A initiated the log name exchange on path B via message 202 FIG. 19. However, if instead, communication facility 57D were the first communication facility to intercept a protected conversation, then recovery facility 70D would initiate the log name exchange process as illustrated by message 206 FIG. 19. It should also be noted that a single log name exchange is sufficient to satisfy the pre-sync point agreement for all application environments in the same system 50A that utilize the same path for protected conversations. The recording in the common exchange log names status table 208A makes this possible. Moreover, it should be noted that the single log name exchange process described above is sufficient to satisfy the requirement for pre-sync point agreement even when there is more than one application environment in each system 50A and 50D involved in the protected conversation because all of the application environments within the same system share the same log 72. Also, when a protected conversation is initiated from application environment 52A to application environment 52B in the same system 50A, then communication facility 57A does not intercept the conversation because both application environments 52A and 52B share the same log 72A and no log name exchange is necessary.

By way of example the architected intersystem communication standard can be of a type defined by IBM's System Network Architecture LU 6.2 Reference: Peer Protocols, SC31-6808 and chapter 5.3 Presentation Services—Sync Point Verbs, published by IBM Corporation. The exchange of log names described in the current section addresses the process for executing, controlling, and optimizing the exchange, not the architected protocol for the exchange.

Exchange of log names is also required between recovery facilities and resource managers of protected resources such as shared Ides or databases. Unlike protected conversations, where exchange of log names is not necessary when conversations take place in the same system (since they share a common sync point log), log name exchange is necessary for participating resource managers, even where resource managers are in the same system as the initiating application, because resource managers maintain their own sync point logs. Unlike protected conversations, which may utilize a communication protocol for establishing protected conversations and log name exchange as described by System Network Architecture LU 6.2 cited above, protected resources utilize non-protected conversations and a private message protocol for those functions. Also, for protected resources, it is not practical in all cases to centrally intercept initial communications to the resource manager by using a communication facility as the interceptor because the communications do not in all cases proceed through a communications facility. One example of this is the case of a resource manager 63A FIG. 2 that is in the same system 50A as the application environment 52A and application 56A that uses its resource. This situation does not require conversations with the resource to pass through the communications facility, but instead supports conversations through the conversation manager 53A or other local facilities. Another reason is to afford the flexibility of supporting resource managers without requiting them to entirely change their method of communication with the users of their resource in order to conform to the System Network Architecture LU 6.2 communication protocols. Automatic recovery processing from a sync point failure requires that the names of the various participant's logs remain the same as they were before the sync point began, as was the case for protected conversations described above.

Figure 23:
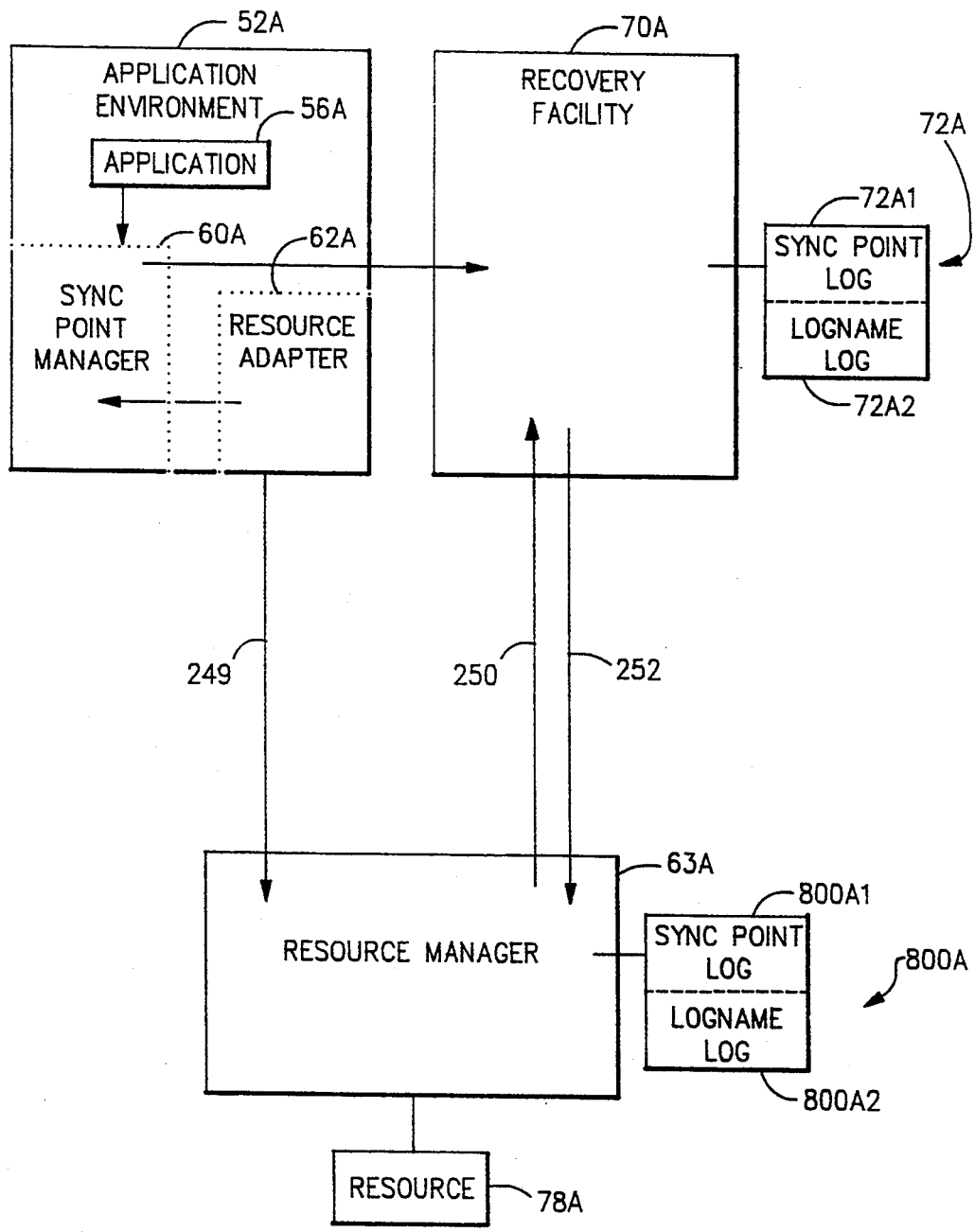
FIG. 23 is a block diagram illustrating the components and procedure for exchanging log names with a local resource manager in a section of FIG. 2.

FIG. 23 illustrates log name exchange for managers of protected resources. In the illustrated embodiment, system 50A comprises application environment 52A, associated resource adapter 62A, recovery facility 70A, and a common resource recovery log 72A. Although resource managers may be local or remote, the illustration is for the local case. As described in more detail below, the process for the remote resource manager case is basically the same except that communications facilities are involved in completing the inter-system communications. Whereas protected conversations, whether local or remote, always utilize a communications facility for communications, providing a common intercept point for initiating log name exchange for the pre-sync point agreement, resource managers, as illustrated, may bypass the use of a communication facility in the local case, and do not have such a centralized intercept point to initiate pre-sync point log name exchange.

A log name log 800A2 within log 800A is associated with resource manager 63A and stores the name of log 72A of the originating recovery facility 70A. Also, a sync point log 800A 1 within log 800A is associated with resource manager 63A and stores the state of its protected resource in a sync point procedure. As described in more detail below, FIG. 23 illustrates the essential elements required to ensure the timely exchange of log names between a sync point manager and a participating resource manager, as well as the ability to recognize log name changes brought about by failure that forces re-initializing one or more of the logs 72A, 800A. When an application 56A sends a request to resource manager 63A via resource adapter 62A (step 221 of FIG. 26), resource adapter 62A calls the sync point manager 60A (step 222) requesting:

1. The log name of the recovery facility's log 72A, and
2. The log_name_log resource identifier for recovery facility 70A required to establish a conversation to the recovery facility 70A for the initial exchange of log names by resource manager 63A. This identifier uniquely identifies recovery facility 70A and also permits recovery facility 70A to distinguish incoming log name exchange conversations from other conversations, such as a sync point manager conversation that uses a sync_point_log resource identifier to connect as described below.

Figure 26:
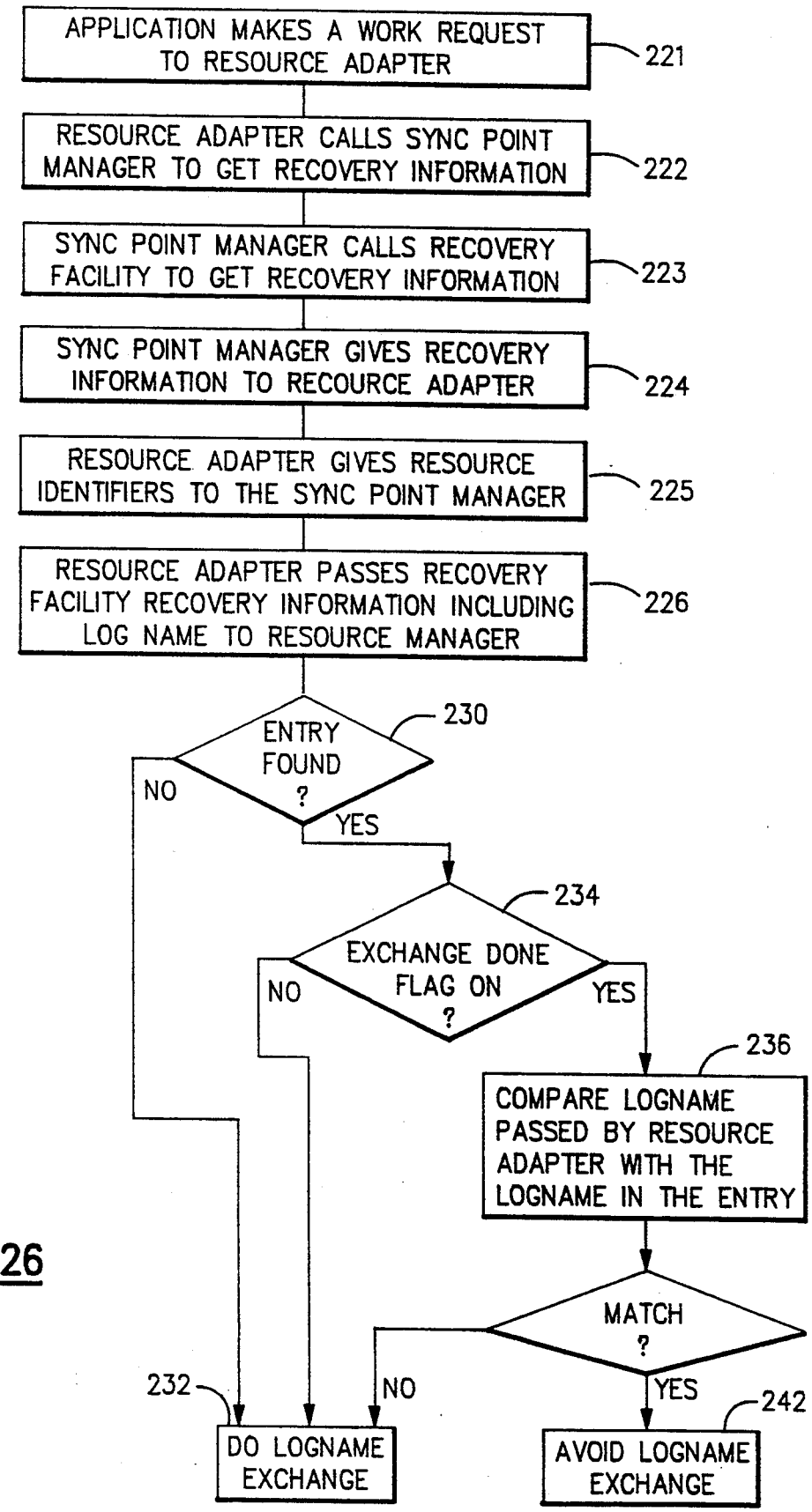

Sync point manager 60A then establishes a conversation to the local recovery facility 70A using a sync_point_log resource identifier (step 223 FIG. 26).

A resource identifier is used to identify a resource within a system or more particularly to complete a conversation to the manager of a resource in its current execution environment in that system. The manager of a resource uses a system control program facility to identify a resource to the system when the manager of the resource is initialized. The system control program enforces the uniqueness of these resource identifiers. In addition to resource manager 63 FIG. 2, other facilities may act as resource managers. An example is the recovery facility 70, whose logs are considered resources for which it has resource identifiers. There are four types of resources, each of which is identified by a type of resource identifier. The first of these is basically generic and can be extended to include any resource. The others are defined specifically for resource recovery.

1. object resource, identified by an object resource identifier, which is the set of objects 78 managed by a resource manager 63. This is the case of a generic resource manager and its resource, extendible to any resource, including sets of data flies, queues, storage, or applications. This type of resource identifier is used to establish a connection to the manager of the resource 63 in order to use the resource in some way, for example to open a file, start up an application, etc. that is owed by that resource manager.
2. object_recovery resource, identified by an object_recovery resource identifier, which is a resource manager log 800 and supporting procedures for cooperating with a recovery facility 70 in the recovery from a failed sync point procedure. This identifier is used by a recovery facility 70 at the time of recovering from a failed sync point to establish a conversation with the manager of the resource 63 to exchange log names and complete the sync point as a part of automatic recovery.

3. sync_point_log resource, identified by a sync_point_log resource identifier, which is the log 72A FIGS. 19 and 23 managed by the recovery facility 70A and the set of procedures supporting the maintenance of that log 72A. This identifier is used by a sync point manager 60 FIG. 2 to establish a conversation with its recovery facility 70 in order to provide log information on the status of sync points.

4. log_name_log resource, identified by a log_name_log resource identifier, which is the log name log 72A2 FIG. 23, managed by the recovery facility 70A and the set of procedures supporting the maintenance of that log 72A2. This identifier is used by resource manager 63A to establish a conversation with the recovery facility 70A to exchange log names with the appropriate recovery facility 70A.

After establishing the connection to the recovery facility 70A, sync point manager 60A obtains the recovery information requested by resource adapter 62A. Tiffs recovery information is returned by sync point manager 60A to resource adapter 62A (step 224 FIG. 26) and is held by sync point manager 60A for release to any other requesting resource adapter. Next, resource adapter 62A FIG. 23 also provides the following sync point recovery information to sync point manager 60A FIG. 23 (step 225 FIG. 26):

1. An object_recovery resource identifier which can be used by recovery facility 70A FIG. 23 to connect to resource manager 63A in the event of a failure during sync point. Tiffs object_recovery resource identifier permits the resource manager to distinguish between incoming conversations from resource adapter 62A and from recovery facility 70A, each of which requires different programs for processing. By giving resource manager 63A, through its resource adapter 62A, the capability of providing its own object_recovery resource identifier, rather than establishing a standard recovery resource identifier for all resource managers, the recovery facility 70A avoids conflicts with other resource identifiers employed by this resource manager 63A or any other resource manager, maintaining a generalized, non-disruptive interface for any resource manager to participate in sync point processing.

2. An object resource identifier which can be used by recovery facility 70A when there is a sync point failure, to identify resource manager 63A which participates in the sync point and to find the log name log 72A2 entry for it. This identifier uniquely identifies the resource manager for purposes of managing the sync point, logging the sync point in case of a sync point failure, and recovering from a failing sync point.

Following the application's 56A first request for use of resource 78A, described above, resource adapter 62A initializes a conversation to resource manager 63A using its own object resource identifier, and passes recovery information including the log_name_log resource identifier of recovery facility 70A and the current name of log 72A, acquired from the sync point manager (step 226 FIG. 26).

Although FIG. 23 illustrates only one recovery facility 70A that is responsible for resource recovery, a single resource manager may be involved with many recovery facilities since the resource may be used by applications in many systems, each with its own recovery facility. This is illustrated in FIG. 33 where resource manager 63E is used by both application 52A in system 50A and application 52D in system 50D, therefore requiting log name information from two recovery facilities 70A and 70D.

To support recovery of a failed sync point, a resource manager 63A requires a log name log 800A2 FIG. 23 entry for the name of each recovery facility log 72, where each such log name represents a system 50 that utilizes the resource through one or more applications 56 and sync point managers 60. The log name log 800A2 FIG. 23 for the participating resource manager 63A includes the following information for each associated recovery facility 70:

1. A log_name_log resource identifier which identifies each associated recovery facility 70 (in the case of FIG. 23, recovery facility 70A);
2. Recovery facility's 70 log name ( in the case of FIG. 23, the name of log 72A);
3. An exchange_done flag which indicates when a log name has been successfully exchanged. Although the exchange_done flag is logically a part of the log name log 800A2 FIG. 23, it need not be written to non-volatile storage because it is logically reset for each initiation of the resource manager with which it is associated. The purpose of the flag is to avoid the exchange of log names for a particular recovery facility 70A except for the first conversation from the resource adapter 62A that is operating in the system 50A of the recovery facility 70A. There may be many application environments in a system, all serviced by the same recovery facility and each with a resource adapter with a conversation to the same or different resource manager. It is only necessary for a resource manager to initiate an exchange of log names upon the first instance of a conversation with one of the resource adapters that are associated with the same recovery facility. The exchange_done flag is set to prevent subsequent exchanges.

The remainder of FIG. 26 illustrates an algorithm executed by resource manager 63A FIG. 23 to determine when to initiate a log name exchange. Upon first receipt of the object resource identifier (step 226), resource manager 63A searches log name log 800A2 to determine if it has an entry for recovery facility 70A identified by the log_name_log resource identifier that was included in the recovery information passed from resource adapter 62A FIG. 23 (step 230 FIG. 26). The resource manager uses the log_name_log resource identifier received from the resource adapter to search the log name log 800A2 FIG. 23. If there is no entry, then resource manager 63A initiates the log name exchange (step 232 FIG. 26). If an entry is found in step 230 for recovery facility 70A FIG. 23, then resource manager 63A determines if the exchange_done flag is set (step 234 FIG. 26). The exchange_done flag is set when a successful log name exchange occurs, and remains set until the resource manager terminates abnormally or is shut down normally. If a resource manager is unable to exchange log names due to a failure to initiate a conversation with the recovery facility, the resource manager terminates the conversation initiated by its resource adapter. If the exchange_done flag is not set, then resource manager 63A FIG. 23 initiates the log name exchange in step 232 FIG. 26. However, if the exchange_done flag is set, resource manager 63A FIG. 23 then compares the log name transmitted by resource adapter 62A to the log name in the entry (step 236 FIG. 26). If these two log names are the same, then resource manager does not initiate the log name exchange (step 242 FIG. 26), but if they are different, resource manager 63A FIG. 23 initiates the log name exchange in step 232 FIG. 26. The foregoing algorithm assures a log name exchange for any recovery facility the first time that a resource manager communicates with a resource adapter associated with that recovery facility. Also, the algorithm assures a subsequent log name exchange whenever the log names for the recovery facility 70A FIG. 23 change. In the latter case, the log name exchange is necessary, even though the resource manager 63A gets the new recovery facility log 72A name from the resource adapter, since it is necessary to provide the log name of the resource manager's log 800A to the recovery facility 70A, whose log name log must be synchronized with that of resource manager 63A.

Figure 25:
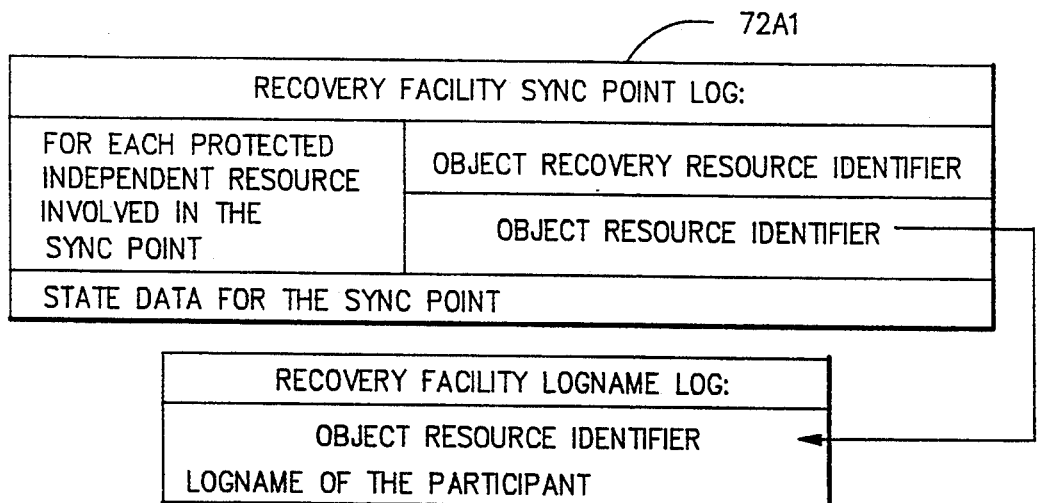
FIG. 25 is a block diagram illustrating the contents of a recovery facility of FIG. 2.
Figure 27:
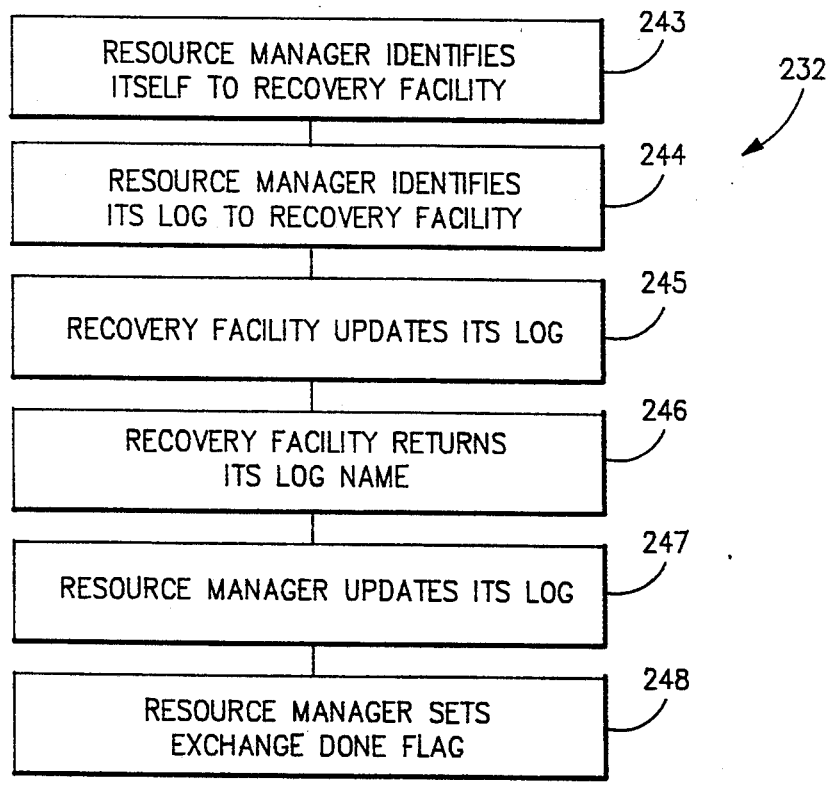
FIGS. 26 and 27 are flowcharts illustrating the processing for exchange of log names between a participating resource manager and the recovery facility.

The log name exchange of step 232 FIG. 26 between resource manager 63A FIG. 23 and recovery facility 70A is further illustrated in FIG. 27, and comprises the following steps (assume that log 72A is the log):

1. Step 243 of FIG. 27: Resource manager 63A FIG. 23 initiates a conversation 250 to recovery facility 70A using a log_name_log resource identifier obtained from resource adapter 62A;
2. Step 243 of FIG. 27: Resource manager 63A FIG. 23 transmits the object resource identifier that uniquely identifies resource manager 63A to recovery facility 70A;
3. Step 244 of FIG. 27: Resource manager 63A FIG. 23 transmits the log name for log 800A to recovery facility 70A;
4. Step 245 of FIG. 27: Recovery facility 70A FIG. 23 updates log name log 72A2 with the log name of resource manager 800A;
5. Step 246 of FIG. 27: Recovery facility 70A FIG. 23 returns a response to resource manager 63A providing the log name of log 72A;
6. Step 247 of FIG. 27: Resource manager 63A FIG. 23 updates log name log 800A2 with the name of log 72A;
7. Step 248 of FIG. 27: Resource manager 63a FIG. 23 sets the exchange_done flag in log name log 800A2;

When application 56A FIG. 23 requests a sync point from sync point manager 60A, sync point manager 60A sends the above object_recovery resource identifier and object resource identifier to recovery facility 70A where it is stored in sync point log 72A1 along with the information describing the state in the sync point process. If a failure occurs during a sync point, recovery facility 70A is activated to perform the operations necessary to complete the sync point procedure. If resources were participating in the failing sync point, recovery information in the associated recovery facility's sync point log entry is available to permit contact with those resources in order to accomplish recovery. For example, if application 56A goes down during a two-phase commit operation, then recovery facility 70A is activated and subsequently exchanges log names with resource manager 63A. When this second exchange indicates that log names have not changed since the sync point was initiated, recovery facility 70A knows that it can continue with the recovery of the sync point. A log name mismatch in the exchange would indicate that log information required for automatic recovery has been lost and therefore automatic recovery should not be attempted. The recovery facility 70A initiates the second log name exchange and asks resource manager 63A what state or phase it was in prior to the failure. Even though the initial exchange of log names was initiated by resource manager 63A, as described above, the exchange of log names required after the failure is initiated by recovery facility 70A as follows:

1. For each resource for which there is recovery information in sync point log 72A1 associated with the failing sync point, recovery facility 70A identifies the log name log entry for the resource by using the object resource identifier found in the sync point log 72A 1 entry as a search argument applied to log name log 72A2 entries, yielding the resource's log name. This is illustrated in FIG. 25.
2. The recovery facility establishes a conversation 252 FIG. 23 to resource manager 63A using the object_recovery resource identifier found in the sync point log entry.
3. Recovery facility 70A sends its own log name, the log_name_log resource identifier (unique identifier of recovery facility 70A), and the resource's log name to resource manager 63A using conversation 252.

In response, resource manager 63A performs the following steps:

1. Resource manager 63A recognizes that the conversation from recovery facility 70A is intended for the purpose of sync point recovery because the conversation includes the object_recovery resource identifier.
2. Resource manager 63A uses the log_name_log resource identifier sent by recovery facility 70A to verify the entry in log name log 800A2 that is associated with recovery facility 70A.
3. Resource manager 63A verifies that the log name of the resource transmitted by recovery facility 70A corresponds with the log name of its own log 800A.
4. Resource manager 63A returns an error signal to recovery facility 70A on conversation 252 if it finds no entry in log name log 800A2 associated with recovery facility 70A.
5. Resource manager 63A sends an error signal to recovery facility 70A on conversation 252 if either of the verification steps described above fails.

An error condition detected in the exchange of log names at the beginning of recovery prevents the continuation of the automatic sync point failure recovery procedure of recovery facility 70A. Such an error condition indicates that a failure of one or more of the participating logs occurred concurrently with the sync point failure. The loss of a log implies the loss of all information in the log and the assignment of a new log name. Such a failure requires manual intervention and heuristic decisions to resolve the failing sync point. Detection of such an error condition is the main purpose of the log name exchange process implemented after sync point failure.

Figure 24:
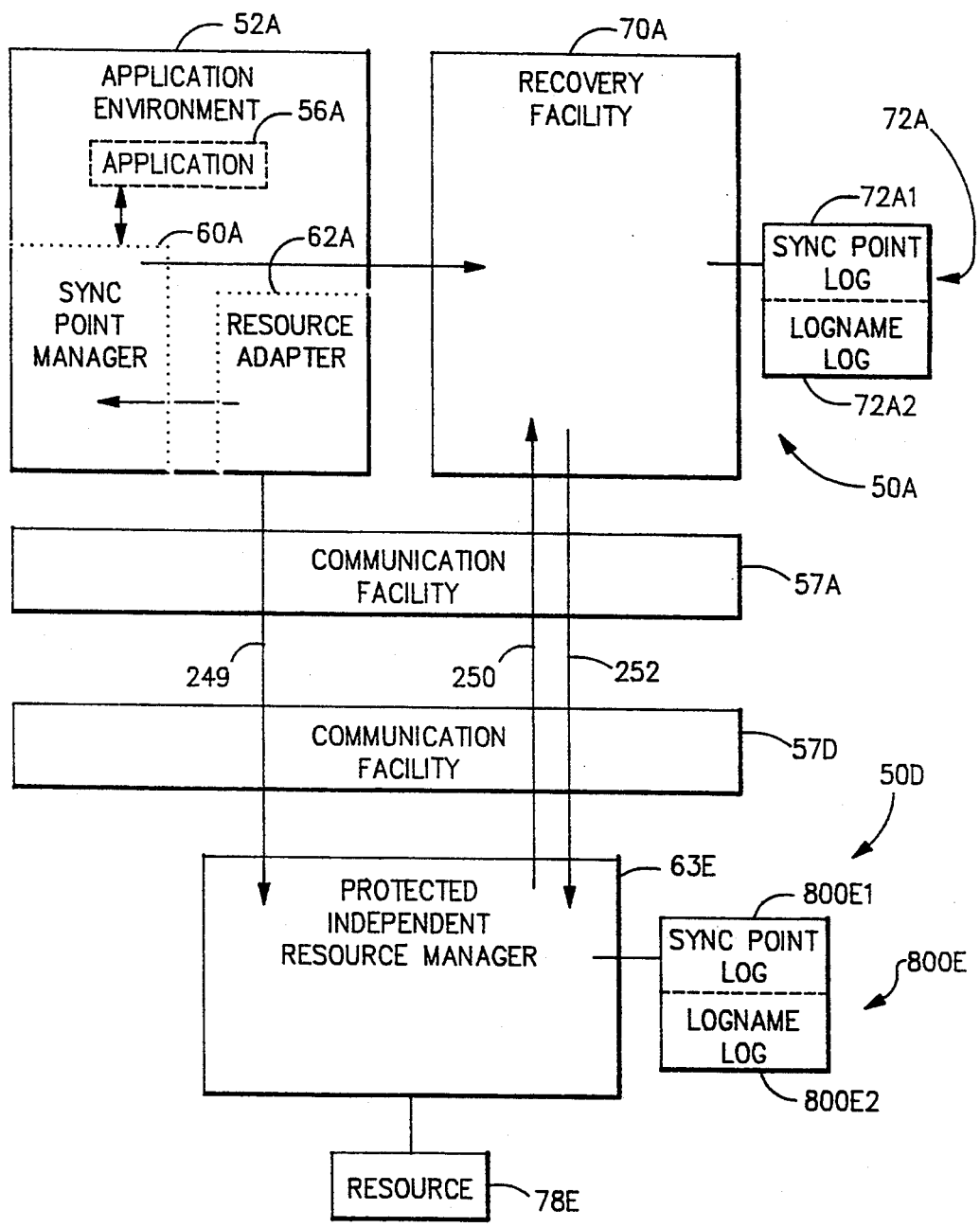
FIG. 24 is a block diagram illustrating the components and procedure for exchanging log names using a system of FIG. 2 and a remote resource manager.

Similar to the case of the local resource manager 63A illustrated in FIG. 23, FIG. 24 illustrates log name exchange where the resource manager 63E of system 50D is remote from application environment 52A and the application 56A of system 50A that uses the resource managed by resource manager 63E. Communications between remote resource manager 63E and local application 56A and recovery facility 70A are made via inter-system communications facilities 57A and 57D, rather than through intra-system communications support provided by the system control program. Sync point manager 60A uses recovery facility 70A to manage the sync point and log name logs 72A required for recovery from a failing sync point. Resource manager 63E maintains its own resource manager logs 800E. The communications path utilized at the time of pre-sync point agreements and at the time of resynchronization for recovery of failing sync points is between resource manager 63E and recovery facility 70A of system 50A. The recovery facility 70D (not shown) of system 50D is not utilized in this case since the originating sync point manager, application and associated recovery facility are not local to system 50D, but are remote in system 50A. The only difference between the log name exchange process for local and remote resource managers is that communications between a remote resource manager 63E and resource adapter 62A and recovery facility 70A are made via communications facilities 57A and 57D instead of through intra-system communications services of the local system control program. Otherwise the exchange of log names process is the same as described above with reference to FIG. 23. The communications facilities 57A and 57D do not play a role in determining when to exchange log names with a remote log, i.e. the communications facilities do not intercept conversations as was the case for protected conversations in FIG. 19.

RECOVERY FACILITY FOR INCOMPLETE SYNC POINTS FOR DISTRIBUTED APPLICATION

Recovery Facility 70A illustrated in FIG. 2 is used to complete a sync point that encounters a failure. In most cases the recovery (resynchronization) is accomplished automatically by a Recovery Facility 70A, which recognizes the failure and then acts as a surrogate for the local sync point manager 60A to complete the sync point normally through alternate or reacquired communications to participants in the sync point. Failures include a failing sync point manager 60A, a failure in communications between a sync point manager 60A and its recovery facility 70A, failure of communications with or failure of an application partner 56D or resource manager 63, and failure of the recovery facility 70A.

By way of example the architected intersystem communication standard can be of a type defined by IBM's System Network Architecture LU 6.2. Reference: Peer Protocols SC31-6808 and chapter 5.3 Presentation Services—Sync Point verbs published by IBM Corporation.

Recovery facility 70A serves all of the application execution environments 52A, B, C and participating sync point applications within system 50A and utilizes common recovery facility log 72A for the purpose of sync point recovery. Typically, there are many systems interconnected with each other by communication facilities 57 and therefore, many recovery facilities 70 can be involved in recovery processing.

FIG. 33 illustrates various recovery situations involving systems 50A, 50D and 50F. Each application execution environment 52A, B, D, F, and G executes an application 56A, B, D, F, and G respectively (not illustrated) which utilizes a sync point manager 60A, B, D, F, AND G respectively (not illustrated) for the purposes coordinating resource recovery. Each sync point manager uses the recovery facility in its system to manage the sync point and log name logs required for recovery from a failing sync point. For example, the sync point managers in application environments 52A and 52B use the recovery facility 70A to record sync point recovery information in recovery facility log 72A. Resource managers 63A, B, D, E, F, and G maintain their own sync point and log name logs 800A, B, D, E, F, and G respectively. In the illustrated examples, scopes of sync points are indicated by solid lines with arrows. Although sync points may be initiated by any participant and the scope of a sync point is dynamic, the illustration is static for simplicity of illustration. For the illustrated static cases, sync points flow between application environments 52B to 52D to 52F via the associated sync point managers and protected conversation adapters (not shown) via communication solid lines 801 and 802; and from application environments 52A, B, D, F and G via the associated sync point managers and resource adapters to the resource managers 63A, B, D, E, F and G via communication solid lines 803A-1, 803A-2, 803B, 803D, 803E, 803F and 803G, respectively.

Three sync point scopes are included in the FIG. 33 illustration.. The first involves a single application environment 52A including sync point manager 60A and utilizes two resource managers 63A and 63E. The second sync point scope involves three application environments 52B, 52D and 52F, each involving various participating resource managers 63B for 52B, 63D, E for 52D, and 63F, G for 52F, as further illustrated by a sync point tree illustrated in FIG. 34. The third sync point scope involves application environment 52G and a resource manager 63G.

The dotted lines in FIG. 33 show communications paths employed at the time of pre-sync point agreements and at the time of resynchronization for recovering a failing sync point (refer to the section "Log Name Exchange For Recovery of Protected Resources" below). For resource managers, the pre-sync point and resynchronization path is between the resource manager and the recovery facility of the system of the originating application environment (i.e. user, for example updated, of the resource managed by the resource manager), for examples, between resource manager 63E and recovery facility 70A via path 804A-2 when application environment 52A is the originator (user of the resource managed by resource manager 63E), and between resource manager 63E and recovery facility 70D via path 804D when application environment 52D is the originator.

Figure 34:
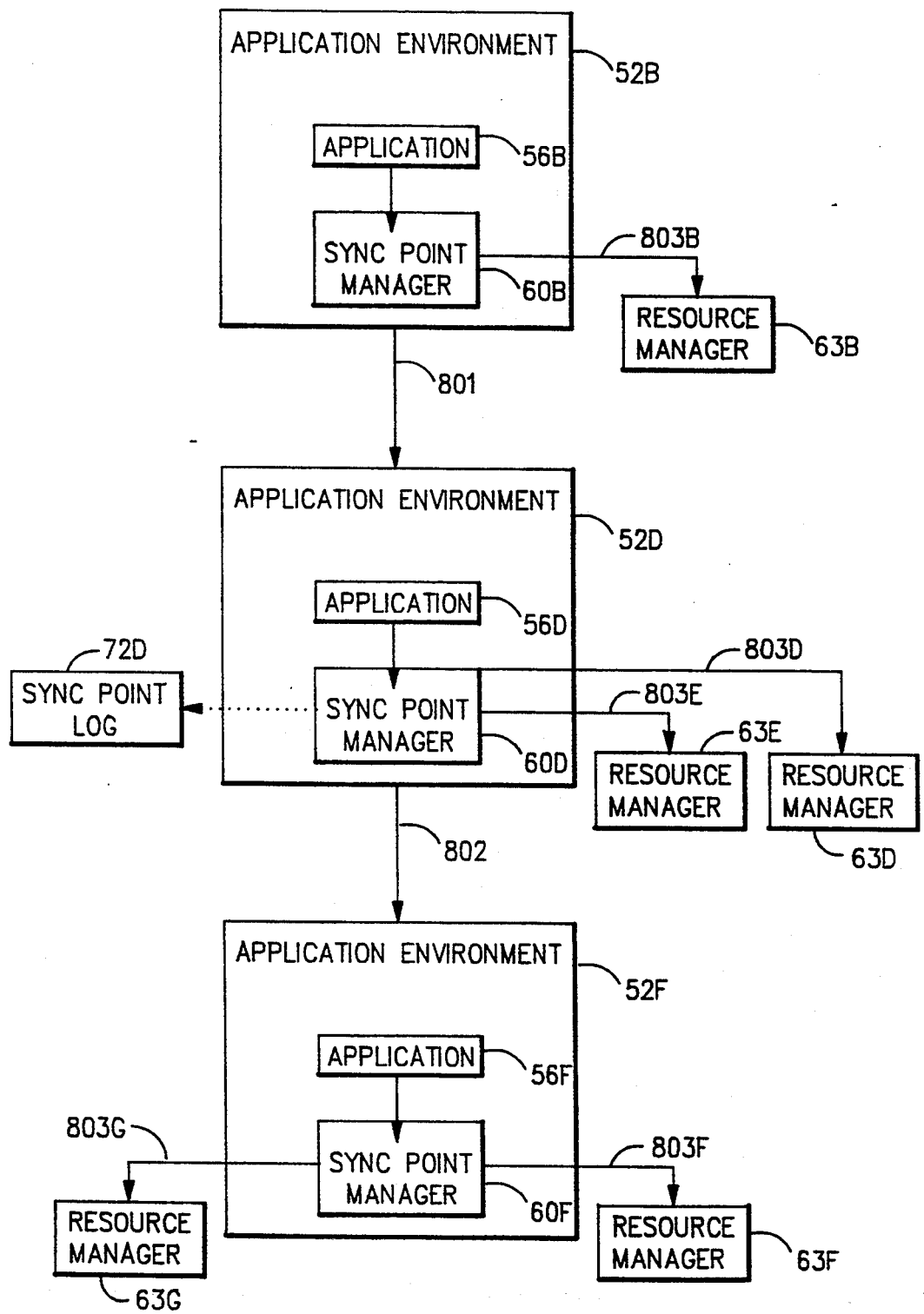
FIG. 34 is a block diagram illustrating three participating application and application environments from FIG. 33 and the resource managers that they employ, forming a tree of sync point participants.

A sync point propagates through participants of the sync point in a cascaded manner forming the sync point tree illustrated in FIG. 34. Applications 56B, 56D and 56F communicate with each other via protected conversations 801 and 802 managed by protected conversation adapters 64B, D and F (not shown), respectively. Applications 56B, 56D and 56F utilize resource adapters 62B, D and F (not shown), respectively which use non-protected conversations 803B, 803D, 803E, 803G, and 803F to communicate with the resource managers 63B, D, E, G and F, respectively. This tree includes the sync point initiator application 56B whose participants are a resource manager 63B and a distributed application 56D, which in turn has participants resource managers 63E, 63D and distributed application 56F, which in turn has participant resource managers 63G and 63F.

For purposes of sync point recovery, a sync point log, 72D for example, is maintained by sync point manager 60D (through recovery facility 70D not shown) with information about its immediate predecessor in the sync point tree, application 56B in environment 52B, and the immediate participants known to it, resource managers 63E, 63D and application 56F in application environment 52F, but maintains nothing in its sync point log 72D concerning any of the other sync point participants 63B, 63G or 63F.

Figure 35:
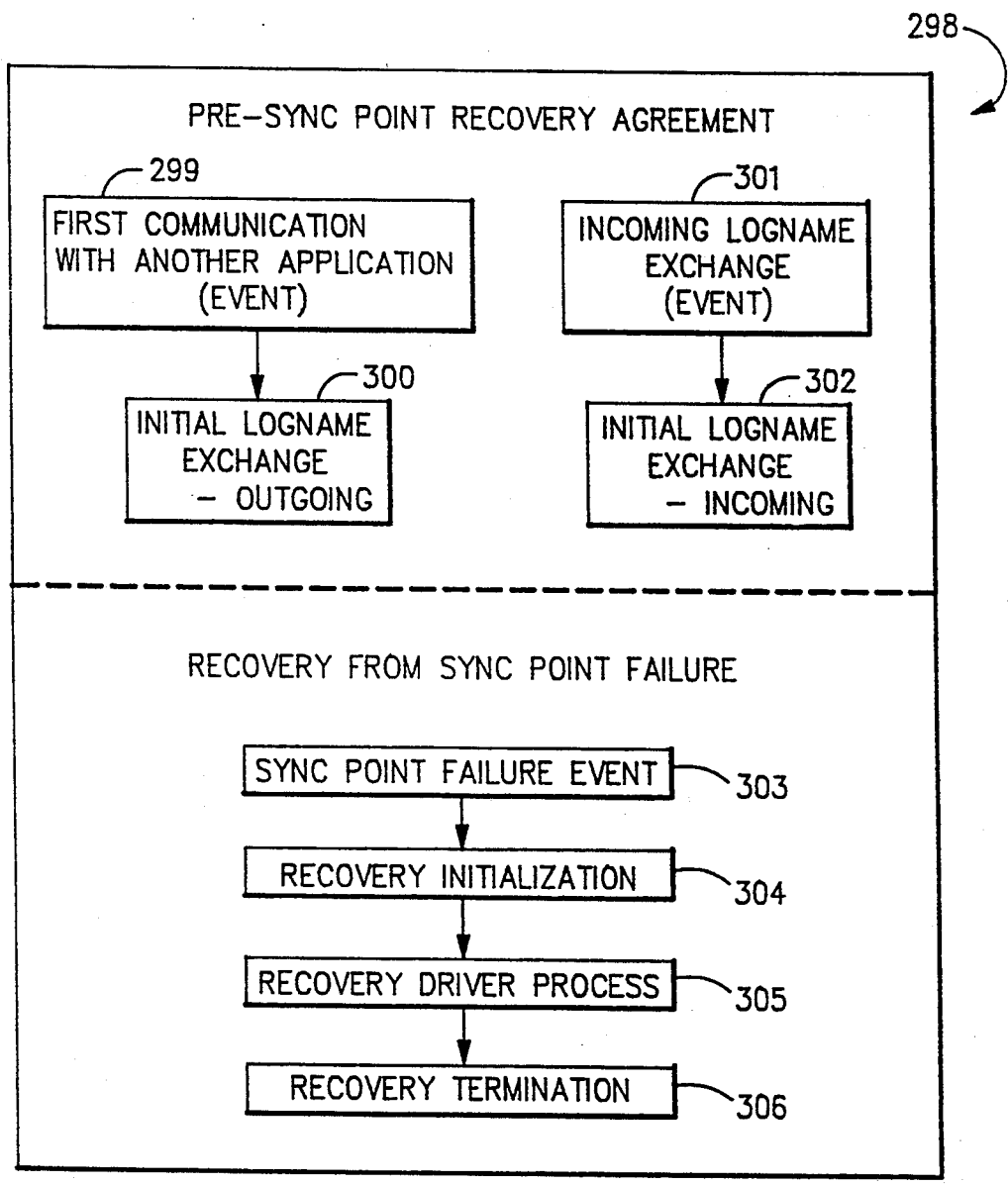
FIG. 35 is a high level flowchart illustrating the recovery facility procedures for pre-sync point agreements and procedures for recovery from a sync point failure.

FIG. 35 is a high level flowchart 298 of the principal elements for sync point recovery. It represents the two parts of a recovery facility 70; pre-sync point recovery agreement (Steps 299, 300, 301 and 302) and recovery from sync point failure (Steps 303–306).

Prior to a sync point occurrence there must be agreement between the participants in the sync point concerning the identity of the logs associated with the sync point and the current level of their respective logs 72. (Refer to the foregoing section entitled "Log Name Exchange For Recovery of Protected Resources"). This pre-sync point recovery agreement is important in case of a sync point failure to ensure that the logs used to recover from the sync point failure are the same ones and are at the same level as they were before the sync point was initiated. If, between the time of the pre-sync point recovery agreement (exchange of log names described above) and the occurrence of a sync point failure, one or more of the participants has a log failure and must begin with a new log, then the automatic recovery procedures associated with the failing log will fail.

The exchange of log names between the sync point participants and the recording of log names in the logs 72 make this information available for validation in the case of a sync point failure. These exchanges are initiated upon the detection of the first establishment of communications over a particular path. Because communications can be initiated locally or remotely, the recovery facility 70 supports both local detection (Steps 299 and 300) requiring an outgoing log name exchange and remote detection (Steps 301, 302) requiring an incoming log name exchange.

The recovery facility 70 provides automatic recovery from sync point failure and includes Step 303—the various events that may occur to initiate the recovery procedure, Step 304—the initialization of the recovery procedure, Step 305—the actual recovery, referred to as a recovery driver process, and Step 306—the termination of the recovery procedure. The recovery facility 70 includes asynchronous handling of multiple sync point failure events.

Figure 36:
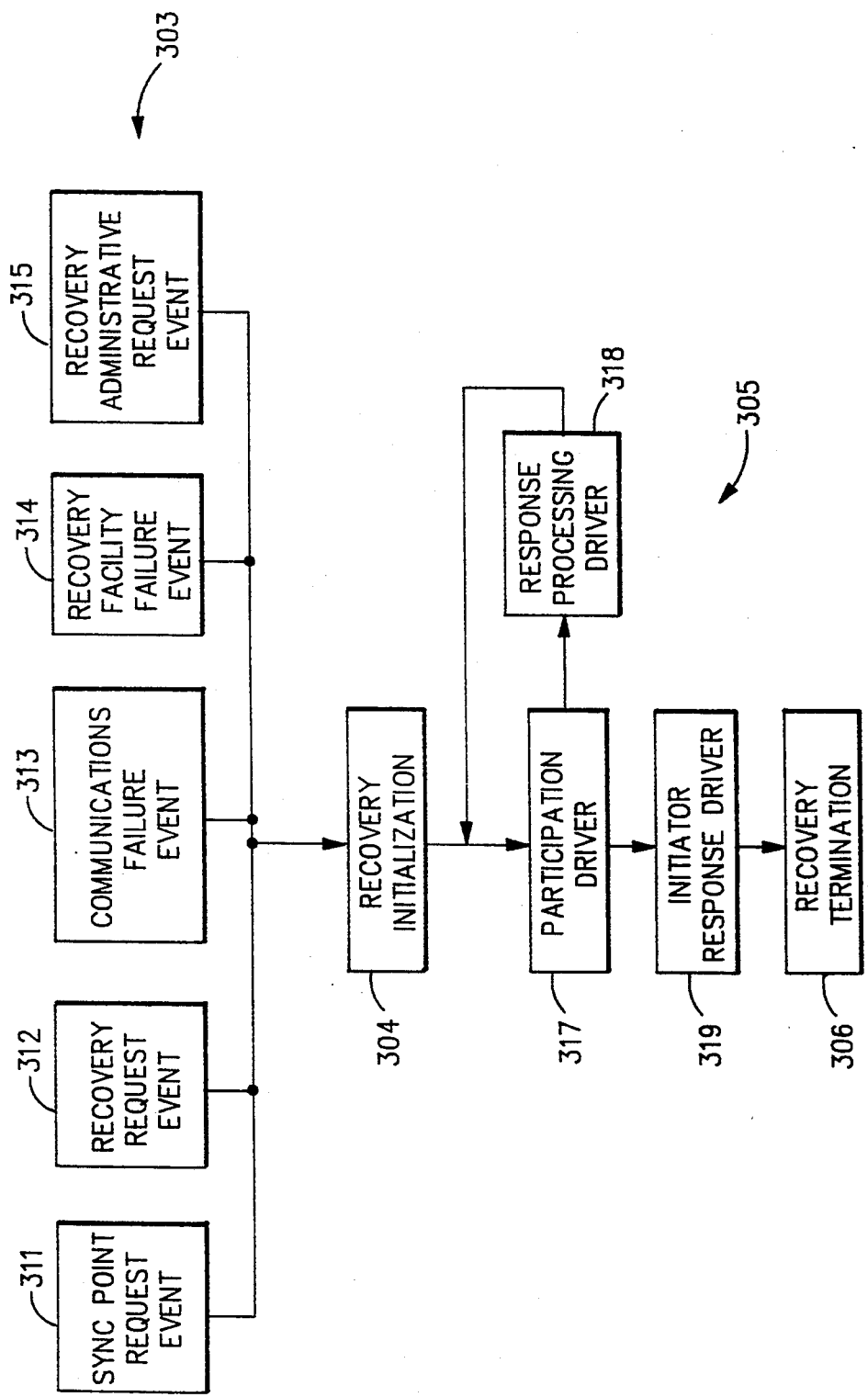
FIG. 36 is a flowchart illustrating in more detail the recovery facility procedures for recovery from a sync point failure.

FIG. 36 shows more detail for the "Recovery From Syncpoint Failure" portion of the recovery procedure (Steps 303–306). Five types of events (Step 303) initiate the recovery procedure:

(1) A sync point request event 311 occurs as a result of receiving a request from a sync point manager 60 when it encounters a communications failure with one or more of its sync point participants (ex. resource managers 63). The sync point manager 60 initiates the recovery procedure explicitly by sending a request to the recovery facility 70 using the same path that is used for logging the sync point activity. The request includes a description of the failing participant(s) using the corresponding sync point identifier(s). An event occurs for each sync point identifier that is specified.

(2) A recovery request event 312 occurs at a target recovery facility 70 (one that represents a participant in a failing sync point) when a recovery process that represents a sync point initiator sends a recovery request to one of its participants.

(3) A communications failure event 313 occurs in a recovery facility 70 when there is a broken connection on the path used to send log information from the application environment to that recovery facility. An event occurs for each sync point that is in progress for the application environment that was utilizing the failed path.

(4) A recovery facility failure event 314 occurs when there is a termination failure for a recovery facility such that sync point logging cannot take place. An event occurs for each incomplete sync point at the time of the failure and the events occur when the recovery facility is restarted.

(5) A recovery administrative request event 315 results from an administrative command that is used to repair sync point failures that have encountered prolonged delays or serious failures during the normal, automatic recovery procedure. The request manually supplies response state information that is normally available through automatic recovery protocols. The appropriate response state information is determined off-line from manual investigation of sync point log records. The appropriate response data (state information) is determined by administrators from manual investigation of sync point log records.

When the recovery procedure is initiated, Step 304 starts an asynchronous sub-process for each recovery event received. A participation driver sub-process (Step 317) initiates communications and accepts responses from each downstream participant in the failing sync point for the purpose of agreeing upon a consistent resolution. This communication involves the participation driver sending a message that includes the recovery server log name and a sync point state such as commit or back out, and then receiving a response from the participant that includes an indication of agreement or disagreement with the recovery server log name sent, a participant log name, and a response to the sync point state, such as committed or backed out. The participation driver invokes a response processing driver (Step 318) for each response message thus received. The response processing driver analyzes the response and completes all required actions and recording. This involves checking the participant's log name against the one recorded for the participant in log 72 to verify that the participant has not had a log failure since the sync point began. It further involves posting the sync point response to the recovery facility log 72. Then the response processing driver returns to the participation driver. When all responses are received and processed, an initiator response driver (Step 319) is invoked to build and send a response to the recovery facility that represents the initiator of the sync point, permitting it, in turn, to resolve the sync point with its initiator, if applicable. The response to the initiator is similar to the response that the current recovery facility received from its participants, involving a return of the current recovery facility log name and the response sync point state, such as committed or back out, that is based on the results from all of its own sync point participants. Finally, a recovery terminator (Step 306) terminates all involved processes.

Figure 37:
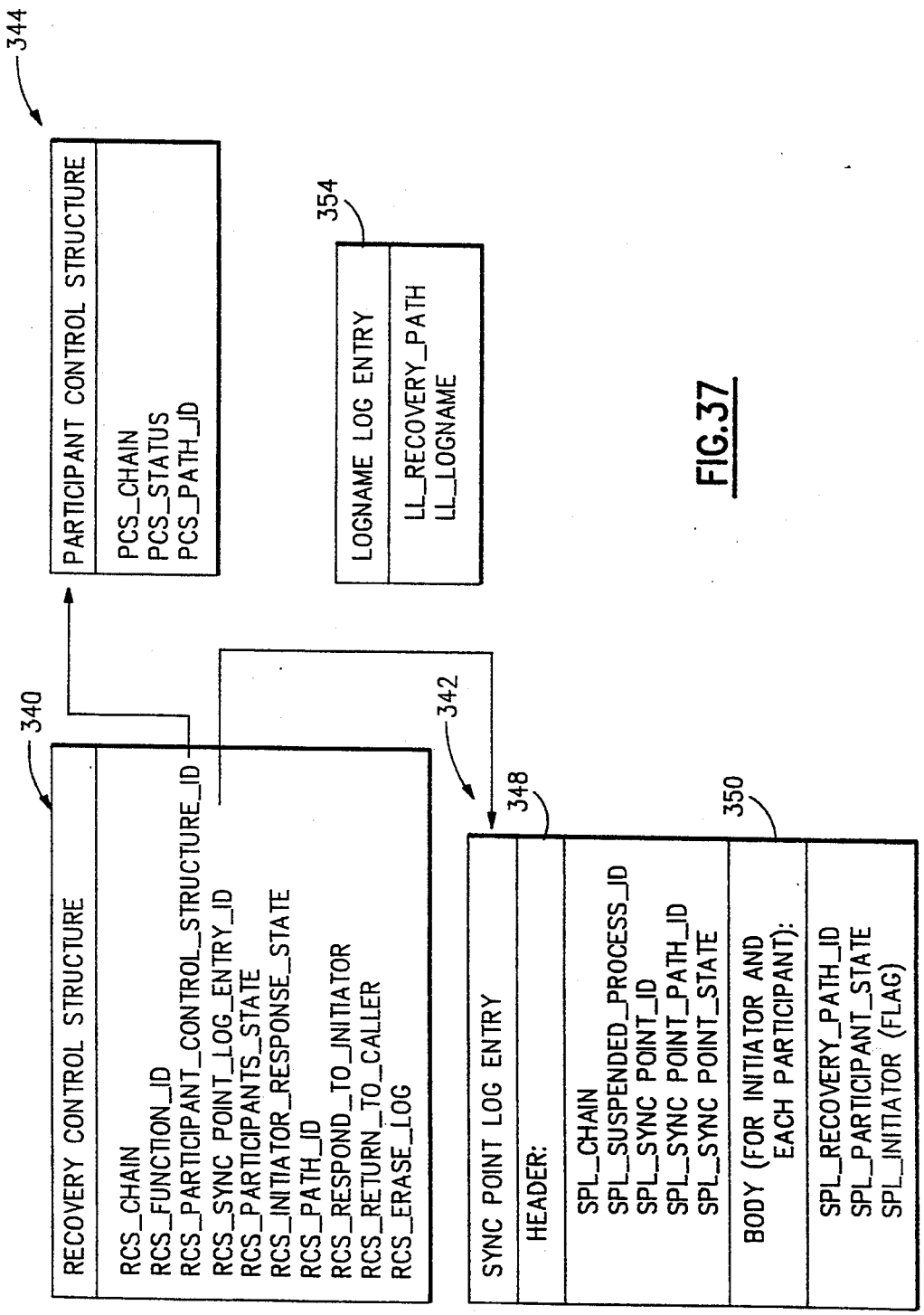
FIG. 37 is a block diagram illustrating the contents of logs 72 of FIG. 2 and control structures required to control the procedures represented by FIG. 35.

FIG. 37 illustrates control structures required for the recovery procedure. A recovery control structure 340 contains information about a particular recovery event and exists throughout the current processing of the event. It contains information that is common to the recovery of all participants for the related sync point. It also contains anchors to an associated entry 342 in log 72 and to a chain of participant control structures 344, each of which contains the current recovery status and path identifier for the recovery participant. The sync point log entry 342 has header information 348 that is common to the local sync point participants as well as body information 350 about the immediate initiator and each immediate participant. Finally there is a log name log entry 354 which contains initial log name exchange information for each sync point path known to the recovery facility that is associated with the sync point log.

The purposes of these fields is further indicated by the structural flows that follow. Some fields require preliminary description: "Chain" fields are used to interconnect structures of like type.

"State" fields:

SPL_SYNCPOINT_STATE is the overall sync point state Once the sync point has reached phase two, this state permits driving downstream participants to resolve the sync point. If the sync point was in phase one at the time of failure, recovery request event processing may change this state according to the direction provided by the initiator recovery facility.

SPL_PARTICIPANT_STATE is updated with response states from participants by the Response Processing Driver 318.

RCS_PARTICIPANTS_STATE is set by the various recovery event processing for the purpose of driving the affected downstream sync point participants.

RCS_INITIATOR_RESPONSE_STATE is initialized by various recovery events processing 311-315 along with RCS_PARTICIPANTS_STATE, but under some circumstances is also updated by the response processing driver 318 where the response to the initiator is to reflect unusual and unexpected responses from participants that result from unilateral decisions known as heuristic responses. This field is used by the initiator response driver 319 to provide the state returned to the initiator.

"Path ID" fields:

RCS_PATH_ID is the path associated with an incoming event and may be used to respond to the originator of that event.

PCS_PATH_ID is the path associated with a participant in a failed sync point. It would be the same as the SPL_RECOVERY_PATH_ID for participants.

SPL RECOVERY PATH ID is the path to get to the participant or the initiator as needed by the sync point recovery facility.

SPL_SYNCPOINT_PATH_ID is the path used by sync point processing in the application environment to supply sync point log information to the local recovery facility's sync point log.

"Flags":

RCS_RESPOND_TO_INITIATOR indicates that a response should be generated to the immediate initiator of the sync point recovery facility;

RCS_RETURN_TO_CALLER—is used for controlling synchronous return from a sync point recovery request when the wait indicator (described below) is used;

RCS_ERASE_LOG is used to record that a recovery administrative request included a PURGE option, causing the sync point log entry to be erased at the conclusion of processing; and SPL_INITIATOR indicates that the information in the particular sub-entry of the BODY of the sync point log entry concerns the initiator of the sync point; otherwise it concerns a participant.

"Miscellaneous" Fields:

RCS_FUNCTION_ID is used by the sub-process starter service to determine the function to be invoked to execute in the new process.

SPL_SYNCPOINT$_{13}$ ID is the unique identifier of the sync point and the node in the sync point tree. Each sync point log entry has a distinct sync point identifier.

SPL_SUSPENDED_PROCESS_ID is set by the timer wait service to identify the suspended process and reset when the timed wait interval expires. It is used to invoke the resume service to prematurely terminate the timed wait for a particular process.

PCS_STATUS is used to record the status of communications with each participant in the recovery procedure. It has four possible values: RESTART, CONNECTED, RETRY, AND RESPONDED.

LL_LOGNAME is the log name of the syncpoint participant. One is recorded for each path involved in any potential sync point communication.

Figure 38:
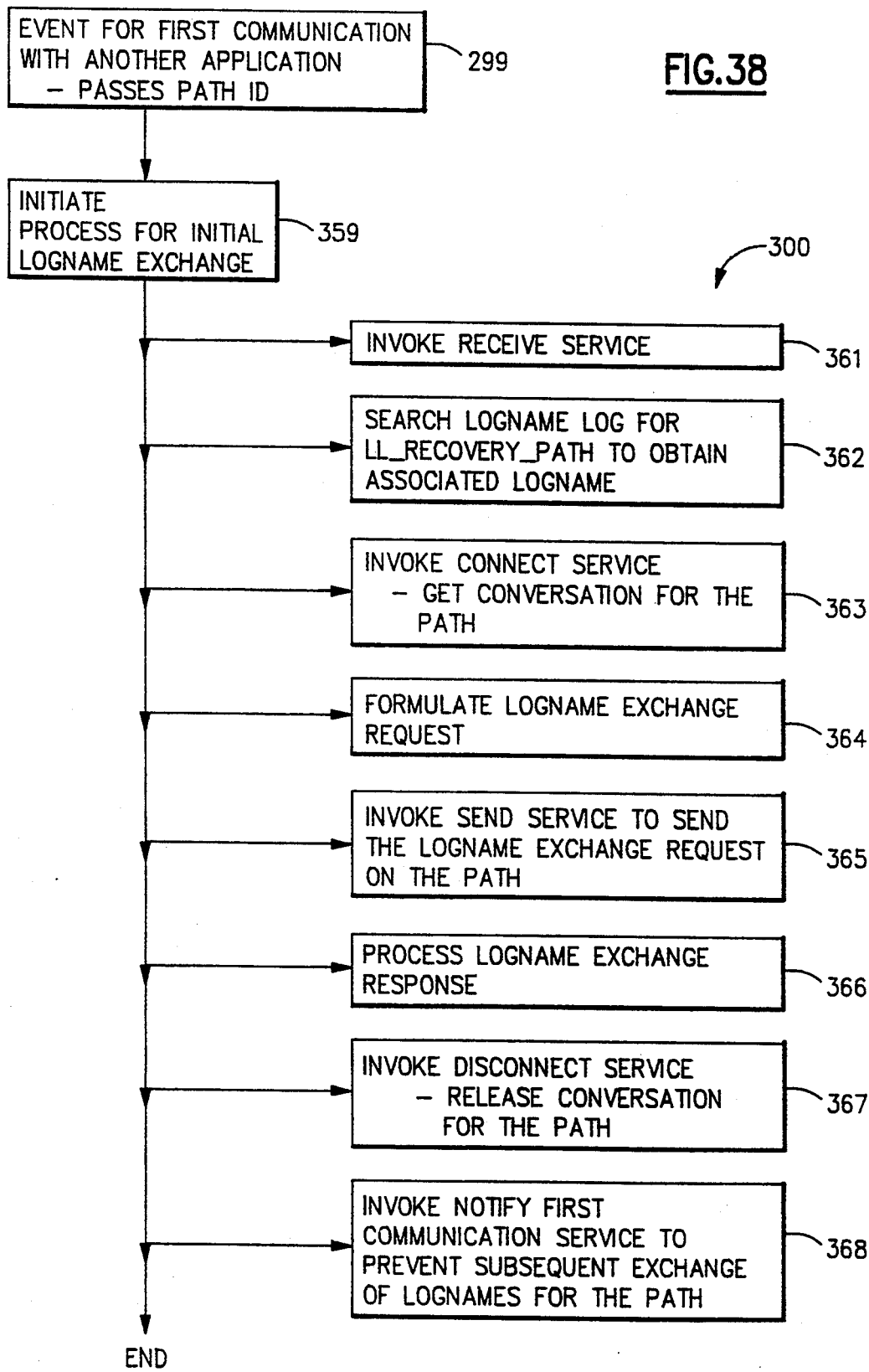
FIG. 38 is a flowchart providing detail for FIG. 35, steps 299 and 300.

FIG. 38 is a flowchart which illustrates the processing Step 300, triggered by event step 299 (corresponds to same step in FIG. 35) and executed by recovery facility 70 when a sync point communication is initiated for the first time during the activation of the recovery facility. It initiates a process (Step 359) for exchanging log names between the local recovery facility and the recovery facility associated with the target of the sync point communication.

A receive service (Step 361) provides the input data (path identifier) for the process. The log name log is used (step 362) to retrieve the log name associated with the path for use in the exchange of log names (Step 362). in the log name exchange, the expected log name for the target is sent along with the log name of the local recovery facility. The log name exchange request is sent (Steps 363-365) and the response is processed (Step 366). When the exchange is successful, the log name log is updated with the new or changed target log name. Then the recovery facility disconnects from the path (Step 367) and invokes a first communication service to record that the exchange was successful to prevent future exchange events for the processed path, or unsuccessful to insure continued suspension of communications and attempts to complete an exchange of log names (Step 368).

Figure 39:
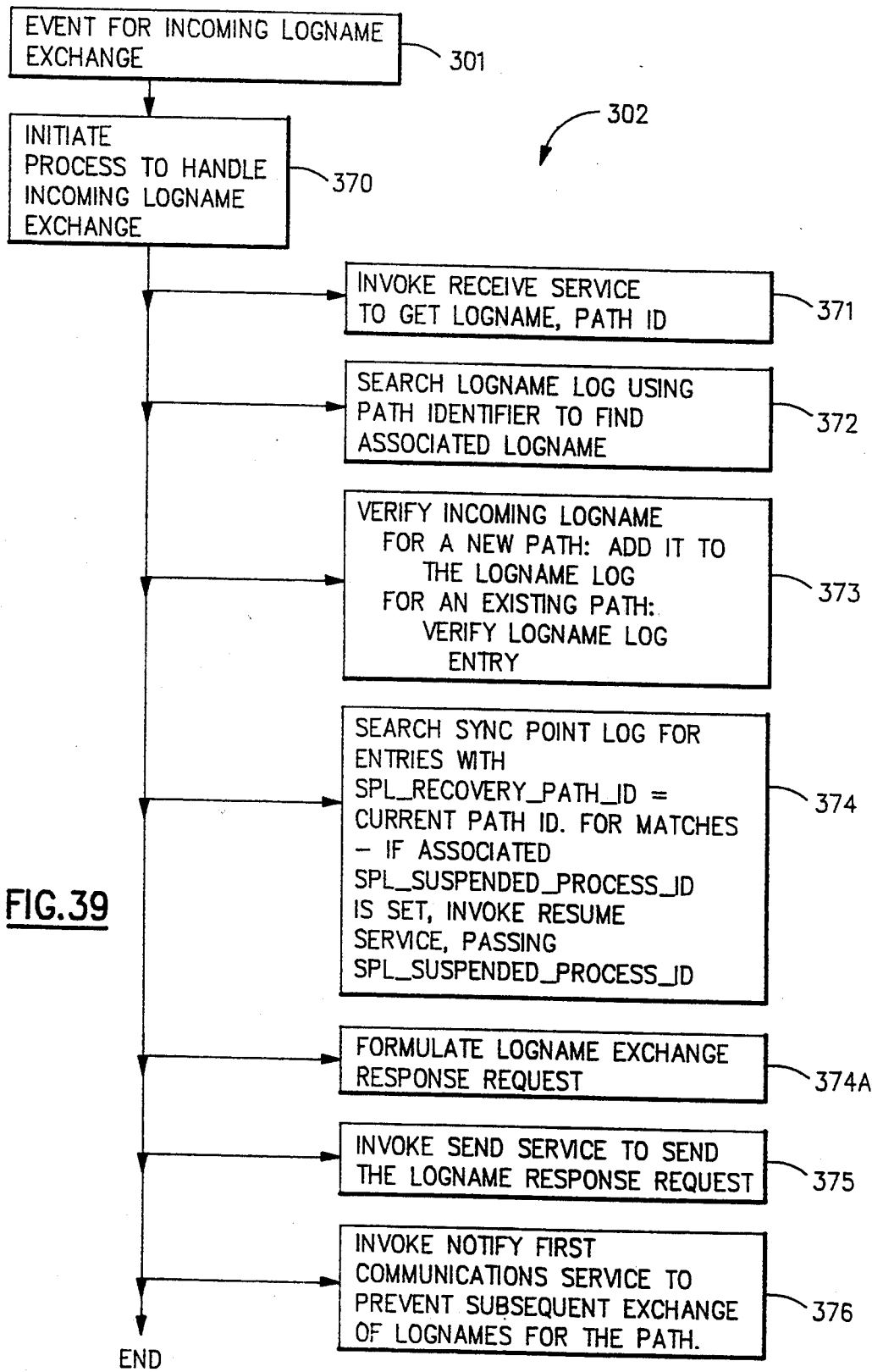
FIG. 39 is a flowchart providing detail for FIG. 35, steps 301 and 302.

FIG. 39 is a flowchart which illustrates in detail the Steps 302, triggered by event step 301 (corresponds to same step in FIG. 35), that take place as a result of an incoming log name exchange request arrival. After an initiation (Step 370), the log name and path identifier are received (Step 371) and the log name log is updated accordingly (Steps 371-373). If there are any recovery processes associated with the path that are in suspension (timer-wait) (Step 374), then the recovery facility 70 invokes the resume service for each to cause resumption of the processes. The log name exchange response (Step 374A) includes the local log name and an indication of agreement/disagreement with the exchange data received. The response is sent to the originator (Step 375) and, for successful exchange, the first communications service is invoked (Step 376) to prevent subsequent exchange of log names for the path.

Figure 40:
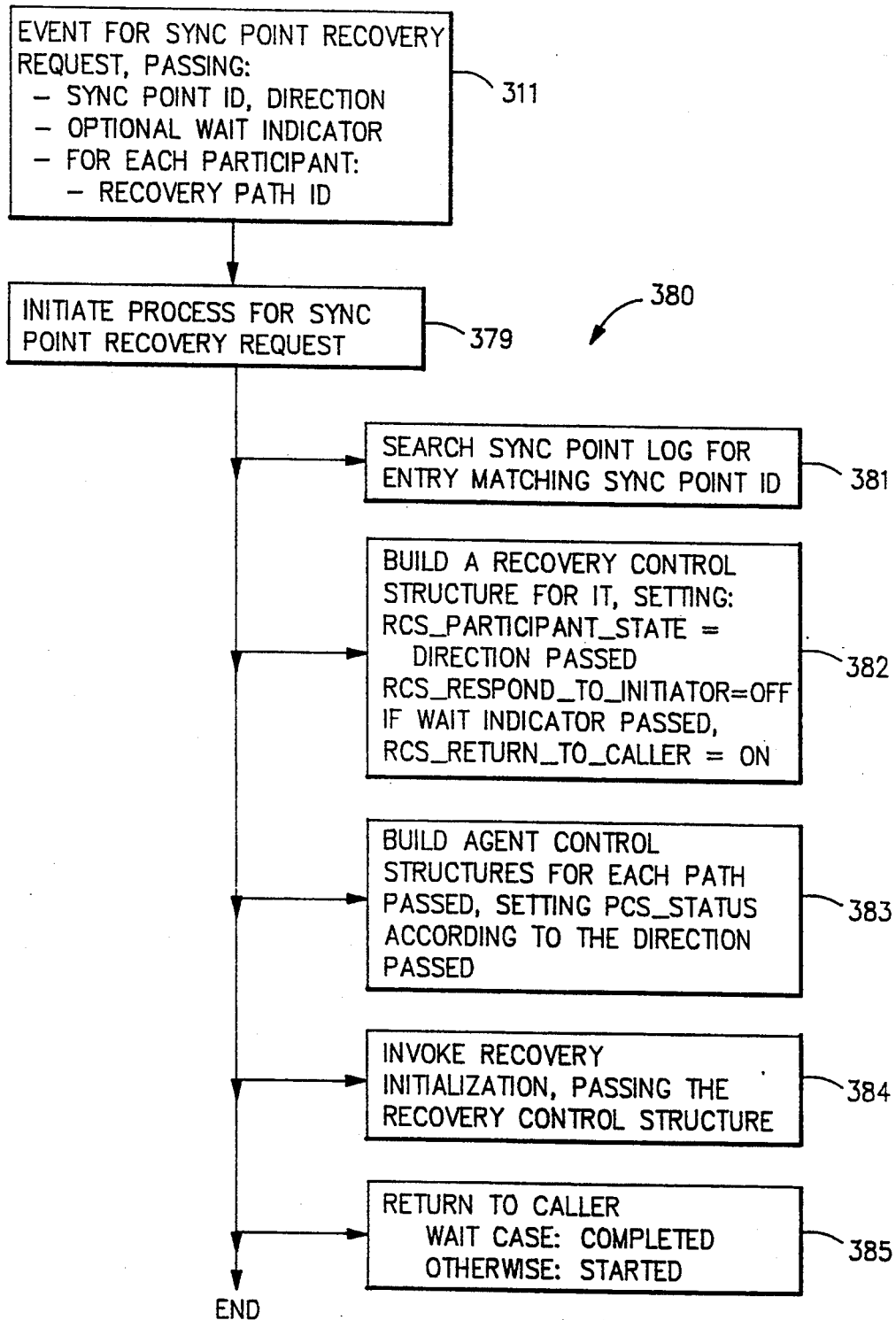
FIG. 40 is a flowchart providing detail for FIG. 36, step 311.

FIG. 40 is a flowchart which illustrates the procedure for an explicit request event (Step 311corresponds to same step in FIG. 35) from an active sync point to perform sync point recovery. This would occur if there were a partial failure in an application environment 52 requiring recovery from a sync point but not terminating the application or sync point. The request from the sync point manager in the application environment 52 provides the sync point identifier and the direction (commit or back-out) to be used to complete the failing sync point. Additionally, for each failed participant in the sync point, the recovery path identifier is supplied. The required action can complete synchronously (wait indicator supplied) or asynchronously as described in more detail below (no wait indicator supplied).

The arrival of this request is an event that initiates (Step 379) a procedure (Step 380) which requires searching the sync point log (Step 381) for an entry that has a matching SPL_SYNCPOINT_ID. When found, a recovery control structure is built (Step 382) with an anchor to the sync point log entry and RCS_PARTICIPANTS_STATE set to the direction passed in the request. Additionally, the RCS_RESPOND_TO_INITIATOR flag setting prevents sending a response to a recovery facility representing the initiator of the sync point and, in the case where the wait indicator is passed, the RCS_RETURN_TO_CALLER flag is set, causing the response to the request to be deferred until the recovery procedure is completed. Without the wait indicator, there is a response to the initiating request after the recovery procedure is started. Next, an agent control structure is built (Step 383) for each participant, represented by the path identifiers provided, and PCS_STATUS is initialized to RESTART. The chain of agent control structures is anchored to the recovery control structure. Next, recovery initialization is invoked (Step 384), passing the recovery control structure. When returning from the initialization, there is a response to the invoker (Step 385). When the wait indicator was used, the invoker is advised of completion; otherwise, the notification is either completion or an indication that the request processing was begun (will complete later).

Figure 41:
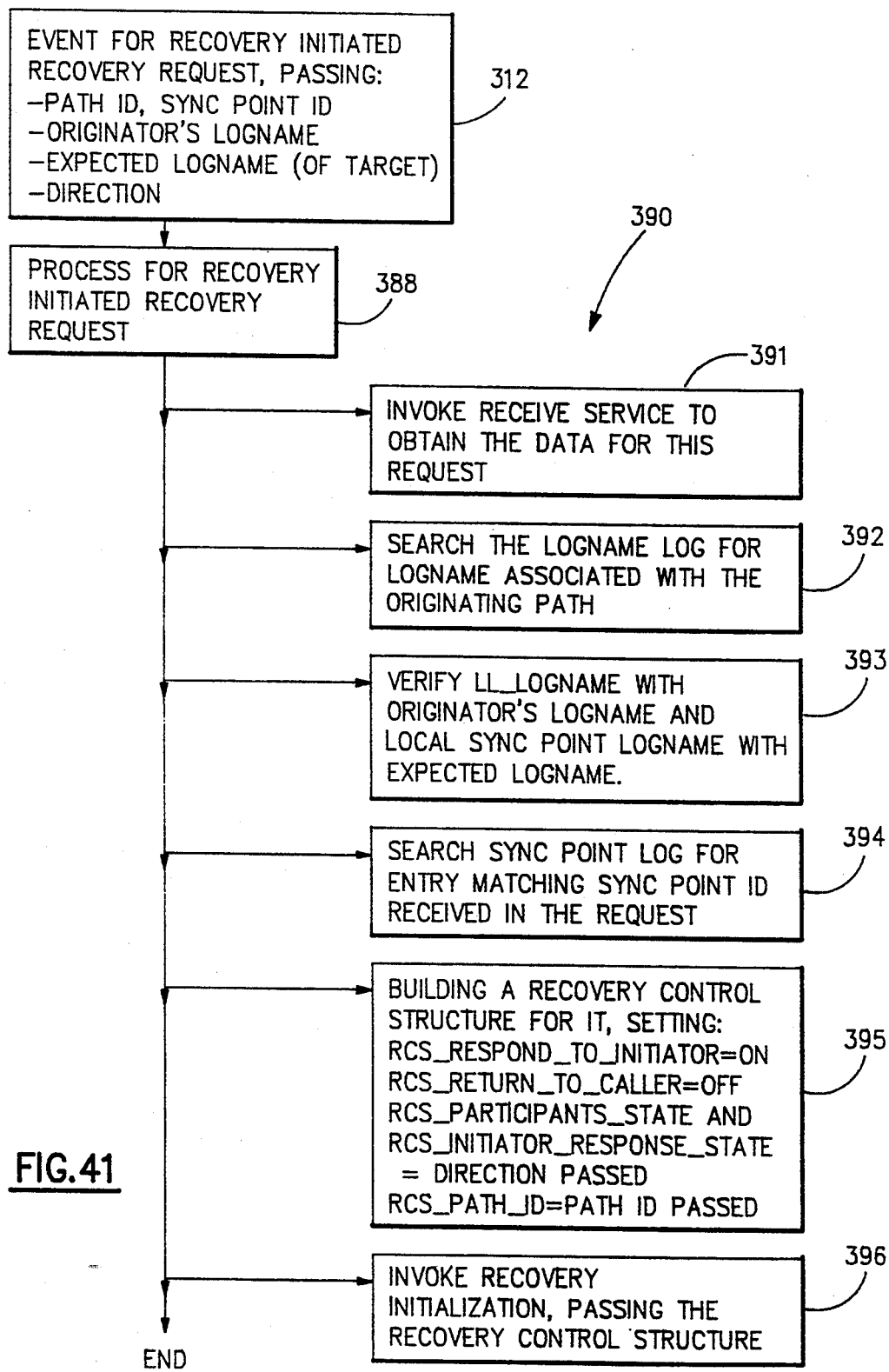
FIG. 41 is a flowchart providing detail for FIG. 36, step 312.

FIG. 41 is a flowchart illustrating the procedure that results from an event initiated (Step 312) by receiving a recovery request from a recovery facility that represents the immediate initiator in a failing sync point. This initiates (Step 388) a procedure (Step 390) which invokes the receive service (Step 391) to obtain the path ID associated with the incoming request, the sync point identifier for the failing sync point (which also identifies the local node in that sync point), the log name associated with the originator's sync point log, the log name that the initiator's recovery facility expects to match with the name of the sync point log for the current recovery facility, and the direction (state) to be used to resolve the failure.

The path identifier is used to find an entry in the local log name log (Step 392). Then LL_LOGNAME is verified with the originator's log name and the local sync point log name is verified with the expected log name passed (Step 393). Next, the sync point log is searched for an entry with the matching sync point identifier (Step 394). When found, a recovery control structure is built (Step 395) with an anchor to the sync point log entry and RCS_PARTICIPANT_STATE set to the direction passed in the request. Additionally, the RCS_RESPOND_TO_INITIATOR flag is set to indicate that a response to the initiator is appropriate and the RCS PATH ID is set to the path identifier of the initiator's incoming path. The RCS RETURN TO CALLER flag is set to prevent return to the calling sync point manager 60 in the application environment 52. Finally recovery initialization is invoked (Step 396), passing the recovery control structure.

Figure 42:
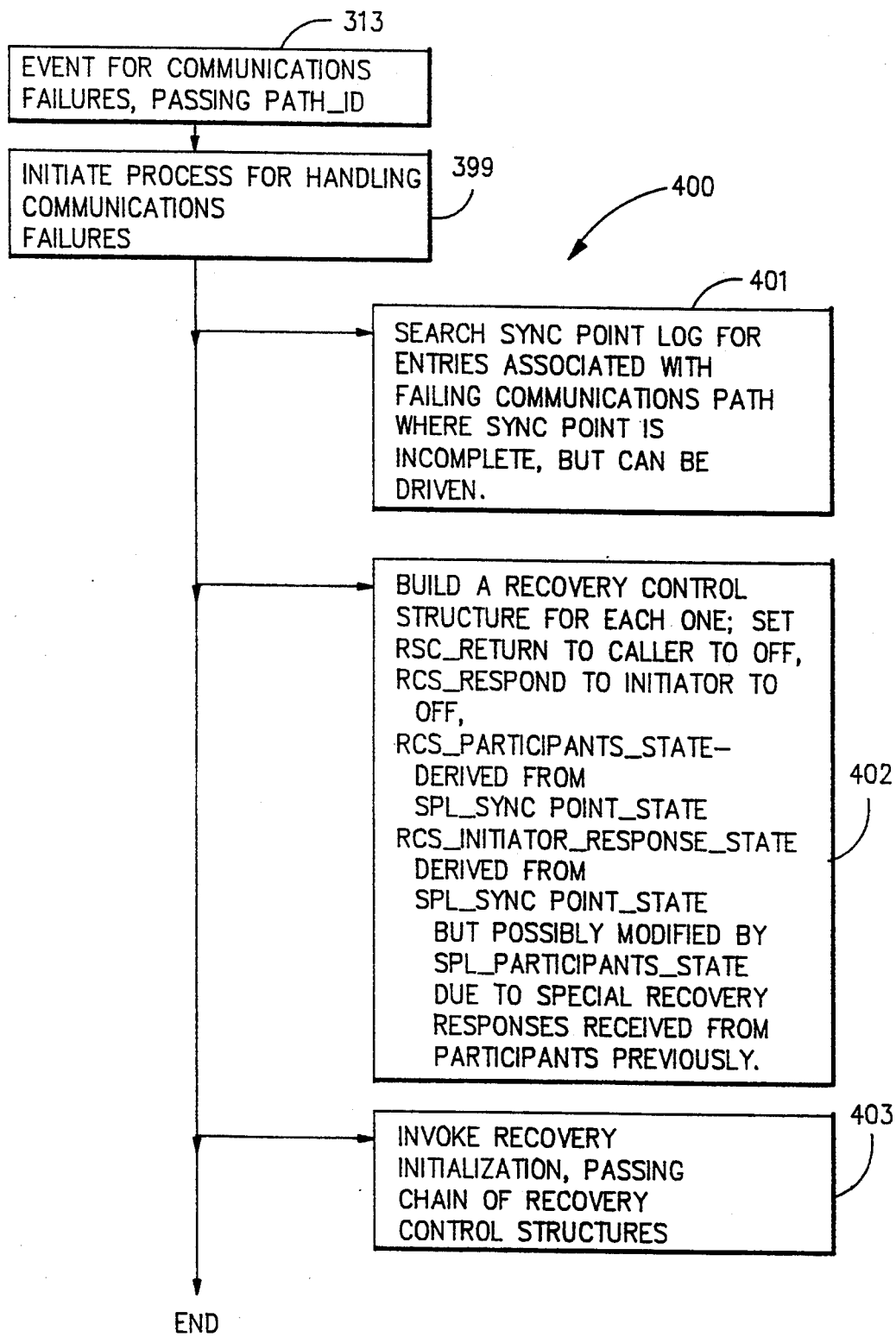
FIG. 42 is a flowchart providing detail for FIG. 36, step 313.

FIG. 42 is a flowchart illustrating the processing (Step 400) that results when there is a failure in the path (Step 313) between the application environment 52 and the recovery facility 70 such that sync point logging is inoperative. After the process is initiated (Step 399), the sync point log is searched for entries that satisfy both of the following conditions (Step 401):

(1) SPL_SYNCPOINT_PATH ID matches the failing path.
(2) SPL_SYNCPOINT_STATE indicates that the immediate sync point participants can be driven to complete the sync point. This is indicated by one of the following: SPL_SYNCPOINT_STATE indicates sync point phase one and there has not been a response to the initiator's "prepare", or SPL_SYNCPOINT_STATE indicates sync point phase two.

Where these conditions are met, a recovery control structure is built (for each such log entry) (Step 402) with an anchor to the sync point log entry, where both RCS_INITIATOR_RESPONSE_STATE and RCS_PARTICIPANTS_STATE are derived from the SPL_SYNCPOINT_STATE. In some cases, SPL_PARTICIPANT_STATE also affects the setting of the RCS_INITIATOR_RESPONSE_STATE setting. This occurs, for example, when a response from a participant had indicated a unilateral (heuristic) action. Additionally, the RCS_RESPOND_TO_INITIATOR flag setting prevents sending a response to a recovery facility representing the initiator of the sync point and the RCS_RETURN_TO_CALLER flag setting indicates that there is no calling sync point manager to which to return. The resulting recovery control structures are chained together. Finally recovery initialization is invoked (Step 403), passing the chain of recovery control structures.

Figure 43:
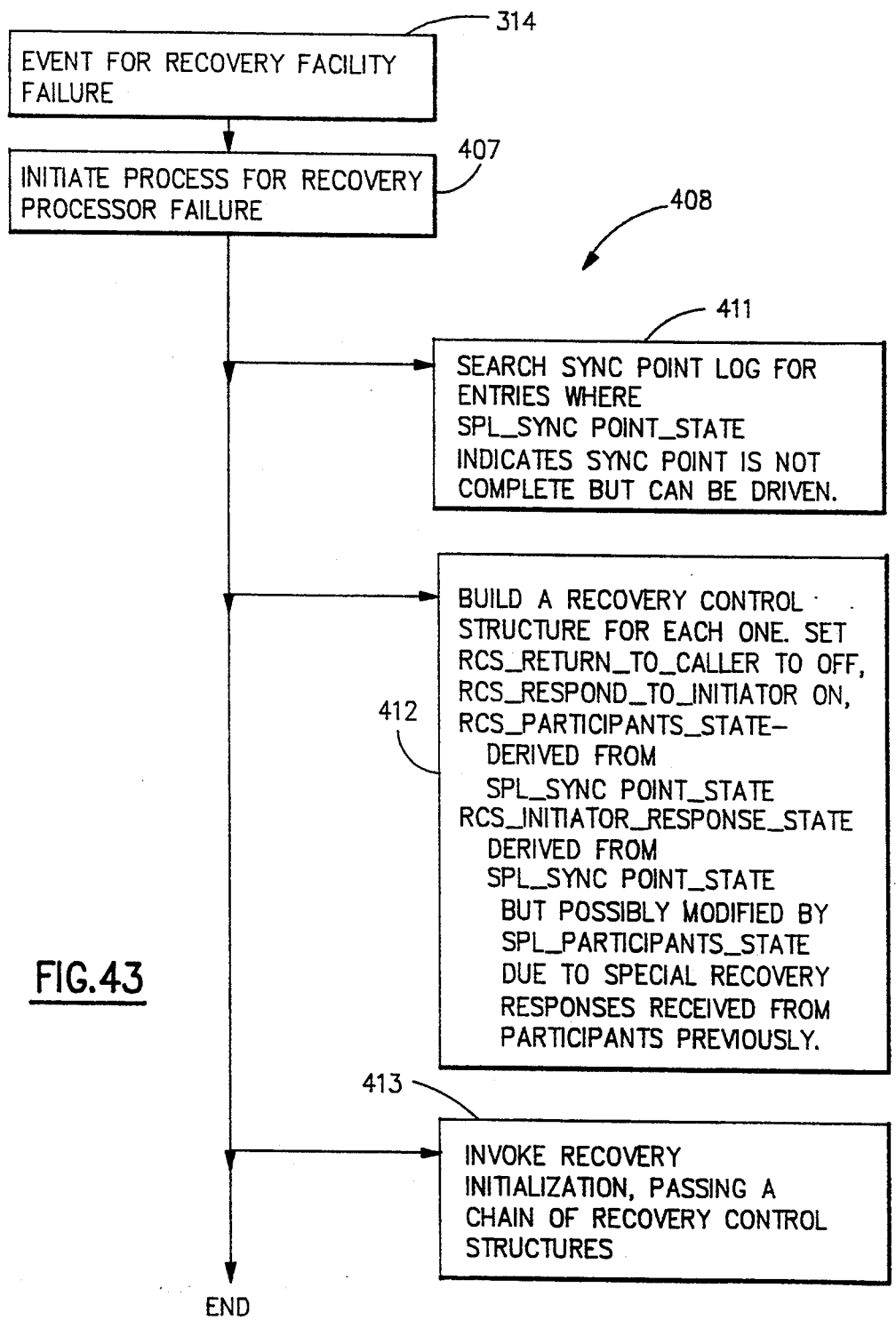
FIG. 43 is a flowchart providing detail for FIG. 36, step 314.

FIG. 43 is a flowchart which illustrates processing (Step 408) that results when there is a failure of the recovery facility 72 (Step 314). When the recovery facility 70 is restarted (Step 407), the log 72 is searched (Step 411) for all entries that satisfy the following condition SPL_SYNCPOINT_STATE indicates that the immediate sync point participants can be driven to complete the sync point. This is indicated by one of the following: SPL_SYNCPOINT_STATE indicates sync point phase one and there has not been a response to the initiator's "prepare", or SPL_SYNCPOINT_STATE indicates sync point phase two.

Where this condition is met, a recovery control structure is built for each such log entry (Step 412) with an anchor to the sync point log entry, where both RCS_INITIATOR_RESPONSE_STATE and RCS_PARTICIPANTS_STATE are derived from the SPL_SYNCPOINT_STATE. In some cases SPL_PARTICIPANT_STATE also affects the setting of the RCS_INITIATOR_RESPONSE_STATE setting. This occurs when a response from a participant had indicated, for example, a unilateral (heuristic) action. Additionally, the RCS_RESPOND_TO_INITIATOR flag setting allows for sending a notification to the recovery facility representing the initiator of the sync point and the RCS_RETURN_TO_CALLER flag setting indicates that there is no calling process to which to return. The resulting recovery control structures are chained together. Finally recovery initialization is invoked (Step 413), passing the chain of recovery control structures.

Figure 44:
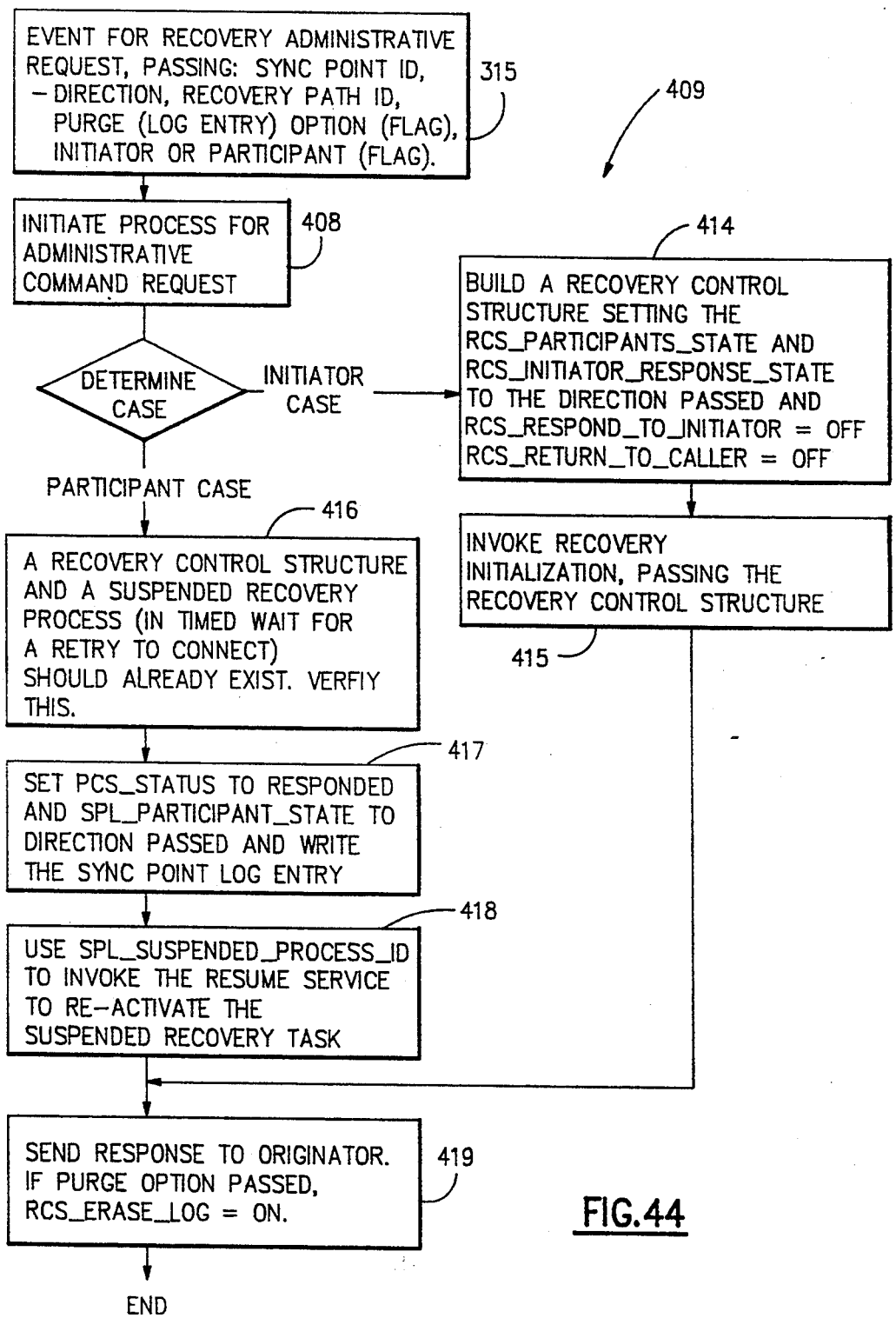
FIG. 44 is a flowchart providing detail for FIG. 36, step 315.

FIG. 44 is a flowchart which illustrates a support (Step 409) for recovery administrative requests (Step 315) which permits manually initiated repair of stalled automatic sync point recovery due to failure to initiate a conversation with a sync point participant (participant case) for downstream resolution or a sync point initiator (initiator case) for providing the direction (state) to drive its participants to completion.

In the participant case, the request provides a substitution for the participant's response so that the recovery facility 70 that is driving the downstream participants can complete the recovery without actually communicating with the participant. In the initiator case, the request provides a substitution for the normal recovery initiated recovery request event (as described in FIG. 41) that cannot occur due to the inability of the initiator to connect to the local recovery facility 70; in the latter case, the response permits the local recovery facility 70 to drive its participants without the event depicted in FIG. 41.

In the initiator case, after the support is initiated (Step 408), a recovery control structure is built (Step 414), setting the RCS_INITIATOR_RESPONSE_STATE and RCS_PARTICIPANTS_STATE to the direction passed, providing the equivalent of a recovery initiated recovery request. In addition, RCS_RESPOND_TO_INITIATOR is set off to prevent response generation and RCS_RETURN_TO_CALLER is set off to prevent return from recovery initialization when processing is complete. Recovery initialization is invoked (Step 415) to initiate the processing.

In the participant case, a recovery control structure and a suspended recovery process should already exist. The process is suspended while in timer-wait, retrying the initialization of a conversation to the participant at the end of each time interval. After verifying this (Step 416), the PCS for the participant associated with the passed recovery path identifier is located and the PCS_STATUS set (Step 417) to RESPONDED, as if the participant had actually responded, and the SPL_PARTICIPANT_STATE is set to the direction passed; then the sync point log entry is updated. Next, the SPL SUSPENDED PROCESS ID is used to call the resume service to restart the suspended process (Step 418). In either case, there is a response made to the originating request (Step 419), indicating that the proper substitutions have been made and the recovery process is active again. If the purge option is passed, RCS_ERASE_LOG is turned on to erase the sync point log entry at the conclusion of processing.

Figure 45:
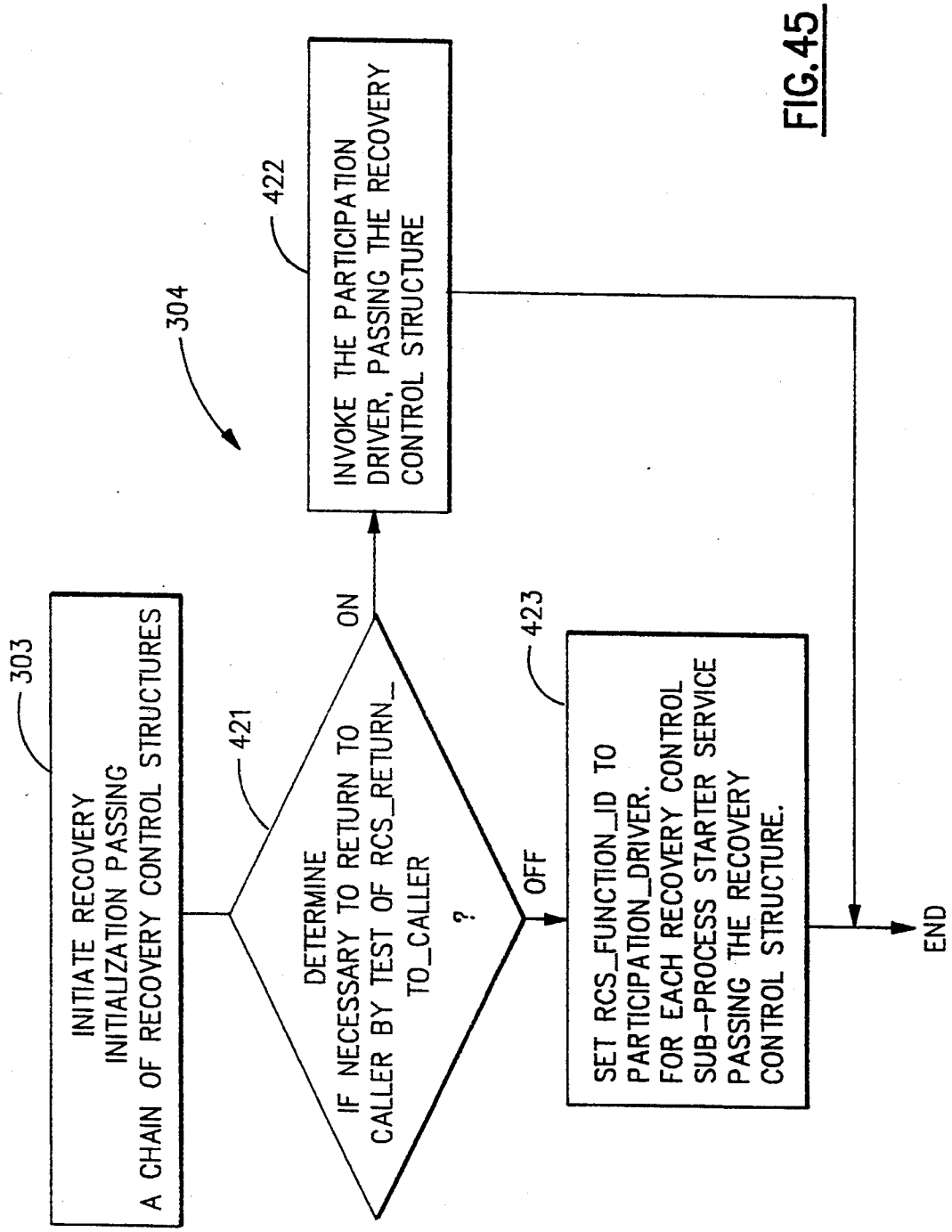
FIG. 45 is a flowchart providing detail for FIG. 36, step 304.

FIG. 45 is a flowchart which illustrates the Steps required for the recovery initialization function (Step 304). After initialization (Step 303) the RCS_RETURN_TO_CALLER flag determines (Step 421) whether the participation driver is invoked in the current process (ON) or in a separate, parallel process (OFF). Where RCS_RETURN_TO_CALLER is set, the participation driver is invoked (Step 422), passing the recovery control structure. Otherwise, the RCS_FUNCTION_ID is set to indicate the "participation driver" and the sub-process starter service is invoked for each recovery control structure passed (Step 423).

Figure 46A:
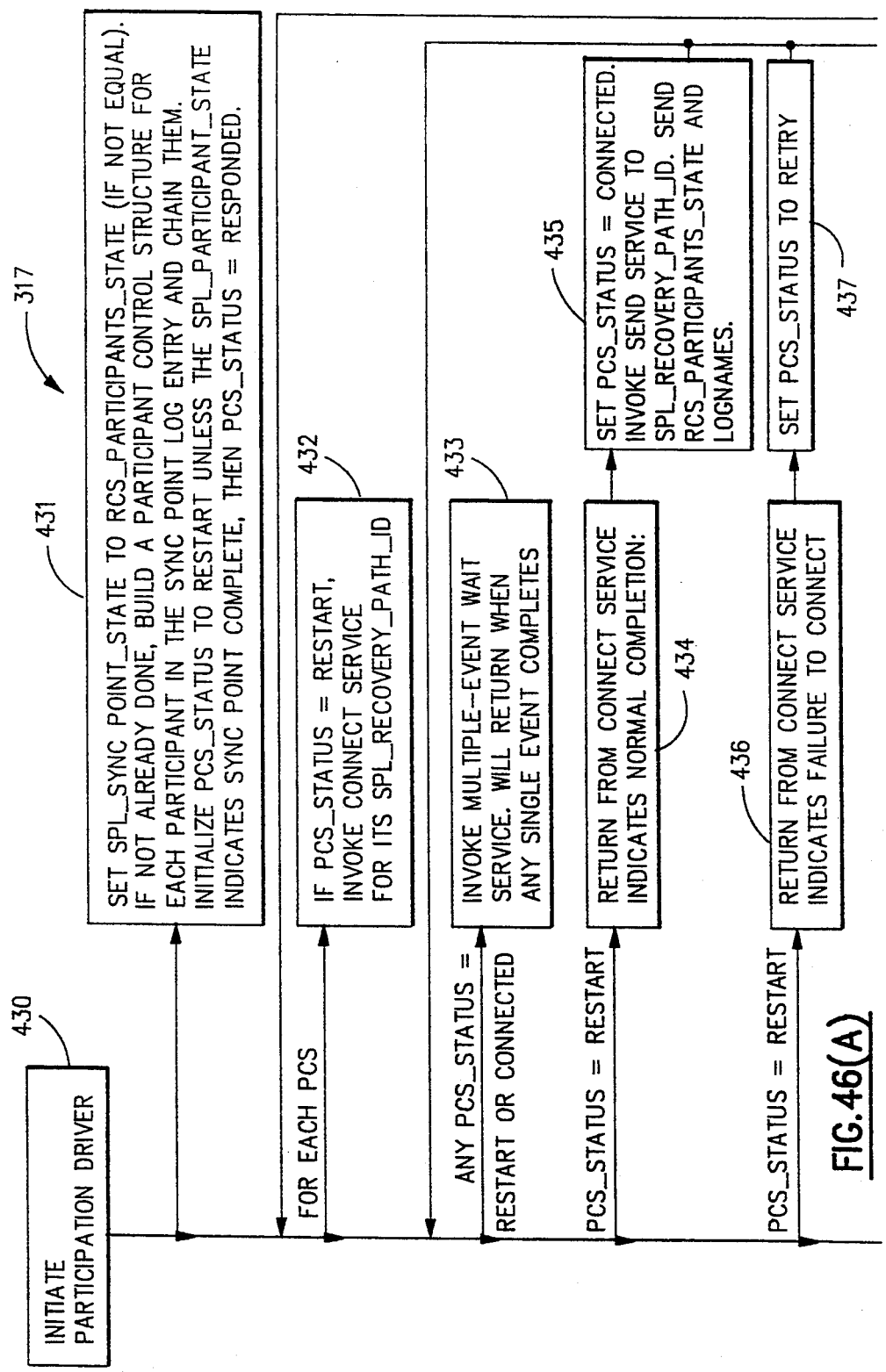

FIG. 46 is a flowchart which illustrates the flow for the participation driver Step 317. The primary function of the participation driver is to initiate communications with the participants of the failing sync point and obtain responses from them in order to insure that the associated. sync point logs are at the same level as they were when the sync point began and provide sync point state information that will provide the basis for resolving the sync point.

After initiation of the participation driver (Step 430), the SPL_SYNCPOINT_STATE is set (Step 431) according to the current RCS_PARTICIPANTS_STATE. If participation control structures have not already been built for the sync point participants, they are built at this time, chained together, and anchored to the current recovery control structure. PCS PATH ID comes from the SPL_RECOVERY_PATH_ID of each participant and the PCS_STATUS is initialized to RESTART, unless SPL_PARTICIPANT_STATE indicates that sync point is resolved for the particular participant, whereupon it is set to RESPONDED.

The flow of Steps 432-444 is controlled by the PCS_STATUS value for each participant. The possible values are:

(1) RESTART—indicates that a conversation with the participant is required.
(2) CONNECTED—indicates that there was success in initializing a conversation with the participant and causes the sending of the recovery request message to the participant.
(3) RESPONDED—indicates that the sending of the recovery request message to the participant completed with a response from the participant. The response processing driver is invoked (Steps 438-439) to handle the response.
(4) RETRY—indicates failure in an attempt to connect (i.e. establish a conversation ) (Steps 436-437) or send a message (Steps 440-441), or a mismatch of log names (Steps 440-441). After all PCS_STATUS flags for participants have progressed beyond the RESTART and CONNECTED status, but there are some that have encountered communications failures (the remainder RESPONDED), the participation driver for the current sync point recovery suspends itself for a timed interval. When the suspension is completed, all PCS_STATUS of RETRY are changed to RESTART, which causes attempts to reconnect.

The multiple event wait service (Step 433) is used to wait for completion of the first of any outstanding connect or send service requests, returning control to the participation driver with the path identifier and indication of success or failure. The recovery request sent to the participant (Steps 434–435) includes the log name of the sending recovery facility 70 and the expected log name associated with the participant. The RCS_PARTICIPANTS_STATE is sent to permit a comparison with the participant's actual state, defining the appropriate recovery action. The timed wait service (Steps 442–443) is used to delay processing for a system-defined time interval before re-attempting unsuccessful initiation of a conversation. This intentional delay is undertaken only after all participation paths have been driven and some failures have been encountered. Timed-wait completion (Step 444) serves to restart suspended processes which causes another attempt to connect with the participant. After all participants have attained a RESPONDED status and completed processing by the response processing driver, the initiator response driver is invoked (step 445) to handle possible responses to the recovery process that represents the sync point initiator.

Figure 47:
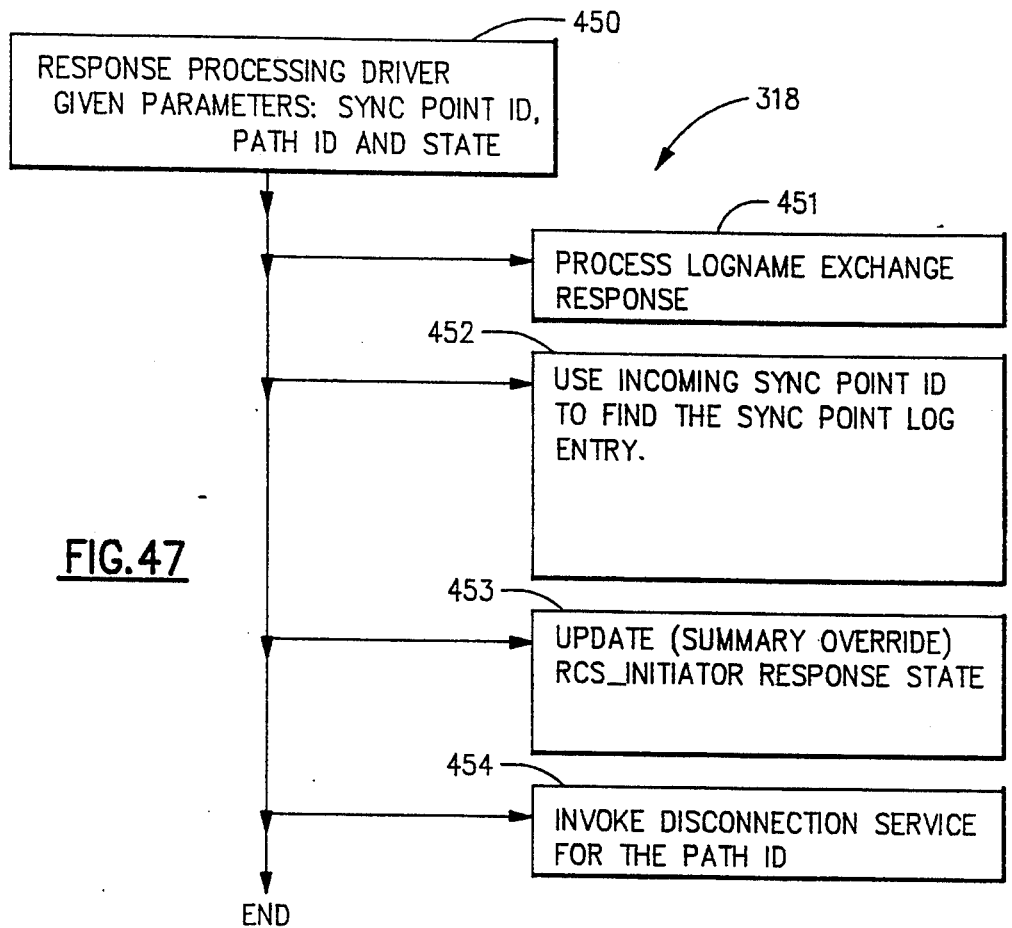
FIG. 47 is a flowchart providing detail for FIG. 36, step 318.

FIG. 47 is a flowchart which illustrates the processing required to process a response to a recovery request sent to a participant in a failed sync point. The response processing driver (Step 318) is passed the sync point identifier, path identifier, and the state received from the participant (Step 450). Then, the log name exchange response is processed (Step 451). If log names do not match, flow is returned to the participation driver (Step 317 FIG. 36) with an error that will cause a timed-wait retry to occur.

The sync point identifier is used to locate the sync point log entry; then the path identifier is used to locate the participant in the body of that sync point log entry, matching on SPL_RECOVERY_PATH_ID. Then the SPL_PARTICIPANT_STATE is updated with the state (Step 452).

The RCS_INITIATOR_RESPONSE_STATE is updated in some cases as a result of unexpected responses from participants, e.g. reflecting unilateral (heuristic) decisions (Step 453). Finally, the disconnection service is invoked to disconnect the current path (Step 454).

FIG. 48 is a flowchart which illustrates the initiator response driver (Step 319). First, the Initiator Response Driver is initiated (Step 460). When the RCS_RESPONSE_TO INITIATOR is not set (decision block 461), it is not necessary to respond; therefore, it is only necessary to erase (Step 468) the sync point log entry. Response is also bypassed when (Step 462) there is no initiator to which to respond, i.e. when the recovery facility represents the first node in the sync point tree.

When there is no suspended recovery initiated recovery request (event illustrated in FIG. 41) to handle the response to the initiator and there is no existing conversation to which to respond to the initiator (Decision Step 479), then it is appropriate to attempt upstream communications with the recovery facility that represents the initiator in order to notify it that the participant represented by the current recovery facility 70 is ready with a response (Step 464). This is most effective when there is a recovery facility for the initiator that is in timed suspension due to an earlier failed attempt to communicate with the local recovery facility 70, i.e., when the currently completed recovery resulted from a sync point failure that resulted in a failure of the local recovery facility 70 (event illustrated in FIG. 43). This upstream communications would have the effect of prematurely terminating the timed suspension and therefore minimizing the delay in resolving the sync point. FIG. 39, Step 374 illustrates the action by the receiving recovery facility (representing the initiator).

If the SPL_SUSPENDED_PROCESS_ID is not defined and the RCS_PATH_ID is not set (decision block 479), the upstream communication is accomplished by finding the entry for the initiator in the body of the sync point log entry for the recovering sync point and using the SPL_RECOVERY_PATH_ID that is associated with it to invoke the connection service for SPL_RECOVERY_PATH_ID. There is no retry when this attempt to initialize a conversation fails ("no" decision path in step 464A) because it is an optional optimization to complete the conversation and notify the initiator. If the conversation is initiated ("yes" decision path in Step 464A), a normal exchange of log names request is sent (Step 464B), as illustrated in FIG. 38, steps 364 through 367, then exit via decision step 477. In the case of connection not completed, invoke recovery termination (Step 479).

When the RCS_PATH_ID is not set (Decision Block 465), the response to the initiator Steps 466 and 467) is bypassed. Otherwise, a normal response to the initiator is made, using the RCS_INITIATOR_RESPONSE_STATE (Step 466) and the respond service (Step 467). In the case where RCS_RESPOND_TO_INITIATOR or RCS_ERASE_LOG is on (Decision Block 477), the recovery termination function in invoked (Step 469) before completion.

Figure 49:
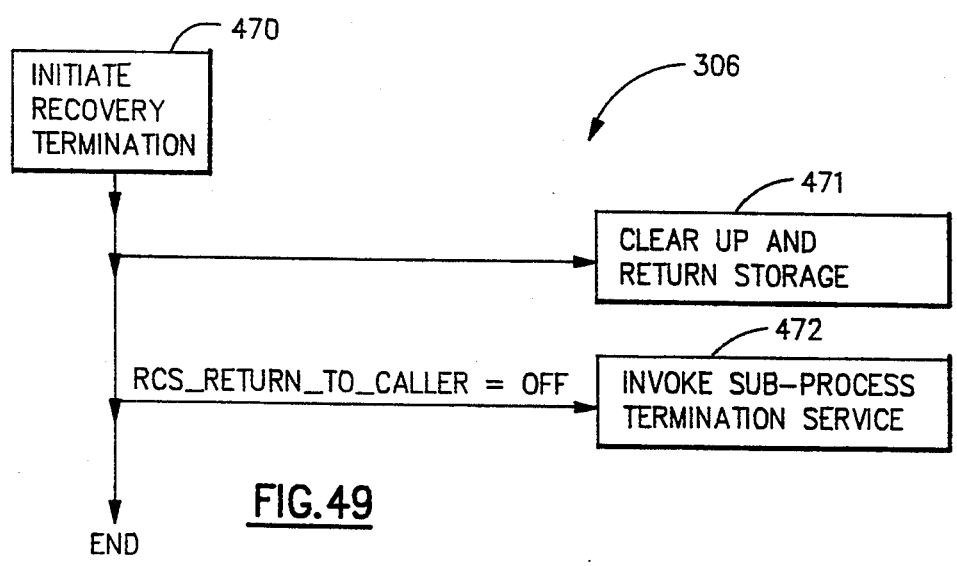
FIG. 49 is a flowchart providing detail for FIG. 36, step 306.

FIG. 49 is a flowchart which illustrates the recovery termination logic (Step 306) which involves, after initiation in Step 470, cleaning up storage and control structures (Step 471), and either returning to the caller (END) or invoking the sub-process termination service to complete the current process (Step 472).

ASYNCHRONOUS RESYNCHRONIZATION OF A COMMIT PROCEDURE

When there is a failure during syncpoint processing in system 50, the following asynchronous resynchronization procedure and facilities are provided to optimize the use of the participating applications. This procedure avoids extended delays in executing the application which issued a commit because the application need not wait idly during resynchronization. Instead, as described in more detail below, the application can do other useful work while waiting for resynchronization. The syncpoint manager and recovery facility execute this procedure provided either the application or a system default requested it. The recovery facility 70 supports asynchronous resynchronization (resynchronization-in-progress) and supports the new enhancements to the architected intersystem communications flows in support of this asynchronous resynchronization process. By way of example, the intersystem communications protocols are defined by IBM's *System Network Architecture LU 6.2 Reference: Peer Protocols*, SC31-6808, Chapter 5.3 *Presentation Services Sync—Sync Point verbs*. The architected intersystem communication enhancements within systems 50 include additional indications on such flows of Committed (last agent only), Forget, and Backout indicating resynchronization is in progress. In the data field defined for exchange log names between two different system recovery facilities during initial exchange or during resynchronization, there is an indicator that the sender of the exchange log names supports resynchronization-in-progress. Exchange log names processing is described above in the section entitled *Log Name Exchange For Recovery of Protected Resources*. Both recovery facilities must support resynchronization-in-progress in order for the facility to be used. Finally, there is an indicator in the compare states data field that tells the partner that resynchronization is in progress.

The foregoing section entitled *Coordinated Sync Point Management of Protected Resources* and FIG. 2, FIG 54, FIG. 3, FIG. 4, and FIG. 5(a,b) describe and illustrate two partner applications, 56A and 56D, their application environments, their processing and successful commit processing. The present section will extend the above to include a description of a failure during commit processing which results in asynchronous resynchronization. It should be understood that the asynchronous resynchronization process described herein is also applicable when a protected conversation is made between application partners on the same system and both are in different application environments, for example different virtual machines of the enhanced version of the VM operation system ("VM" is a trademark of IBM Corporation of Armonk, N.Y.) It should also be noted that in other embodiments, application 56A or application 56D could execute in a different type of execution environment.

Figures 50A, 50B:
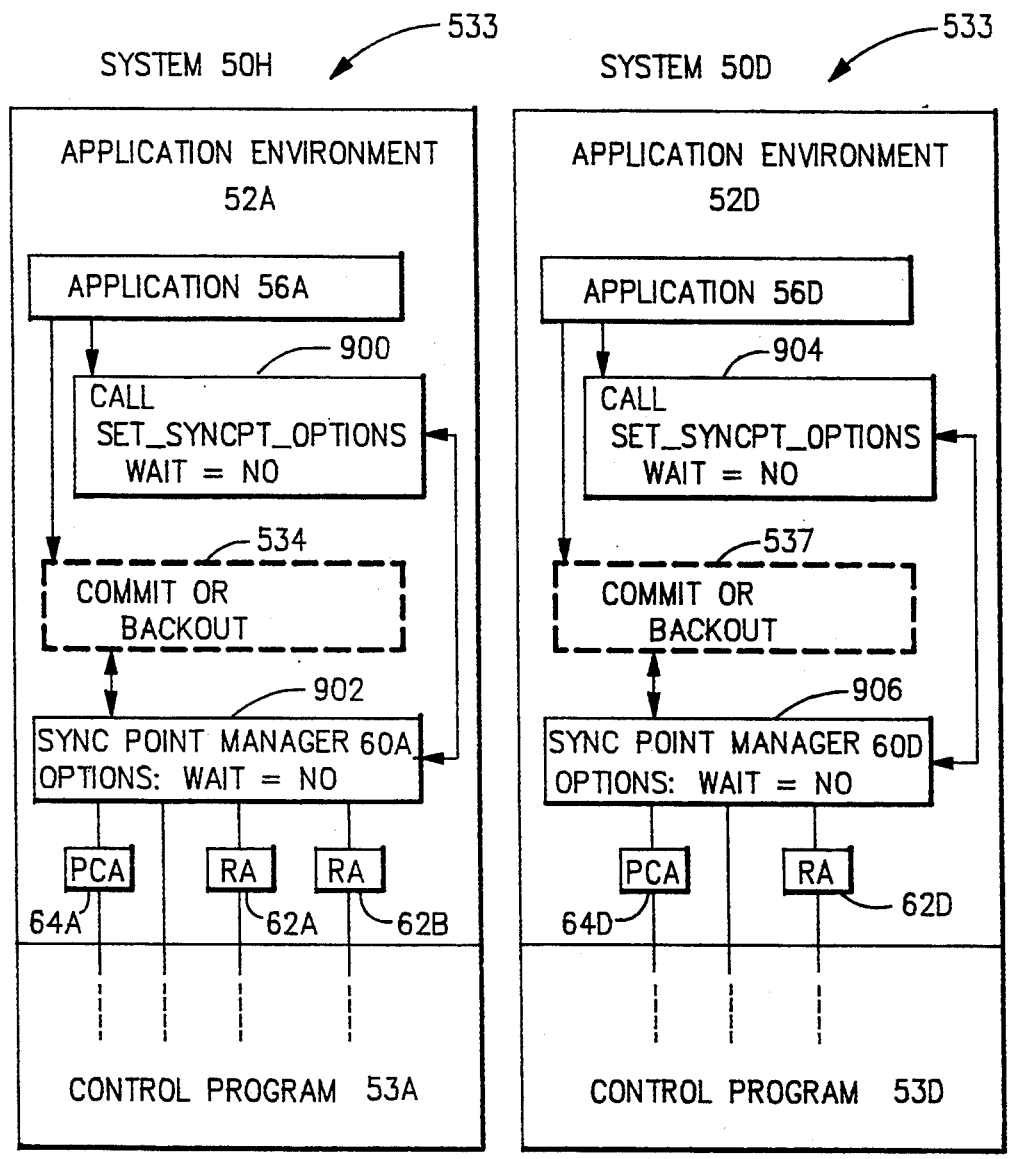
FIGS. 50 (A) and 50 (B) are block diagrams which illustrate application 56A and application 56D requesting asynchronous resynchronization should an error occur during sync point processing.

As described in the section entitled *Coordinated Sync Point Management of Protected Resources*, application 56A starts application 56D via a protected conversation (FIG. 5A, Step 530). Protected conversation adapters 64A and 64D register with their respective syncpoint managers (FIG. 5A., Step 532). FIG. 50A expands the processing done next by application 56A (FIG. 5A., Step 533). As shown in FIG. 50A, application 56A issues to syncpoint manager 60A a 'set syncpoint options wait=no' call to indicate that application 56A does not desire to wait indefinitely for a synchronous resynchronization if there is a failure during syncpoint processing (Step 900) and syncpoint manager 60A records the option (Step 902). Similar processing (Steps 904 and 906 of FIG. 50B) is done by application 56D after application 56A contacts it to do some work (FIG. 5A, Step 533). It should be noted that in the illustrated embodiment, the architected default is WAIT=yes. However, if desired, the default condition could be WAIT=no at system 50A and system 50D. In such cases, it is not necessary for application 56A and application 56D to issue the 'set syncpoint options' call if they desired WAIT=no. 'Set syncpoint options' is a local value. Therefore, the value of the 'syncpoint options' in effect at the syncpoint manager where the failure is detected is the one used.

Processing continues as described in the foregoing section entitled *Coordinated Sync Point Management of Protected Resources* and illustrated in FIG. 2. and FIG. 5(a,b) steps 533A through step 546. Summarizing the above details, application 56A sends a request to application 56D over the protected conversation causing application 56D to update file 78D. Application 56D replies to application 56A causing application 56A to update files 78A and 78B. Application 56A issues a commit (Step 534 of FIG. 5A), causing syncpoint manager 60A to call protected conversation adapter 64A to send a phase one 'prepare' call to protected conversation adapter 64D. This causes application 56D to receive a request asking it to issue a commit. Application 56D issues a commit (Step 537) and syncpoint manager 60D does its phase one processing and calls protected conversation adapter 64D to reply 'request commit' to protected conversation adapter 64A. At this time syncpoint manager 60D's state is 'in doubt' (and is so noted on its log 72D). Protected conversation adapter 64A replies 'request commit' to syncpoint manager 60A. Since its other resources also replied 'request commit', syncpoint manager 60A's state is now 'committed' and writes this state to its log, 72A. Syncpoint manager 60A now contacts its registered resources with the phase two decision 'committed' (FIG. 5b, Step 545). Protected conversation adapter 64A then sends the phase two decision of 'committed' to protected conversation adapter 64D (FIG. 5b, Step 546). However, during this processing protected conversation adapter 64A discovers a failure such that the path between system 50A and system 50D for the protected conversation between application 56A and application 56D is no longer available. Protected conversation adapter 64A replies 'resource failure' to syncpoint manager 60A. This is an interruption in syncpoint manager 60A's processing (FIG. 5b, Step 550), causing syncpoint manager 60A to start recovery processing (FIG. 5b, Step 557).

The recovery procedures are defined by the two-phase commit example being used. In the illustrated embodiment, the two-phase commit example is the one used in the section entitled *Coordinated Sync Point Management of Protected Resources*. Recovery processing occurs if a protected resource adapter replies abnormally to the syncpoint manager's phase one or phase two call. The abnormal reply is the result of a resource failure which may be caused by a system failure, path failure, program failure or resource manager failure. Recovery is conducted independently for each failed protected resource for which it is required. Recovery has the following purposes:

1. to place protected resources in a consistent state if possible; if not possible, to notify the operators at the system or, in the case of a failed protected conversation, systems that detected the damage;
2. to unlock locked resources in order to free them for other uses; and
3. to update the recovery facility log, showing that no more syncpoint work is needed for all protected resources, for that LUWID.

The steps involved in recovery, i.e. resynchronization, include the following:

1. The data structures from the recovery facility log records representing the status of the syncpoint operation are restored if the system failed where this recovery facility operates. From these data structures, the recovery facility can (in other embodiments the recovery facility might be called the syncpoint manager because one facility performs both syncpoint and recovery processing) determine the resources for which it is responsible for initiating recovery. If the recovery occurs without a system failure, it is not necessary to restore information from the log because the data structures written during syncpoint used by the recovery facility are still intact.
2. A program in the recovery facility that is responsible for initiating recovery is started. For the conversation example used for protected conversations in this illustrated embodiment tiffs means:
   for protected conversations, establishing a nonprotected conversation of a type requiting confirmation with a partner recovery program running in the recovery facility in the system originally involved in the syncpoint. (this may require a new path between the two systems to be activated);

exchanging log names to verify that the partner has the appropriate memory of the LUWID;

comparing and adjusting the state of the LUWID (i.e. commit or backout) at both partners; and erasing recovery facility log entries and notifying the operators at both partners of the outcome when the recovery completes.

3. For other resource managers participating in the two-phase commit processing, a similar method of recovery is defined. In general, recovery processing for protected resource managers that do not distribute are defined by operating systems implementing syncpoint support. Recovery processing for protected conversations are defined by an intersystem communications architecture. By way of example, the former can be of a type described by the enhanced version of the VM operating system; ("VM" is a trademark of IBM Corp. of Armonk, N.Y.) the latter can be of a type defined in part by *System Network Architecture LU 6.2 Reference: Peer Protocols, SC31-6808 Chapter 5.3 Presentation Services—Sync Point verbs*.

Next, syncpoint manager 60A cabs recovery facility 70A with the identifier of the resource that failed (in this example the resource would be protected conversation 64A) and the LUWID being processed. Recovery facility 70A finds the log entry for the LUWID and the entry for protected conversation 64A (FIG. 4, Step 518). Recovery facility 70A determines the recovery decision from the state information in the entry (Step 519). Based on the processing described above the decision is 'Commit'. Recovery facility 70A knows the resource to be recovered is a protected conversation and starts a recovery process which is an application whose processing is described by the recovery methods architected for the conversation and two-phase commit paradigm being used. That recovery process starts a non-protected conversation for a partner recovery process in recovery facility 70D on system 50D (Step 520). The recovery attempt fails because a conversation cannot be started between the two systems (decision block 521, the No branch) due to a path failure. Recovery facility 70A then checks the log entry to see whether application 56A had requested WAIT=No meaning recovery facility 70A could return to syncpoint manager 60A before recovery was complete. Recovery facility 70A could then complete recovery later asynchronously from application 56A (Step 524). This information was written by syncpoint manager 60A during its phase one log write. As described above, application 56A issued a 'set syncpoint options wait=no' call. Therefore recovery facility 70A returns to syncpoint manager 60A with the intent of the recovery, i.e. commit, and an indication that resynchronization (recovery) is still in progress. (Step 526). Because syncpoint manager 60A had already heard 'forget' from its other protected resources (FIG. 5b, Step 545A), it updates the value of the LUWID by one and returns to application 56A with a return code of "RC=OK.LUW_OUTCOME_PENDING" which indicates the intended outcome, Commit, and that not all resources have been committed (FIG. 5a, Step 558). This means that the commit processing will be completed asynchronously to application 56A. Thus, application 56A can then continue processing other work and not waste time waiting for resynchronization.

Recovery facility 70A repeatedly tries to successfully complete recovery for protected conversation adapter 64A with recovery facility 70D on system 50D (FIG. 4, Step 527). When recovery is started and finally completed (decision block 521, YES branch) both recovery facility 70A and recovery facility 70D write operator messages stating that the recovery had started and that it had successfully completed (Step 522). Syncpoint manager 60D had also learned of the failed conversation through its registered resource, protected conversation adapter 64D. It too had contacted its recovery facility 70D, with the identifier of the failed resource, in this case protected conversation 64D, and the LUWID. Based on the syncpoint manager state of "in doubt", recovery facility 70D knew it had to wait to be contacted for recovery by recovery facility 70A. When the recovery finally completes (decision block 523, YES branch), recovery facility 70D returns to syncpoint manager 60D a decision of commit (Step 523A). Syncpoint manager 60D then performs its phase two processing. Because of the protected conversation breakage, syncpoint manager 60D subsequently gets a new unique LUWID. It then returns to application 56D with an outcome of Commit. Application 56D can now perform its processing. It should be noted that in the previous example, there could have been a failure with file manager 63A in step 545A instead of with the protected conversation, represented to syncpoint manger 60A by protected conversation adapter 64A. In this alternate case, recovery facility 70A would initiate recovery with file manager 63A instead of recovery facility 70D based on the recovery methods for nonprotected conversations defined by the operating system.

Figure 51:
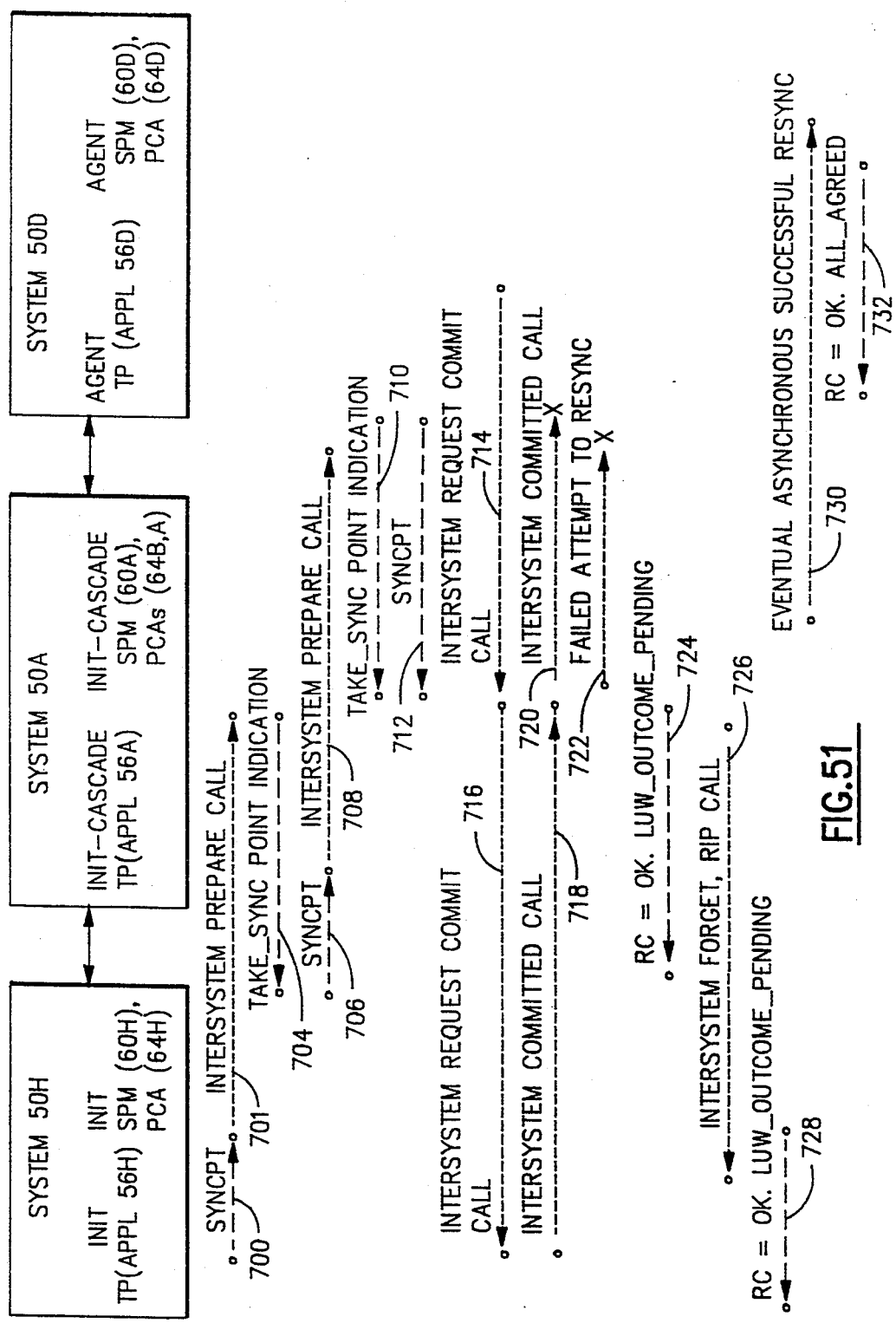
FIG. 51 is a flow graph illustrating the steps of the asynchronous, resynchronization-in-progress process involving an additional system 50C.

In FIG. 5(a,b), application 56A (and thus syncpoint manager 60A) was the initiator of the commit request. However, FIG. 51 illustrates another example in which another application 56It at System 50H initiated a commit (Step 700) instead of application 56A. Application 56H is running in an application environment that can be similar to or different than the one where application 56A is running; however, both systems and application environments support the aforesaid communications and two-phase commit procedures. System 50A and System 50D are the same as in FIG. 2. For purposes of the example illustrated in FIG. 51, (and FIGS. 52 and 53 which follow), application 56H issued a commit request (SYNCPT) to syncpoint manager 6011 within System 50H which commit request involved resources in system 50H, system 50A, and system 50D. In response to the commit request, syncpoint manager 60H calls its registered resource protected conversation adapter 64H with a phase one 'prepare' call. Protected conversation adapter 64H then sends the intersystem architected 'prepare' call to protected conversation adapter 64B within System 50A (Step 701). As noted above, the 'prepare' signal is part of the first phase of the two-phase commit procedure. Next, protected conversation adapter 64B gives application 56A a notification of "Take Syncpoint" (Step 704), and in response, application 56A issues a commit request (SYNCPT) to syncpoint manager 60A (Step 706). Next, syncpoint manager 60A calls protected conversation adapter 64A with a phase one 'prepare' call. Protected conversation adapter 64A sends an architected intersystem prepare call to protected conversation adapter 64D in System 50D (Step 708). In response, protected conversation adapter 64D gives application 56D a notification of "Take Syncpoint" (Step 710). In response, application 56D issues a commit (SYNCPT) request to syncpoint manager 60D (Step 712). Syncpoint manger 60D issues a phase one 'prepare' call to all its registered resources. When all the resources accessed by syncpoint manager 60D are ready to commit, syncpoint manager 60D calls protected conversation adapter 64D with a reply of 'request commit'. Protected conversation adapter 64D sends an architected intersystem 'request commit' call to the initiator of the commit request, in this case protected conversation adapter 64A which replies to syncpoint manager 60A 'request commit' (Step 714). After syncpoint manager 60A receives this request and notification that all of its resources are ready, syncpoint manager 60A replies to protected conversation adapter 64B with 'request commit'. Protected conversation adapter 64B sends an architected intersystem 'request commit' call to the initiator of the commit request, in this case the initiating protected conversation adapter 64II and syncpoint manager 60II (Step 716). After receiving this reply from protected conversation adapter 64II on behalf of syncpoint manager 60A and notification that all of syncpoint manager 60I I's resources are ready, syncpoint manager 60II's phase two decision is commit. Syncpoint manager 60H calls all resources with a phase two decision of 'commit'. When protected conversation adapter 64II is called it sends an architected intersystem 'commit' call to protected conversation adapter 64B which in turn replies 'committed' to syncpoint manager 60A which becomes its phase two decision (Step 718).

So far, there have been no problems in implementing the two-phase commit procedure. Also, it should be noted that after each application issues the commit request to the respective syncpoint manager in Steps 700, 706 and 712, the respective syncpoint managers logs the phase one information and state into the respective recovery facility logs. Similarly, when each of the syncpoint managers 60A and 60D receives the notifications from its associated resources that all resources are ready, they log 'in doubt' in their respective recovery facility log entries. If one or more resources cannot commit, no log entry is made, but backout processing is completed before replying 'backout' to its upstream initiator. Similarly, when syncpoint manager 60H receives 'request commit' from all its registered resources, it writes the decision of 'commit' in its recovery facility log. When syncpoint managers 60A and 60D, respectively, receive the commit decision; they too will write the commit decision in their respective recovery facility logs before contacting their registered resources. Next, syncpoint manager 60A calls all its registered resources with the phase two 'commit' decision. When syncpoint manager 60A calls protected conversation adapter 64A with the 'commit' call, protected conversation adapter 64A attempts to send an architected intersystem 'committed' cab to protected conversation adapter 64D which in turn should reply committed to syncpoint manager 60D. In the illustrated example, however, this transmission is unsuccessful (Step 720) due to a failure in the conversation path. In response to this failure, syncpoint manager 60A contacts recovery facility 70A for recovery processing for this LUWID and protected conversation. As described above, recovery facility 70A tries once to perform recovery with recovery facility 70D (Step 722). This attempt is also unsuccessful in this example due to the persistence of the communication path failure. Next, recovery facility 70A reads the log entry and learns that asynchronous resynchronization is required. Recovery facility 70A then notifies syncpoint manager 60A of the failed attempt to recover and that recovery will continue asynchronously. Syncpoint manager 60A then cabs protected resource adapter 64B with 'forget, resynchronization-in-progress (RIP)'. Protected conversation adapter 64B sends an architected intersystem 'forget, RIP' cab to protected conversation adapter 64II which replies 'forget, RIP' to syncpoint manager 60H (Step 726). Syncpoint manager 60A then gives application 56A a return code, "RC=OK.LUW_OUTCOME_PENDING", to advise application 56A the intent of Commit and that the commit processing will be completed asynchronously (Step 724). The "Forget RIP" notification of Step 726 serves as an acknowledgement to Step 718 and causes syncpoint manager 60H to write a state of 'forget' in its recovery facility log for the syncpoint information relating to the syncpoint of Step 700 because two-phase commit processing is now complete for the commit requested by application 56H. Syncpoint manager 60H, upon receiving the "Forget, RIP" indication from its protected conversation adapter 64H (and assuming it had heard from all other resources involved in the commit) can return to application 56H with a return code, "RC=OK.LUW_OUTCOME_PENDING", advising application 56H of the intent of Commit and that the commit processing will be completed asynchronously (Step 728).

Recovery facility 70A periodically attempts to execute recovery processing with recovery facility 70D on system 50D and to simultaneously order the commit (Step 730). As discussed above, when recovery is complete, recovery facility 70D replies to syncpoint manager 60D with a phase two decision of 'commit'. Syncpoint manager 60D will complete its phase two processing and return to application 56D with a return code, "RC=OK. ALL_AGREED", meaning the commit request completed successfully (Step 732). Applications 56H, 56A, and 56D can all continue with other processing. It should be noted that when recovery processing takes place between recovery facility 70A and recovery facility 70D, messages are sent to the operator consoles indicating recovery is starting and the outcome of the processing. It should be noted also that when syncpoint manager 60A received the "FAILED ATTEMPT TO RESYNC" notification from recovery facility 70A, syncpoint manager 60A updates the state for the LUWID to 'Forget,RIP' in the log entry in log 72A. System 50A will later write a state of 'forget' for this LUWID when the next normal flow arrives over the conversation path between System 50A and System 50H which has or had carried the protected conversation involved in tiffs LUWID. This is an "implied forget" operation. If there is a failure such that the conversation path fails between System 50A and System 50H (over which the protected conversation flowed that was involved in the commit procedure which received the resynchronization-in-progress notification) after syncpoint manager 60A writes the state of 'Forget, RIP' and before the "implied forget" is received, the log entry for the LUWID at System 50A will be erased by normal recovery procedures as defined by the two-phase commit paradigm being used. This would involve, however, that new resynchronization-in-progress indicators be sent in the compare states data flow as defined earlier. It should also be noted that if the "implied forget" is received causing System 50A to write a state of 'forget' on recovery facility log 72A, recovery facility 70A will not allow the recovery record to really be forgotten until recovery is complete with recovery facility 70D..

It should also be noted that there is a migration path between syncpoint managers such that syncpoint managers which support the foregoing asynchronous resynchronization (resynchronization-in-progress) function can communicate with other syncpoint managers that do not. When the systems that support syncpoint processing originally communicate with each other, it is determined in the initial capabilities exchange as defined by the communications architecture and the two-phase commit procedures used by both systems if they support the foregoing resynchronization-in-progress function. If the initiator of the commit request, in the above example from FIG. 51, syncpoint manager 60II, does not support resynchronization-in-progress, the cascaded initiator (the syncpoint manager that receives the commit request, in the above example, syncpoint manager 60A) will send back to the syncpoint manager who initiated the commit request (in the above example syncpoint manager 60H) the intent of a syncpoint request (either commit or backout) and not an indication that resynchronization will take place later asynchronously. The local application, where the outage took place (in the above example, application 56A) and where the syncpoint manager supports resynchronization-in-progress (in the above example, syncpoint manager 60A), will receive this resynchronization-in-progress notification.

Figure 52:
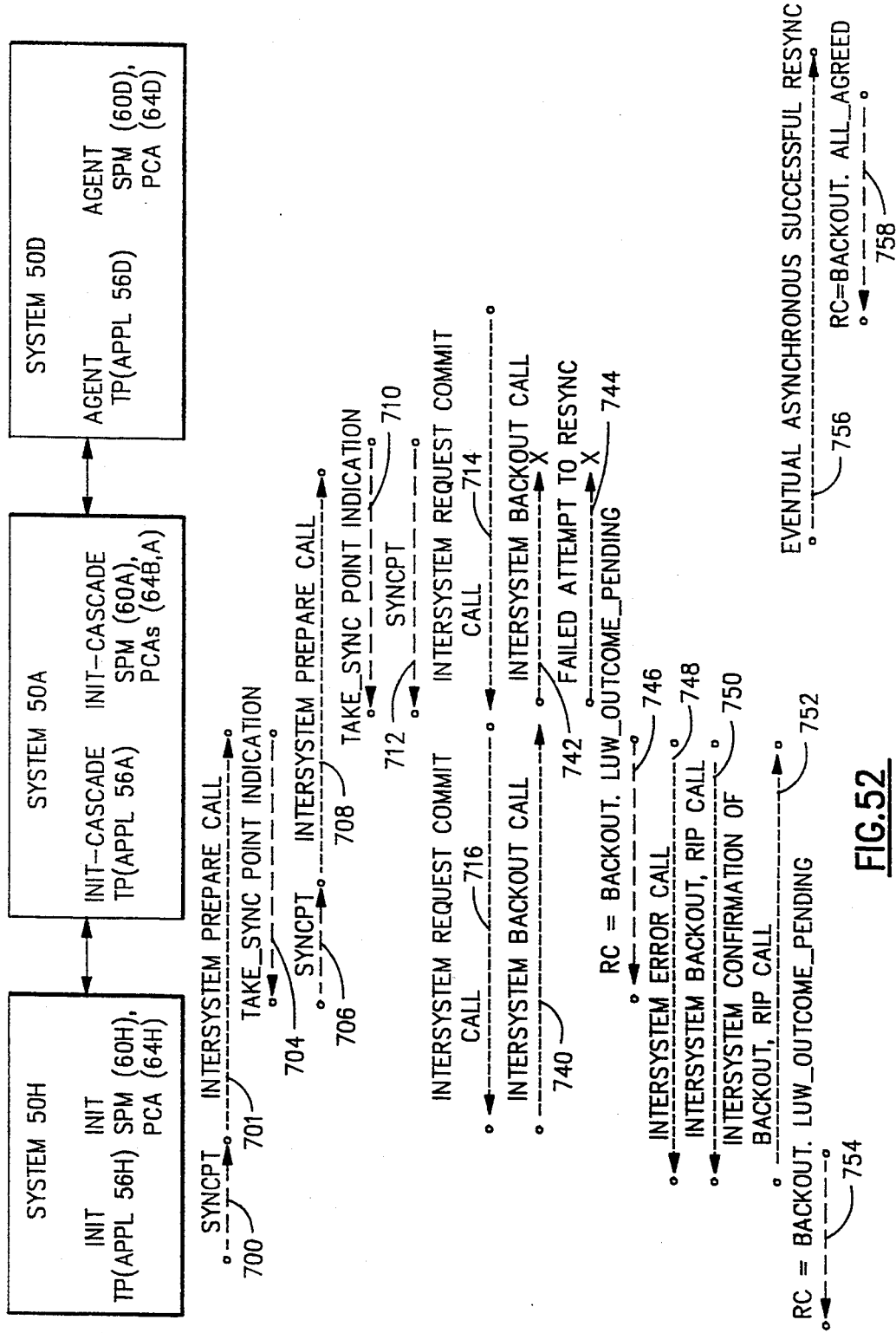
FIG. 52 is a flow graph illustrating the steps of the asynchronous, resynchronization-in-progress process involving a failed backout order originating from system 50C.

FIG. 52 illustrates the resynchronization-in-progress function in the event that syncpoint manager 60H issues a backout as described in more detail below. Steps 700–716 are the same as in FIG. 51. However, after receipt of the 'request commit' reply from syncpoint manager 60A via protected conversation adapter 64H in Step 716, syncpoint manager 60H decides to back out because one or more of its protected resources are not ready. Then, syncpoint manager 60II calls its registered resources with a phase two decision of 'backout'. The 'backout' decision is given to syncpoint manager 60A (protected conversation adapter 64H sends an architected intersystem backout call to protected conversation adapter 64B who replies 'backout' to syncpoint manager 60A) (Step 740). Syncpoint manager 60A calls its registered resources with a phase two decision of 'backout'. Protected conversation adapter 64A attempts to send an intersystem backout call to syncpoint manager 60D via protected conversation adapter 64D in Step 742. However in the example, Step 742 fails due to a communication path failure or other type of failure. In response, syncpoint manager 60A calls recovery facility 70A with the LUWID and failed resource identifier to perform recovery processing with recovery facility 70D on System 50D in Step 744. However, in the illustrated example, this recovery attempt also fails. Recovery facility 70A replies to syncpoint manager 60A that the recovery attempt failed, but that it will complete recovery processing asynchronously. Having heard from its other protected resources, syncpoint manager 60A writes a state of 'backout, rip' on its recovery facility log 72A. Syncpoint manager 60A then calls protected conversation adapter 64B with a reply of 'backout,tip'. Based on the architected intersystem backout call, protected conversation adapter 64B sends an error reply to the original phase two 'backout' call from protected conversation adapter 64H (Step 748). It then sends an architected intersystem 'backout, rip' call to protected conversation adapter 6411 (Step 750). I laving received the 'backout, rip' indication, protected conversation adapter 64H sends an architected intersystem acknowledgement(Step 752) and replies 'backout, rip' to syncpoint manager 60H (Step 752). Having heard from its other resources, syncpoint manager 60It returns to application 56H with a return code, "RC=Backout, LUW_OUTCOME_PENDING", which notifies it that backout is pending and to advise application 56H that it is free to perform other useful work (Step 754). When protected conversation adapter 64B gets an acknowledgement to the 'backout, rip' call from protected conversation adapter 64H (response to steps 748 and 750) it replies 'ok' to syncpoint manager 60A. Syncpoint manager 60A then writes a state of 'forget' in the log entry for this LUWID in recovery facility log 72A and returns to application 56A with a return code, "RC=Backout, LUW_OUTCOME_PENDING" (Step 746), which means that the intended result of the commit request is backout, but all resources have not backed out. Application 56A can then continue with its processing. The LUWID entry in recovery facility log 72A will be forgotten by System 50A as an "implied forget" which was described above. When 'forget' is written, if the failed resource in the LUWID has not been recovered yet, the LUWID entry will not be really forgotten until recovery takes place. Meanwhile, recovery facility 70A continues to attempt to recover with recovery facility 70D in system 50D asynchronously (Step 756). When recovery completes, syncpoint manager 60D is notified of the backout and completes its phase two processing. Syncpoint manager 60D then returns to application 56D with a return code of "RC=BACK OUT.ALL_AGREED" which means all resources have backed out. (Step 758). Applications 56H, 56A, and 56D can all continue with other processing. It should be noted that when recovery processing takes place between recovery facility 70A and recovery facility 70D, messages are sent to the operator consoles indicating recovery is starting and the outcome of the processing.

Figure 53:
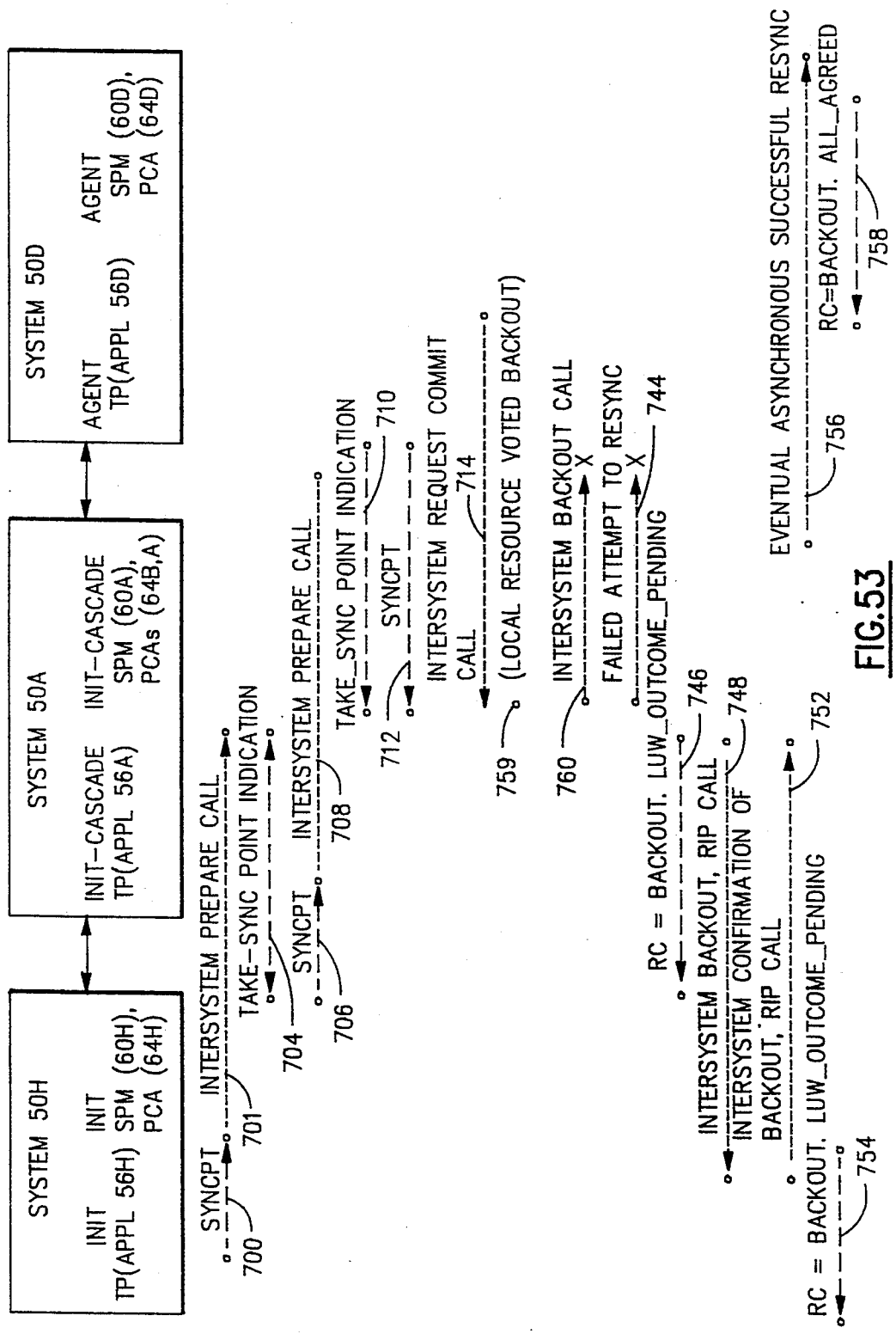
FIG. 53 is a flow graph illustrating the steps of the asynchronous, resynchronization-in-progress process involving a failed backout order originating from system 50A.

FIG. 53 illustrates the resynchronization-in-progress function in the event that syncpoint manager 60A issues a backout as described in more detail below. Steps 700–714 are the stone as in FIG. 52. However, after receipt of the 'request commit' reply in Step 714, syncpoint manager 60A calls its registered resources with a phase two call of 'backout' because one or more of the resources associated with syncpoint manager 60A cannot commit (Step 759). Protected conversation adapter 64A attempts to 'send an architected intersystem 'backout' call to protected conversation adapter 64D (Step 760). However, as illustrated in Step 760, the 'backout' call is not received by protected conversation adapter 64D due to a communication path failure or other failure. Syncpoint manager 60A calls recovery facility 70A with the LUWID and failed resource identifier asking it to perform recovery processing. Recovery facility 70A tries to perform recovery processing with recovery facility 70D in system 50D (Step 744). Step 744 also fails because the communication path failure persists, and consequently, syncpoint manager 60A transmits the signal of step 746 described above in reference to FIG. 52. Step 750–758 are also the same as in FIG. 52.

FIG. 53A illustrates the resynchronization-in-progress function in the event that syncpoint manager 60A issues a backout because of a different failure as described in more detail below. Steps 700-706 are the same as in FIG. 52. However, after receipt of the commit request in Step 706, syncpoint manager 60A calls its registered resources with a phase one call of 'prepare'. Protected conversation adapter 64A attempts to send an architected intersystem 'prepare' call to protected conversation adapter 64D (Step 708a). However, as illustrated in Step 708a, the 'prepare' call is not received by protected conversation adapter 64D due to a communication path failure or other failure. Syncpoint manager 60A calls its local registered resource with a phase two call of backout (Step 763). Syncpoint manager 60A then calls recovery facility 70A with the LUWID and failed resource identifier asking it to perform recovery processing. Recovery facility 70A tries to perform recovery processing with recovery facility 70D in system 50D (Step 744). Step 744 also fails because the communication path failure persists, and consequently, syncpoint manager 60A transmits the signal of step 746 described above in reference to FIG. 52. Step 750-756 are also the same as in FIG. 52. Asynchronously to the processing being done by syncpoint manager 60A, application 56D receives a path failure indication on its previously established (when application 56A initiated application 56D) protected conversation with application 56A (Step 761). This path failure prevented protected conversation adapter 64D from receiving the prepare call from protected conversation adapter 64A. Because the path failure was on a protected conversation, application 56D must issue a backout request. Application 56D issues a backout request (Step 762) and eventually receives a return code that indicates all registered resources are backed out (Step 764). At this point, applications 56H, 56A, and 56D can all continue with other processing. Meanwhile, recovery facility 70A continues to attempt to recover with recovery facility 70D in system 50D asynchronously (Step 756). It should be noted that when recovery processing takes place between recovery facility 70A and recovery facility 70D, messages are sent to the operator consoles indicating recovery is starting and the outcome of the processing.

Based on the foregoing, processes and systems embodying the present invention have been disclosed. However, numerous modifications and substitutions may be made without deviating from the scope of the invention. Therefore, the invention has been disclosed by way of illustration and not limitation, and reference should be made to the following claims to determine the scope of the invention.

The following is a partial glossary of terms.

Application

User or service program(s) or a work distribution function integrated with a resource manager, that execute in an execution environment and can issue one or more of the following: commit, back out or work request.

Execution Environment

Any computing means for executing applications, system facilities (recovery facility, communication facility, etc), resource managers, and/or other programs in virtual machine, personal computer, work station, mini computer, mainframe computer, and/or other type of computers.

Protected Conversation

A conversation that is subject to any form of synchronization point processing or protective commit or back out procedure.

Protected Resource

A resource that is subject to any form of synchronization point processing or other protective commit or back out procedure.

Recovery Facility

A facility that has a responsibility for recovery of a failed synchronization point or other commit or back out procedure.

Two-Phase Commit Procedure

A procedure for coordinating and/or synchronizing a commit or back out of updates and/or a protected conversation. Usually, the two phase commit procedure is used to atomically commit or back out a plurality of resources or a single resource via a protected conversation. By way of example, the two phase commit procedure can include a polling or prepare phase and a back out or commit phase.

We claim:

1. A computer network comprising:
    a first computer comprising
        means for participating in a protected conversion,
        first sync point manager means for coordinating a two-phase commit procedure for said first computer involving said protected conversation,
        first recovery facility means, serving said first computer, for recovering said two-phase commit procedure involving said protected conversation by committing or backing out resources involved in said protected conversation, said first sync point manager means providing sync point information to said first recovery facility means, and
        a first recovery log supporting said first recovery facility means and comprising a first sync point log and a first log name log, said first recovery facility means storing said sync point information provided by said first sync point manager means in said first sync point log; and
    a second computer comprising
        means for participating in said protected conversation,
        second sync point manager means for coordinating a two-phase commit procedure for said second computer involving said protected conversation,
        second recovery facility means, serving said second computer, for recovering said two-phase commit procedure involving said protected conversation by committing or backing out resources involved in said protected conversation, said second sync point manager means providing sync point information to said second recovery facility means, and
        a second recovery log supporting said second recovery facility means and comprising a second sync point log and a second log name log, said second recovery facility means storing said sync point information provided by said second sync point manager means in said second sync point log;

first communications facility means for controlling communications in and out of said first computer;

second communications facility means for controlling communications in and out of said second computer; and means for coupling said first and second communications facility means to each other; and wherein said first communications facility means comprises first recording means for recording previous exchange of log names between said first and second recovery facility means, means for notifying said first recovery facility means when said first computer initiates a protected conversation toward said second computer via said first communications facility means and log names were not previously exchanged between said first and said second recovery facility means, and means for blocking said protected conversation until log names are exchanged;

said first recovery facility means includes means, responsive to said notification from said first communications facility means, for exchanging log names with said second recovery facility means such that a log name representing said first recovery log is written or validated in said second log name log and a log name representing said second recovery log is written or validated in said first log name log; and said first communications facility means does not direct said first recovery facility means to exchange log names or block said protected conversation when log names were previously exchanged between said first and second computers and there has been no reset or reinitialization of said recovery logs since said exchange.

2. A computer network as set forth in claim 1 wherein the first recording means comprises a log name exchange table to record exchanges of log names between said first and second recovery facility means.

3. A computer network as set forth in claim 1 further comprising means for resetting said first recording means after a failure in or normal re-initialization of said first computer such that when a protected conversation is subsequently initiated from said first computer toward said second computer, said first communications facility means notifies said first recovery facility means to exchange log names with said second recovery facility means.

4. A computer network as set forth in claim 1 wherein said first recovery facility means is responsive to said log name exchange with said second recovery facility means, to update the first recording means in said first communications facility means to indicate that said log name exchange has successfully occurred; and said first communications facility means is responsive to said update of said first recording means to release said protected conversation to proceed to said second communications facility means.

5. A computer network as set forth in claim 1 wherein said first computer includes a first virtual machine and said second computer includes a second virtual machine and said conversation is made between said first and second virtual machines.

6. A computer network as set forth in claim 1 wherein said first recovery log is the only recovery log in said first computer, and further comprising means for making a protected conversion between different application environments in said first computer without exchanging log names.

7. A computer network as set forth in claim 1 wherein each of said log names is based on a unique path between said first and second computers.

8. A computer network as set forth in claim 1 wherein
said first computer further comprises means for executing first and second application programs, said first sync point manager means coordinates a two-phase commit procedure for said first and second application programs, said first recovery log serves said two-phase commit procedure for said first and second application programs, and said first computer further comprises means for communicating between said first and second application programs bypassing said first communications facility means and thereby avoiding a log name exchange.

9. A computer network as set forth in claim 1 wherein
said second communications facility means includes second recording means for recording exchange of log names between said second and first computer; and said second recovery facility means is responsive to said log name exchange with said first recovery facility means, to update said second recording means in said second communications facility means to indicate the log name exchange, said second communications facility means allowing said protected conversation originating from said first computer to proceed from said first communications facility means to said second computer after said update of said second recording means in said second communications facility means to indicate the log name exchange.

10. A computer network as set forth in claim 9 further comprising log name exchange recording means serving said first recovery facility means, for recording a status of log name exchange between said first and second recovery facility means.

11. A computer network as set forth in claim 1 wherein
the first recording means also records whether a log name exchange is currently in progress; and further comprising means for avoiding another log name exchange when another protected conversation is initiated between said first and second computers while the current log name exchange is currently in progress.

12. A computer network as set forth in claim 11 wherein said first communications facility means intercepts both of said conversions until said log name exchange process is completed.

13. A computer network or system, comprising:
a resource manager;
a first recovery log supporting said resource manager in a first commit procedure and comprising a first sync point log for storing sync point information relating to said resource manager and a first log name log;
a computer comprising
means for initiating said two phase commit procedure to access said resource manager;
sync point manager means for coordinating said two-phase commit procedure for said computer, recovery facility means, supporting said computer, for recovering said two-phase commit procedure by committing or backing out resources managed by said resource manager, said sync point manager means providing sync point information to said recovery facility means, and a second recovery log supporting said recovery facility means for said two phase commit procedure and comprising a second sync point log and a second log name log, said recovery facility means storing said sync point information provided by said sync point manager means in said second sync point log; and wherein said sync point manager means responds to a request to access said resource manager by sending to said resource manager a log name representing said second recovery log, and said resource manager compares said log name sent by said sync point manager means to contents of said first log name log to determine if log names were previously exchanged between said recovery facility means and said resource manager, and if not, said sync point manager means delays said access to said resource manager until log names are exchanged between said recovery facility means and said resource manager, said recovery facility means and said resource manager exchanging log names such that said log name representing said second recovery log is written or validated in said first log name log and a log name representing said first recovery log is written or validated in said second log name log, and if so, said sync point manager means passes said request to said resource manager to provide access to said resource manager and avoids another exchange of log names.

14. A computer network or system as set forth in claim 13 wherein said computer further comprises resource adapter means for interfacing said computer to said resource manager during normal work operations; and said recovery facility means and said resource manager exchange log names without involving said resource adapter means or said sync point manager means.

15. A computer network or system as set forth in claim 12 wherein said first recovery log is dedicated to said resource manager.

16. A communication system within a first computer for communicating with a second computer via a protected conversation, said first and second computers comprising first and second recovery logs, respectively, for storing syncpoint information relating to a state of said protected conversation at the respective computer, said communication system comprising:

recording means for recording previous or current exchange of recovery log names between said first and second computers, wherein pursuant to said log name exchange said first computer notifies said second computer of the name of said first recovery log and second computer notifies said first computer of the name of said second recovery log; and control means, responsive to a request to make said protected conversation with said second computer and logically coupled to said recording means, for determining if said recovery log names were previously exchanged between said first and second computers, and if not, blocking said protected conversation until said recovery log names are exchanged, and exchanging said recovery log names by requesting the name of said second recovery log from said second computer and sending the name of said first recovery log to said second computer, and if so, permitting said protected conversation to proceed to said second computer without exchanging recovery log names again.

17. A communication system as set forth in claim 16 wherein said control means also updates the recording means to indicate that recovery log names have been exchanged after recovery log names are initially exchanged.

18. A communication system as set forth in claim 16 further comprising sync point manager means for coordinating a two-phase commit procedure for said first computer involving said protected conversation and providing sync point information to said first recovery log for said protected conversation.

19. A communication system as set forth in claim 16 further comprising recovery facility means, logically coupled to said first recovery log means, for recovering said two-phase commit procedure involving said protected conversation by committing or backing out one or more resources involved in said protected conversation.

20. A communication system as set forth in claim 16 wherein there are a plurality of execution environments within said first computer, and communications between said plurality of execution environments bypass said control means whereby log name exchange is not performed for communications between said plurality of execution environments.

21. A communication system as set forth in claim 16 further comprising means for resetting said recording means to erase or invalidate a record of exchange of recovery log names between said first and second computers; and wherein the control means will determine that recovery log names were not previously exchanged if said recording means has been reset since a previous recovery log name exchange.

22. A communication system as set forth in claim 21 wherein the resetting means is initiated to erase or invalidate said record after and in response to a failure in or normal reinitialization of said first computer.

23. A method of communicating from a first computer to a second computer via a protected conversation, said first and second computers comprising first and second recovery logs, respectively, for storing syncpoint information relating to a state of said protected conversation at the respective computer, said method comprising the steps of:

recording previous or current exchange of recovery log names between said first and second computers, wherein pursuant to said log name exchange said first computer notifies said second computer of the name of said first recovery log and second computer notifies said first computer of the name of said second recovery log; and in response to a request by said first computer to make said protected conversation with said second computer, determining if said recovery log names were previously exchanged between said first and second computers, and if not, blocking said protected conversation from proceeding from said first computer to said second computer until said recovery log names are exchanged, and exchanging said recovery log names, if so, permitting said protected conversation to proceed from said first computer to said second computer without exchanging recovery log names again.

24. A method as set forth in claim 23 further comprising the step of coordinating a two-phase commit procedure for said first computer involving said protected conversation and providing sync point information to said first recovery log for said protected conversation.

25. A method as set forth in claim 23 further comprising the step of recovering said two-phase commit procedure involving said protected conversation by committing or backing out one or more resources involved in said protected conversation.

26. A method as set forth in claim 23 wherein there are a plurality of execution environments within said first computer, and log names are never exchanged for communications between said plurality of execution environments.

27. A method as set forth in claim 23 further comprising the step of updating the record to indicate that recovery log names have been exchanged after recovery log names are initially exchanged.

28. A method as set forth in claim 27 further comprising the step of resetting said record of exchange of recovery log names between said first and second computers; and wherein the step of determining if recovery log names were previously exchanged will determine that recovery log names were not previously exchanged if said recording means has been reset since a previous recovery log name exchange.

29. A method as set forth in claim 28 wherein the resetting step is initiated after and in response to a failure in or normal re-initialization of said first computer.

* * * * *